United States Patent [19]
Gubbins et al.

[11] Patent Number: 4,828,389

[45] Date of Patent: May 9, 1989

[54] INTEGRATED TRIAD OPTICAL RATE SENSOR APPARATUS

[75] Inventors: Harry L. Gubbins, Grand Rapids; Jerry L. Page, Kentwood; Daniel L. Sugarbaker, Grand Rapids, all of Mich.

[73] Assignees: Smiths Industries; SLI Avionic Systems Corp., Grand Rapids, Mich.

[21] Appl. No.: 40,982

[22] Filed: Apr. 21, 1987

[51] Int. Cl.$^4$ .................... G01B 9/02; G01C 19/64
[52] U.S. Cl. ................................................. 356/350
[58] Field of Search ....................................... 356/350

[56] References Cited

U.S. PATENT DOCUMENTS

| | | | |
|---|---|---|---|
| 4,265,541 | 5/1981 | Leclerc et al. | 356/350 |
| 4,645,345 | 2/1987 | Domann | 356/350 |

FOREIGN PATENT DOCUMENTS 2941618 4/1981 Fed. Rep. of Germany ...... 356/350

*Primary Examiner*—Vincent P. McGraw
*Attorney, Agent, or Firm*—Varnum, Riddering, Schmidt & Howlett

[57] ABSTRACT

A triad sensor apparatus (300) comprises a passive ring Sagnac interferometric arrangement having a light source circuit (308) and a series of three multi-turn fiber optic rings (302, 304, 306). An optics/modulator circuit (312) is adapted to selectively switch optical waves emitted from the light source circuit (308) and transmit the signals through the corresponding fiber optic rings as counterpropagating optical waves. Nonreciprocal phase modulation is applied to the counter-propagating waves, and the waves are recombined so as to produce a "zero order" fringe pattern having an intensity varying in accordance with the relative phase between the counterpropagating waves. Optical waves from the light source circuit (308) are selectively applied to a ring path during a given time period, while the photodetector circuit (324) is detecting light waves which have emerged from another ring path during the same given time period. Certain of the circuit components associated with signal processing circuitry (328) are selectively timed-shared with respect to signals associated with each of the gyroscope channels.

24 Claims, 19 Drawing Sheets

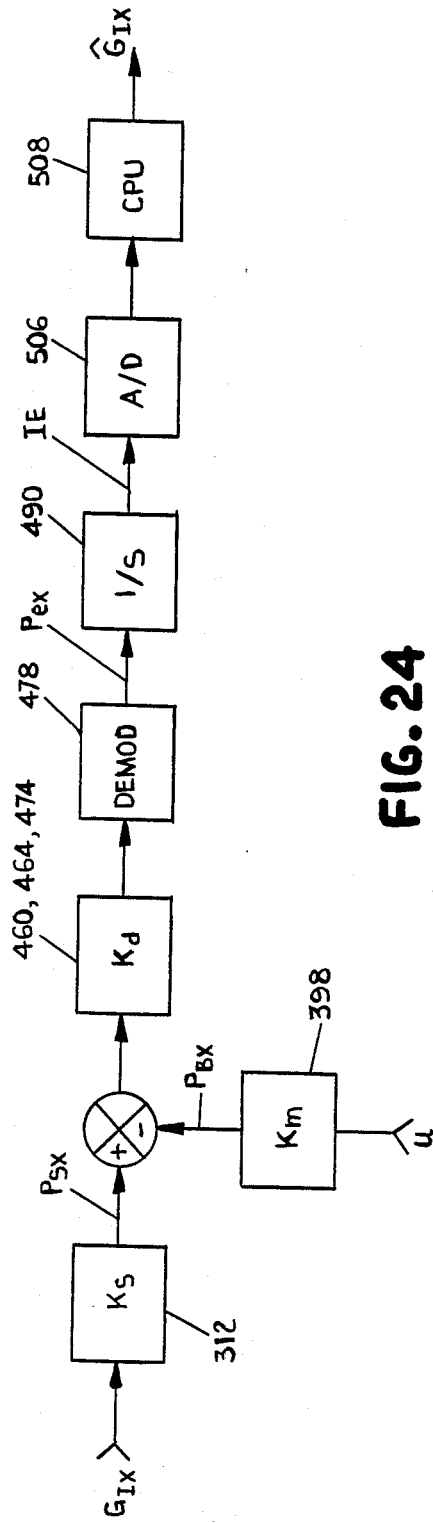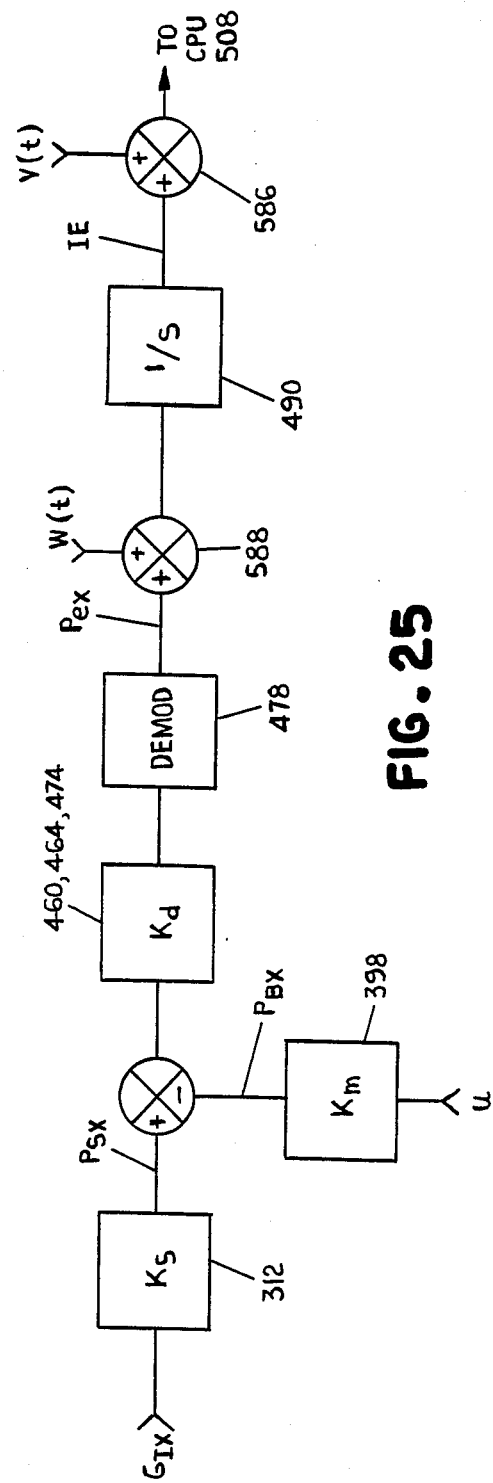
FIG. 24
FIG. 25

INTEGRATED TRIAD OPTICAL RATE SENSOR APPARATUS

TECHNICAL FIELD

The invention relates to optical rate sensors and, more particularly, relates to optical rate sensors employing Sagnac interferometric principles to precisely measure angular rates of rotation.

BACKGROUND ART

Inertial reference guidance systems, extensively utilized in aircraft and missile navigation applications, have traditionally employed spinning mass gyroscopes and associated electromechanical devices for performing various guidance functions, including the detection and measurement of angular rotation rates. Such devices are relatively bulky, expensive and complex, subject to drift rates difficult to control, and require an extensive number of moving parts, some of which have a corresponding short operating life.

Various apparatus utilizing more sophisticated concepts than those of the spinning mass gyroscopes to detect and measure rotation relative to a reference frame have long been known in the art of electromagnetics and, more particularly, optical physics. One of these concepts is the "Sagnac effect" manifested in the implementation of ring interferometric apparatus, and first demonstrated in now classic experiments described by Sagnac in 1913 and later by Michalson and Gale in 1925.

Ring interferometers comprise an optical or other electromagnetic wave source for generating a signal which is applied to a beam splitter or similar optical isolation device to divide the generated signal into two equivalent counter-propagating waves initially transmitted on separate paths. These paths respectively terminate at each of two ports of a closed ring configuration such that the paths are of substantially equivalent length.

The Sagnac effect can best be described and understood by characterizing the counter-propagating waves as a clockwise (CW) traveling wave and a counter-clockwise (CCW) traveling wave. If the ring configuration is rotating at a clockwise rate $G_I$, relativistic theory explains that the counter-propagating wave travelling in the same direction as the rotation vector of the closed path (the CW wave) is observed to follow a longer optical path than the CCW wave travelling in opposition to the path rotation. The counter-propagating waves will therefore experience a differential phase shift $P_S$ (known as the "Sagnac effect" phase shift) which can be characterized in accordance with the following equation:

$$P_s = [(4\pi RL)/(L_o c)] G_I \qquad \text{(Equation 1)}$$

where R is the radius of the enclosed path, L is the actual length of the physical path, $L_o$ is the nominal wave length of the counter-propagating waves, and c is the speed of light in a vacuum.

As apparent from Equation 1, the Sagnac phase shift $P_s$ is linearly proportional to the angular rotation rate $G_I$ of the passive ring for constant wavelength optical signals. Accordingly, a system having a ring interferometer and means for detecting and measuring Sagnac phase shift is theoretically capable of use as a navigation apparatus to determine angular rotation rates. However, as described below, extensive difficulties exist in developing physically realizable interferometric apparatus suitable for implementation in aircraft and, more specifically, in developing systems capable of practically and accurately measuring Sagnac phase shifts.

The early development of practical navigational apparatus employing Sagnac interferometric principles was hindered by the bulky size of requisite instrumentation components and direct measurement difficulties due to the small magnitude of induced Sagnac phase shifts in the range of rotation rates achieved during flight. However, laser technology and the recent advances in development of low scatter mirrors and stable structural materials have rendered the Sagnac effect measurable in various prior art systems. Certain of these systems, such as those disclosed in the Podgorski U.S. Pat. No. 3,390,606, issued July 2, 1968, utilize "active" medium ring configurations and are commonly known as "ring laser gyroscopes." These ring laser gyroscopes comprise tuned resonant cavities wherein the angular rotation rate of the ring configuration is proportional to an observed beat frequency between the oppositely travelling waves within the cavity. However, such active medium ring lasers have problems associated with the phenomena of "mode pulling" and "frequency lock-in" commonly known to those skilled in the art of optical system designs. These phenomena are experienced when the frequency difference between the oscillating waves becomes small, for example, less than 500 Hz. Optical coupling occurring within the active medium tends to "pull" the frequencies of the oscillatory waves together (mode pulling) and ultimately "locks" them together (frequency lock-in) into one frequency, thereby eliminating beat frequency at the low frequency differences which would be observed in ring laser gyroscopes operating in aircraft or missile navigation systems.

Rate sensing devices have also been developed utilizing "passive" ring configurations wherein the ring configuration is a tuned cavity arrangement with externally generated counter-propagating waves. As the ring configuration is rotated, the counter-propagating waves exhibit differential frequencies and, like the ring laser systems, a corresponding beat frequency is observed therebetween which is proportional to the rate of rotation. Bias variation effects such as high temperature sensitivity tend to produce inherent beat frequency instabilities when the tuned cavity ring configurations comprise adjustable mirrors or similar arrangements. If optical fibers are utilized in the ring configurations, as may be necessitated to minimize instabilities, cavity length control becomes extremely difficult.

Another problem associated with any optical system employing signals having differential frequencies is that various bias effects can operate in a non-reciprocal manner dependent upon wave frequencies. Such bias effects are cumulative over time and can result in observed finite beat frequencies even though there is no actual angular rotation of the ring configuration.

The state of the art of integrated optics and, more specifically, optical fiber and laser design is now at a stage whereby compact instrumentation comprising passive ring interferometers can be designed with coiled multiple turn fiber optic rings capable of producing a measurable Sagnac effect phase shift over a substantially wide range of rotation rates as required in aircraft and missile applications. It should be apparent from Equation 1 that increasing the number of ring turns correspondingly increases the magnitude of Sagnac phase shift for a given rotation rate. These passive ring interferometers utilize single mode counter-propagating waves and avoid the problems of active medium and dual mode systems as previously described. However, many existing rate sensing devices utilizing the aforementioned state of the art optical technology still exhibit inaccuracies caused by inherent problems such as poor resolution over wide dynamic ranges of rotation rates (e.g. low signal to noise (S/N) ratios), and sensitivity to intensity and wavelength variations of source-generated signals.

To illustrate certain of the aforementioned problems and for purposes of understanding the invention, FIG. 1 depicts, in block diagram form, a prior art rate sensor 100 having a passive ring Sagnac interferometer 101. The subsequent discussion herein regarding the Sagnac effect will be somewhat cursory in that detailed principles of such interferometers are well-known in the art and, for example, are described in Schneider, et al, *Journal of Applied Optics*, Vol. 17, p. 3035 et seq. (1978).

Interferometer 101 comprises a laser source 102 capable of generating an optical signal on conductor 104 having a nominal wavelength $L_o$. Conductor 104 and other conductors described herein can comprise any one of several types of paths capable of transmitting optical signals. The optical signal on conductor 104 is applied to a beam split/recombine circuit 106 as shown in FIG. 1. The circuit 106 is an isolation/coupler circuit well-known in the art of optical circuit design, and divides the optical signal on conductor 104 into two equivalent counter-propagating signal waves transmitted on conductors 108 and 110. The signal waves will be referred to as the clockwise signal (CW) wave 112 as transmitted on conductor 108 and the counter-clockwise (CCW) signal wave 114 as transmitted on conductor 110. The waves 112 and 114 are applied, respectively, to the two ring ports 116 and 118 of a multiple turn fiber optic passive ring 120. Included in the path of conductor 110 is a phase bias circuit 122 which will be described in subsequent paragraphs herein. The fiber optic ring 120 is coiled such that it comprises a radius R and a path length L. The CW wave 112 and CCW wave 114 traverse the paths of ring 120 in opposite directions and emerge from the ring on conductors 110 and 108, respectively. The returning propagating waves are then applied through circuit 106 and recombined such that a combined signal wave referred to as CS wave 124 is transmitted on conductor 126 as shown in FIG. 1.

The returning CW wave 112 and CCW wave 114 will have experienced a relative Sagnac phase shift having a magnitude and directional sense linearly proportional to the angular rotation rate of the passive ring 120. If the phase shift is characterized as $P_s$ and the angular rotation of the passive ring as $G_I$, then Equation 1 defines the proportional relationship. For purposes of subsequent discussion relating to the prior art and the principles of the invention, this proportional relationship will be referred to herein as scale factor $K_S$, whereby $P_S = K_S G_I$.

Ignoring for a moment the function of the depicted phase shift bias circuit 122 and any constant predictable phase shifts within the interferometer 101, the recombined CS wave 124 will be reflective of the Sagnac effect phase shift $P_S$ and can be applied on conductor 126 as an input signal to a photodiode 128. CS wave 124 will "impinge" on the photodiode 128 with a fringe pattern well known in the art of optical physics. The "low order" fringe pattern, that is, the areas between alternate light and dark bands near the center of the fringe pattern, will vary in intensity in accordance with the relative phase of the recombined counter-propagating waves 112 and 114 as represented by CS wave 124. The current output signal of photodiode 128 on conductor 130 is representative of the intensity of the "zero order" portion of the low order fringe pattern. For purposes of description, this intensity signal will be referred to as signal S and can be applied as shown in FIG. 1 to various readout circuits 132 which provide a measurable output signal on conductor 134 corresponding to the signal S.

As known in physical optics theory, the signal S on conductor 130 can be described in terms of the following equation:

$$S = I_o \cos^2 (P_s/2) \tag{Equation 2}$$

where $I_o$ is the maximum signal intensity and $P_s$ the relativistic phase shift occurring due to the Sagnac effect as previously described with respect to Equation 1. FIG. 2 depicts the sinusoidal variation of signal S relative to the Sagnac phase shift $P_s$. S is symmetrical about the intensity signal axis with the intensity having a value $I_o$ for a zero valued $P_s$. As shown in FIG. 2, if the intensity of signal S is measured as a value $S_1$, then a corresponding magnitude of Sagnac phase shift $P_1$ will be observed by computation in accordance with the known functional relationship between intensity signal S and Sagnac phase shift $P_s$ (Equation 2). As previously described with respect to Equation 1, $P_s$ is linearly proportional to the angular rotation rate for a specific passive ring configuration and a constant wavelength signal source. Accordingly, the magnitude of signal S provides an observable determination of rotation rate $G_I$. Other conventional circuitry can be utilized to provide indication as to the polarity, i.e. directional sense, of the phase shift and to further determine whether the phase shift is between 0° and 90°, or 90° and 180°, etc.

The readout circuits 132 can comprise various types of circuits for obtaining a measurement of the intensity of signal S. For example, signal S can be sampled with associated analog to digital (A/D) conversion circuitry periodically every T seconds. The resulting output of such digital mechanization can be a binary word proportionally representative of the angular rotation rate $G_I$ each period. The period T must be chosen sufficiently small to preclude loss of substantial signal information when computing the angular displacement from the samples of intensity signal S.

As previously noted, several problems exist in basic implementations of rate sensors employing passive ring Sagnac interferometers as depicted in FIG. 1 when utilized in inertial reference systems The relationship between the intensity signal S and the Sagnac effect phase shift $P_s$ is a non-linear sinusoidal $\cos^2$ wave form as described in Equation 2. The physically realizable values of $P_s$ will be extremely small with respect to the wavelength $L_o$. Accordingly, the actual measured intensity $S_1$, corresponding to a Sagnac phase shift $P_1$, will be close to the maximum "peak" of the wave form of the signal S. Therefore, measurement of changes in Sagnac phase shift by measuring changes in magnitude of signal S is extremely difficult. Thus, within this area of operation, the non-linear relationship between the intensity signal S and the Sagnac phase shift $P_s$ limits the useful range of rate measurements when utilizing conventional measurement techniques such as digital sampling. That is, any type of digital sampling to obtain an estimation of the Sagnac phase shift will be limited by the minimal sensitivity occurring at the peak of the wave form of signal S near the phase shift axis origin.

Another problem in prior art systems is related to possible intensity variations of the signal S. Such variations can readily occur due to laser source variations or transmission losses within the optical conductive paths of interferometer 101. FIG. 3 depicts the effect of signal intensity changes with the nominal wave form of signal S shown in dotted lines and the intensity varied signal shown in solid lines. As apparent therefrom, an intensity change in signal S can result in an erroneous determination $P_E$ of the Sagnac phase shift $P_S$ for a measured signal magnitude $S_1$. This erroneous determination will thus result in an erroneous calculation of the angular rotation rate $G_I$.

Another difficulty with interferometer 101 is the possibility of obtaining erroneous measured rates due to variations in wave length of the optical signals. For example, a typical optical beam generated through a laser diode has a wavelength which is temperature dependent and may vary in the range of 0.03% per degree Centigrade. FIG. 4 depicts the effect of wavelength changes where the intensity pattern of signal S with a nominal wave length $L_o$ is shown in dotted lines and the varied pattern of signal S with an actual wavelength $L_E$ is shown in solid lines. Again, such wavelength changes result in an erroneous determination $P_E$ of the Sagnac phase shift $P_s$ for a measured signal magnitude $S_1$.

Another problem associated with utilizing interferometers in applications such as missile navigation systems, where substantial accuracy is required over a wide dynamic range of rotation rates, relates to the requisite navigation resolution within the range. For example, such a navigation system can require output signals indicative of rotation rate throughout a range of 1000° per second to 1° per hour, i.e. a range ratio of $3.6 \times 10^6$ to 1, assuming constant resolution within the range. If a measurement technique such as digital sampling is utilized to estimate the magnitude of signal S, a 22 bit (plus sign) binary word must be utilized for purposes of analog to digital conversion. The necessity of such large scale data words is prohibitive to the use of small scale and high speed A/D converters as required for aircraft and missile guidance control systems. Still another problem associated with the requisite wide dynamic range pertains to the signal to noise ratio. In accordance with conventional communication theory, a 131 db S/N ratio is required for a $3.6 \times 10^6$ dynamic range. In physically realized passive rate interferometers comprising the circuitry shown in FIG. 1, the S/N ratio will actually be closer to a value of 75 db.

Certain prior art systems employing passive ring interferometers have attempted to overcome the previously-discussed problem of intensity signal insensitivity to Sagnac phase shift changes by introduction of a phase bias circuit 122 into the optical conductive path 110 as shown in FIG. 1. Circuit 122 is a conventional circuit which induces a substantially constant phase shift in wave signals transmitted on conductor 110. The externally-applied phase shift modifies the previously-described relationship of signal S to Sagnac phase shift disclosed in Equation 2 to the following:

$$S = I_o \cos^2 \tfrac{1}{2}(P_B + P_s) \qquad \text{(Equation 3)}$$

where $P_B$ is the externally induced phase shift applied from phase bias circuit 122.

The induced phase shift $P_B$ causes the relational pattern of output signal S to be "shifted" with respect to the Sagnac phase shift $P_s$. FIG. 5 depicts in dotted lines the relationship between signal S and Sagnac phase shift $P_s$ with no externally-induced phase shift, and further depicts in solid lines the effect on the same relationship of the induced phase shift $P_B$. As apparent from FIG. 5, the measured intensity $S_1$ with induced phase shift $P_B$ and corresponding to a Sagnac phase shift $P_1$ will be on a substantially linear and "maximum slope" portion of the relational pattern. In accordance with conventional digital sampling and communication theory, such a system will be substantially more sensitive to changes in Sagnac phase shift due to angular rotation rate changes than will a system where the expected values of phase shift occur on or near peaks and valleys of the sinusoidal intensity signal wave pattern.

One known gyroscope apparatus utilizing a passive fiber ring interferometer and generally employing phase bias circuitry was invented by W. C. Goss and R. Goldstein, and is described in the "Technical Support Package on Optical Gyroscope for NASA Technical Brief", Vol 3, No. 2, Item 25, JPL Invention Report 30-3873/NPQ-14258 published by Jet Propulsion Laboratory, California Institute of Technology, Pasadena, Calif., and dated October, 1978. The Goss et al optical gyroscope comprises a passive ring Sagnac interferometer for measuring rotation rates in accordance with the Sagnac phase shift principles previously discussed herein. Output signals are generated at two optical detectors having a response pattern indicative of the resultant phase shift due to angular rotation of the passive fiber ring.

A bias cell utilizing commonly-known "Faraday effect" principles is introduced into the optical paths of the interferometer to provide a constant 45° advance of one wave, 45° retardation of the other wave, and phase offset compensatory for the Sagnac effect phase shift. The overall effect of the bias cell is to "shift" the response pattern of the output signals such that changes in signal intensity are maximized for corresponding Sagnac phase shift changes, thereby providing maximum measurement sensitivity. A fiber optic reversing switch is also included in the optical paths to minimize the phase shift effects of such reciprocal phenomena as long-term source drift, etc. However, the Goss apparatus does not provide complete resolution to inaccuracies in measuring rotation rates with passive ring Sagnac interferometers caused by inherent problems such as sensitivity to short term source intensity variations and optical path losses, wavelength dependency, lack of sufficient signal to noise ratio and insufficient operational dynamic range.

A substantial technological advance over other rate sensing devices is described and claimed in the commonly-assigned Carrington et al U.S. Pat. No. 4,456,376 issued June 26, 1984. In Carrington et al, an optical rate sensor is disclosed which substantially corresponds to the rate sensor 200 depicted in FIG. 6. The rate sensor 200 is somewhat similar to the previously-described optical rate sensor 100 in that it comprises a passive ring Sagnac interferometer 202 having a laser source 204, optical isolation/coupler circuit 206 and a multiple turn optical fiber ring 208.

The laser source circuit 204 provides a means for generating a single transverse mode linearly polarized optical signal DS on conductor 210 with a nominal wavelength of $L_o$. Any of several types of source circuits could be utilized for the laser source circuit 204. The optical signal DS on conductor 210 is applied as an input signal wave to optical isolation/coupler circuit 206. Circuit 206 provides a means for dividing the signal DS into two substantially equivalent wave signals separately transmitted on conductors 212 and 214. These equivalent signal waves are characterized as "counterpropagating" waves for purposes made apparent subsequently herein, and are further referred to as clockwise (CW) wave signal 216 and counterclockwise (CCW) wave signal 218 transmitted on conductors 212 and 214, respectively. Waves 216 and 218 are substantially equivalent single transverse mode waves each having a nominal wavelength of $L_o$.

The CW wave signal 216 on conductor 212 is directly applied to one ring port 220 of the optical fiber ring 208. The CCW wave signal 218 on conductor 214 is applied as an input to ring port 222 of the fiber ring 208. However, a phase modulator circuit 224 is connected intermediate the isolation coupler circuit 206 and the fiber ring 208 on the conductive path 214. The function of the phase modulator circuit 224 will be subsequently described herein.

The fiber ring 208 can be circular in structure with a radius R and a physical path length L. Ring 208 provides a preferable ring configuration necessary for operation of the Sagnac interferometer 202 and will be more functionally described in subsequent paragraphs herein. Returning to connections in circuitry associated with the isolation/coupler circuit 206, a conductor 226 is directly connected to the coupler circuit 206 and also to an input terminal of photodiode circuit 228. The photodiode 228 provides a means for generating a current signal on conductor 230 which is representative of a sampled portion of a low order fringe pattern of the wave signal appearing on conductor 226.

Connected to the photodiode 228 by means of conductor 230 is a photodiode transconductance amplifier 232 which provides a means for converting low level output current from the photodiode 228 on conductor 230 to a voltage level signal on conductor 234, with the signal level being of a magnitude suitable for subsequent sampling and analog to digital (A/D) conversion functions. Connected to an output terminal of transconductance amplifier 232 by means of conductor 234 is an anti-aliasing filter circuit 236. The filter 236 comprises a means for preventing high frequency noise signals from the voltage signal appearing on conductor 234 from folding over into the lower frequency signal associated with the time-variant angular rate after A/D sampling of the analog signal from the photodiode 228 has occurred.

The output signal of the anti-aliasing filter 236 is applied on conductor 238 as an input to a conventional sample/hold (S/H) circuit 240. Circuit 240 provides a means for obtaining sampled signals transmitted from the filter 236 on conductor 238 and is controlled by clock pulses on conductor 242 and 244 generated from master clock 246.

Connected to the output of the S/H circuit 240 by means of conductor 248 is an A/D conversion circuit 250 Circuit 250 comprises a means for converting the sampled signals transmitted from circuit 240 to digital signals for purposes of subsequent operations. The A/D circuit 250 is controlled by means of clock pulses applied on conductor 244 from master clock 246. The clock pulses operate as "start" pulses for performance of the A/D conversion. In known systems in accordance with the Carrington et al patent, the A/D circuit 250 can comprise, for example, 12 binary information bits, thereby providing a resolution of 4,096 levels per sampled signal. A conversion time of 200 nanoseconds or less is considered suitable for purposes of utilizing the rate sensor 200 in various aircraft and missile applications.

The A/D circuit 250 is directly connected by means of conductor 252 to a sample register 254 comprising a means for storage of digital information signals representative of a plurality of sampled signals from the S/H circuit 240. Register 254 can comprise, for example, a 128 "first-in first-out" (FIFO) information word memory, each word having 12 bits of information.

The A/D circuit 250 is also connected to an overflow logic circuit 256 by means of conductor 258 as shown in FIG. 6. Sample signal levels having a magnitude greater than a predetermined level would not be stored in the A/D circuit 250, and the occurrence thereof would cause a pulse to be applied to the logic circuit 256 by means of conductor 258. The logic circuit would be reset by means of clock pulses occurring on conductor 260 as generated from the master clock 246.

The logic circuit 256 would also provide two state signals to register 262. Register 262 could be equivalent in structure and design to the register 254 and provide means for storage of a plurality of clock information signals representative of clock times corresponding to the measured times of the associated signal samples stored in register 254. These representative clock signals could be applied to the register 252 by means of clock register 264 through conductor 266. Clock pulses from master clock 246 transmitted on conductors 244 and 260 could be utilized as input signals to the register 264 to provide a sequential implementation function to achieve the requisite clock signal information within register 264. Register 264 could also comprise, for example, storage for 12 binary information signals, thereby providing 4,096 clock signal levels.

The clock register 262 and the sample register 254 are connected to a central processing unit (CPU) 268 by means of conductors 270 and 272, respectively. The conductors 270 and 272 provide a means for transmitting the binary information signals stored in registers 262 and 254 directly to the CPU 268. These conductors allow bidirectional transmission and also provide a means for the CPU 268 to selectively address the information words within the registers 262 and 254. In this particular type of configuration, the CPU 268 does not provide any specific control of the operation of the various sampling, A/D conversion and register circuitry previously described herein. The circuits operate strictly under the control of the master clock 246, and CPU 268 is merely capable of addressing the registers 262 and 254 to obtain transmission of the binary information signals stored therein directly to conventional memory units within the CPU 268. Specific functions achieved by CPU 268 are more fully described in subsequent paragraphs herein.

Returning to aspects of the optical rate sensor 200 associated with the phase modulator circuit 224, the master clock 246 is directly connected to a counter 274 by means of conductor 276. Counter 274 is a conventional binary counter which provides a means for generating sequential information signals to additional circuitry subsequently described herein. The counter 274 is clocked by clock pulses provided on conductor 276 by the master clock 246. Counter 274 can, for example, comprise a 12 bit binary information storage memory sequentially incremented at a 2 MHz rate from clock pulses supplied on conductor 276. The counter 274 can also receive information signals from the CPU 268 by means of conductor 278. In addition, and as subsequently described herein, information signals provided on conductor 278 can be utilized for purposes of initialization of phase modulation cycles and selection of particular modulator patterns to be utilized.

The counter 274 is connected by means of conductor 280 to a phase state register 282 as also depicted in FIG. 6. Phase state register 282 provides a means for storage and transmission of digital information signals to which the phase modulation circuit 224 is responsive to provide a particular modulator pattern. Phase state register 282 can, for example, comprise a parallel output of 12 binary information signals with storage capability of 4,096 12-bit binary information words.

The output of the phase state register 282 is directly connected to a digital to analog (D/A) converter 284 which provides a means for converting the digital signals received on conductor 286 to corresponding analog signals which are applied as output signals on conductor 288. D/A converter 284 can be any suitable conversion circuit capable of providing latched analog output signals corresponding to 12-bit binary input signals with a conversion and settling time of less than approximately 200 nanoseconds.

The D/A converter 284 is connected by means of the conductor 288 to a phase modulator driver amplifier 290. Driver 290 provides a means for converting the analog signals transmitted from converter circuit 284 to suitable voltage signal levels on conductor 292 for operating the phase modulator circuit 224. For example, the output voltage signals on conductor 292 can comprise a 5 microseconds alternating polarity pulse pattern with amplitude variation of 0 to ±20 volts. A suitable loading for the driver 290 is provided by the capacitive input of the electro-optical phase modulator 224. The driver 290, converter 284, phase state register 282 and counter 274, with associated clock control from master clock 246, comprise a control means for achieving a particular pattern of phase modulation within the modulator circuit 224.

Although not shown in FIG. 6, the optical rate sensor 200 can also include a means for achieving temperature compensation for measurements of angular rotation rates. The compensation arrangement can include a temperature monitor connected to the phase modulator 224, with additional circuitry to convert monitor signals into appropriate signals capable of storage and input to the CPU 268.

In operation, the CW wave signal 216 on conductor 212 is directly applied to the ring port 220 of the fiber ring 208. Correspondingly, the CCW wave signal 218 on conductor 214 is applied through the phase modulator circuit 224 which induces a time-variant phase shift in the CCW wave 218. The magnitude of the phase modulation shift at any given time is directly dependent and proportional to the driving voltage signal applied on conductor 292 from the previously described driver 290. The CCW wave signal 218 is thus phase modulated and applied to the ring port 222 of the fiber ring 208.

The wave signals 216 and 218 thus propagate in opposing directions through the fiber ring 208.

As the waves 216 and 218 propagate through and emerge from the fiber ring 208, the phase modulator circuit 224 has been driven to a different phase shift value during the transit time, since the time of duration for each level of phase shift is made to substantially correspond to the ring transit time. The counter propagating wave which appears on conductor 214 as it emerges from the fiber ring 208 is then applied to the phase modulator circuit 224 and transmitted therefrom directly to the isolation/coupler circuit 206. The counter propagating wave emerging from the fiber ring 208 on conductor 212 is directly applied to the coupler circuit 206.

Coupler circuit 206 then operates to recombine the waves 216 and 218 into a combined wave characterized as CS wave 294 transmitted on conductor 226 as depicted in FIG. 6. As previously described with respect to passive ring Sagnac interferometers in general, the counter propagating waves 216 and 218 will have a relative Sagnac phase shift therebetween which is directly proportional to the angular rotation rate $G_I$ of the passive fiber ring 208. This Sagnac induced phase shift will result in the CS wave 294 having a low order fringe pattern representative of the magnitude and direction of the Sagnac phase shift. The CS wave 294 can be characterized as the output signal wave from the passive ring interferometer 202, and having information indicative of the magnitude and direction of the Sagnac phase shift due to angular rotation rate $G_I$ of the ring 208.

The CS wave 294 on conductor 226 is then applied as an "impinging" signal to the photodiode 228. The photodiode 228 generates an output current signal on conductor 230 having an intensity representative of a given point of the "low order" fringe pattern of CS wave 294 and, accordingly, is representative of the relative phases of CW wave 216 and CCW wave 218.

The current output signal on conductor 230 is directly applied as an input signal to the transconductance amplifier 232 which, as previously described, provides a voltage output signal on conductor 234 having a level suitable for subsequent functional operations thereon. In FIG. 6, the signal on conductor 234 is characterized as intensity signal S.

As previously described, the relationship of an intensity signal S to a Sagnac phase shift $P_S$ and fixed induced phase shift $P_B$ is shown in Equation 3. However, in accordance with the Carrington et al arrangement, wherein a time-variant nonreciprocal phase shift is applied to the counter-propagating waves 216 and 218, the relationship of the intensity signal S to Sagnac phase shift $P_S$ is the following:

$$S = I_o \cos^2 \tfrac{1}{2}(P_B(t) + P_S(t)) \qquad \text{(Equation 4)}$$

Where $P_B(t)$ is the known induced nonreciprocal phase shift applied from phase modulator circuit 224 and $P_S(t)$ is the rate proportional Sagnac phase shift.

As described in the Carrington et al patent, the phase shift $P_B(t)$ applied through the phase modulator circuit 224 can be varied rapidly in time in a periodic manner relative to expected rates of change of rotation. This actual phase shift applied by modulator circuit 224 can be directly proportional to the driving voltage applied on conductor 292 by driver 290. An exemplary waveform for this driving voltage pattern is depicted in FIG. 7. Each level of driving voltage has a direct and proportional correspondence with a magnitude of phase shift applied by modulator circuit 224 within the range of $-\pi$ to $+\pi$ radians. The time period $T_P$ for each modulator voltage level could, for example, be a period of five microseconds or a similar duration, and would correspond to the wave transit time through the fiber ring 208. In addition, it is also possible to vary the modulator drive pattern such that $T_P$ is a much shorter time interval than the ring transit time. By utilizing such a shorter drive voltage time period, a faster rate of output of the measured angular rotation rate could be achieved.

For purposes of subsequent description, the phase modulator phase shift symbol "$P_B$" will be understood to be a function of time t. With the phase modulator circuit 224 providing a phase shift $P_B$ proportional to the output voltage of the driver 290, and with the time-variant phase shift varied rapidly over the range of − to + radians, the pattern of the intensity signal S as a function of the modulator phase shift $P_B$ (and, accordingly, as a function of the voltage drive pattern) will appear similar to the sinusoidal functional relationship of the signal S versus Sagnac phase shift $P_S$ previously described and depicted in FIG. 2 when there is a substantially zero rate of angular rotation $G_I$ of the passive ring 208. However, the abscissa axis of this wave pattern will now be the externally applied phase shift $P_B$, rather than the Sagnac phase shift $P_S$ as depicted in FIG. 2.

With the scanning rate of the modulator circuit 224 sufficiently rapid relative to the rate of change of angular rotation, and with a voltage drive pattern comparable to that depicted in FIG. 7, the effect of nonzero angular rotation rate of the passive ring 208 is to cause a relational pattern of signal S relative to modulator phase shift $P_B$ to translate to the left or right of the voltage drive axis origin as depicted in FIG. 8. The specific magnitude and direction of translation, characterized herein as "phase offset," can be readily shown to directly correspond to the magnitude and direction of observed Sagnac phase shift $P_S$. Accordingly, and as shown in FIG. 8, the modulator phase shift $P_B$ corresponding to the maximum "peak" of intensity signal S which occurs at the abscissa origin when the angular rotation rate is substantially zero will correspond to the Sagnac phase shift $P_S$. The measurement of the "peak offset" corresponding to the offset of the intensity signal from its position when zero angular rotation is applied to the fiber ring 208 will provide a determination of the Sagnac effect phase shift.

Basically, this offset is measured in units of effective modulator differential voltage where the differential time interval implied thereby is the fiber ring optical transit time. By utilizing measurement means of the peak offset as subsequently described herein to determine the Sagnac-induced phase shift, the Carrington et al arrangement overcomes a number of inherent problems previously discussed with respect to the optical rate sensor 100 depicted in FIG. 1.

For example, the rate sensor 200 includes arrangements for determining the offset of the intensity signal S relative to the modulator drive voltage by means of center biasing intensity signal S and determining zero-crossing locations immediately before and after a peak or valley. The functional relationship between the signal S and the modulator drive voltage (and to the modulator phase shift proportional to the drive voltage) after center biasing is accomplished as shown in FIG. 9, with the modulator drive voltage corresponding to the peak offset shown as voltage $V_S$ and the Sagnac induced phase shift corresponding thereto as phase shift $P_S$. To obtain the zero-crossing locations, the S/H circuit 240 will sample the intensity signal S at various regions of the signal pattern shown as the "sampled region" in FIG. 9. In accordance with conventional communication sampling theory, the samples obtained at zero or minimum sloped regions of the intensity pattern do not substantially contribute to determination of the zero-crossing locations. Accordingly, the optical rate sensor 200 utilizes only the sample signals which correspond to the region substantially between ±45° of the maximum sloped positions which correspond to the zero-crossing locations.

This sampled region is determined by prestorage of a magnitude level within the A/D converter 250 which corresponds to a magnitude above which the intensity signal S can be characterized as being outside of the sampled region. As the sample signals are applied from S/H circuit 240 to the A/D converter 250, they are stored in sample register 254 until a magnitude of intensity signal sample is received which is above the predetermined magnitude corresponding to the thresholds of the sampled region. When such a signal is received, a trigger pulse is applied to the overflow logic circuit 256 by means of conductor 258. Similarly, a trigger pulse is also applied on conductor 258 when the magnitude of signal samples goes from a greater value to a lesser value than the threshold levels of the sampled region.

The overflow logic circuit 256 utilizes the trigger signals applied on conductor 258 to apply start and stop signals directly to the sample register 254 and clock register 262. During the time that the intensity signal samples are within the sampled region thresholds, the A/D converter 250 sequentially applies digital signals representative of the analog sample signals to storage locations in the sample register 254. Correspondingly, the clock register 264 applies associated clock signals to the clock register 262 to provide a time correspondent of the sample signals stored in register 254.

At appropriate times as subsequently described herein, the sample signals stored in register 254 and corresponding clock signals stored in register 262 are applied to the CPU 268. CPU 268 can be any appropriate processor circuit capable of determining the zero-crossing locations of the relational signal pattern S from the samples obtained in registers 254 and 262.

Referring again to FIG. 9, the zero-crossing locations of the intensity signal pattern S are characterized as corresponding to modulator drive voltages $V_{C1}$ and $V_{C2}$. When these voltages have been determined, the voltage corresponding to the location of the peak offset of the relational pattern of the intensity signal S is effectively the average of voltages $V_{C1}$ and $V_{C2}$ and is shown in FIG. 9 as $V_S$. As previously described, the modulator drive voltage corresponding to the intensity signal peak will directly correspond to the Sagnac induced phase shift $P_S$ which, in turn, is linearly proportional to the angular rotation rate $G_I$.

Again referring to the inherent problems previously discussed with respect to other optical rate sensors such as sensor 100 depicted in FIG. 1, the offset position of the peak is not altered by intensity changes of signal S. Furthermore, the peak offset as determined by the average value between the voltages corresponding to the zero-crossing locations is also not altered. In addition, the determination of the peak offset by utilizing he zero-crossing locations is substantially immune to the effect of laser source wavelength changes. Accordingly, the voltage $V_S$ corresponding to the peak can be calculated by determination of zero-crossing locations regardless of the wavelength of the intensity signal corresponding thereto.

Still further, the nonlinearity of the intensity signal S relative to the phase shifts $P_B$ and $P_S$ is of no substantial concern due to the utilization of zero-crossing detection to determine the peak offset corresponding to the modulator drive voltage $V_S$. The zero-crossing locations are utilized to infer the phase shift corresponding to the peak offset and are linear with respect to rotation rate. Additionally, by taking a substantially large number of samples of the intensity signal S over the linear portion of the $cos^2$ waveform, certain optimal techniques to determine cross-over locations can be effected within the CPU 268 as described in subsequent paragraphs herein.

Referring to more specific detail of the phase modulation circuit 224 and associated control circuitry, the counter circuit 274 is controlled by clock pulses derived from master clock 246 and transmitted thereto on conductor 276 The counter 274 comprises a parallel 12-bit output signal which can be utilized to directly address storage locations of the register 282. Counter 274 is triggered by the clock pulses occurring on conductor 276 and provide a count output signal in the range of 0 to 4,095 levels. Counter 274 can be controlled by start and reset pulse signals from CPU 268 on conductor 278. Conductor 278 also provides a means for varying the starting count for purposes of modifying modulator scans for reasons subsequently described herein.

As the counter 274 provides sequential binary output signals applied to the phase state register 282, register 282 is responsive to these signals to address a word location therein and generate an output signal on conductor 286 corresponding to the stored information signals within the address word location. The information signals stored in these word locations correspond to digital information signals representative of particular voltage levels which will be applied to the phase modulator circuit 224 to cause phase shifts of the counter-propagating waves 216 and 218 relative to the interferometer 202 over the time of one ring transit.

The output signals from the register 282 are directly applied to the D/A converter 284 by means of conductor 286. D/A converter 284 converts the digital information signals corresponding to the modulator voltage to be applied to modulation circuit 224 to corresponding analog signals. These analog signals are transmitted on conductor 288 to the previously-described driver 290. The driver 290 provides an appropriate interface to the modulator circuit 224 and applies voltage levels on conductor 292 in accordance with the voltage drive pattern previously described and depicted in FIG. 7.

As also previously discussed, it is possible to utilize certain conventional techniques commonly known in the art of communication circuit design to enhance the determination of zero-crossing locations and, accordingly, provide relatively high resolution in determining the angular rotation rate $G_I$ of the passive ring 208. In the rate sensor 200 depicted in FIG. 6, the function can be provided in part by utilization of information processing within CPU 268. For example, the information processing and control functions can be accomplished in part by dividing the same into certain real time sequences relating to the following functions: executive sequence control, zero-crossing and peak offset determinations, optimal estimation of peak offset, output of signals representative of angular rotation rate, phase modulator scan initiation, background tasks and recovery sequences for processing of erroneous zero-crossing information signals. A sequence diagram for these functions is depicted in FIG. 10, and a timing diagram showing the relationship of circuit functions performed by circuitry external to CPU 268 to the sequential functions performed within CPU 268 is depicted in FIG. 11.

Referring to FIGS. 6 and 11, a particular phase modulation cycle can be initiated by application of a reset signal to the counter 274 from CPU 268 by means of conductor 278. The phase modulation control circuitry comprising counter 274, register 282, D/A converter 284 and driver amplifier 290 provides sequential control of the phase modulator circuit 224 such that the modulator is driven through one period of a complete phase shift modulation pattern. This particular cycle will be characterized herein, for purposes of description, as an "even" cycle. Following the occurrence of the reset signal on conductor 278 and an appropriate predetermined delay time for purposes of allowing all circuitry to reinitialize, the S/H circuit 240 and associated A/D conversion circuit 250 accumulate sample signals from the intensity signal S and apply digital information signals representative of the analog sample signals to the sample register 254, while corresponding clock information signals are applied to the clock register 262. When the digital information signals surrounding the first zero-crossing are accumulated, the signals from registers 254 and 262 are applied to the CPU 268 by means of conductors 272 and 270, respectively.

Following the transmission of signal samples around the first zero-crossing to the CPU 268, the CPU 268 operates to determine a modulator drive voltage corresponding to the first zero-crossing of intensity signal S. When the sampled magnitude of intensity signal S is again within the sampled region depicted in FIG. 9, signal samples are again transmitted to the register 254, with corresponding clock signals transmitted to register 262. When all sample signals have been received by the register 254 within the threshold magnitudes corresponding to the sampled region, the samples are again transmitted to the CPU 268. CPU 268 again operates to determine the modulator drive voltage corresponding to the second zero-crossing of intensity signal S. Following the determination of the first and second zero-crossing locations, the determination of the modulator drive voltage corresponding to the peak offset is accomplished by averaging the modulator voltages corresponding to the first and second zero-crossings as previously described. It should be noted from the timing sequence diagram in FIG. 11 that the functions of zero-crossing and peak offset determination performed within CPU 268 can occur simultaneously with sampling and A/D conversion of intensity signal S. Accordingly, the sampling and digital conversion functions of the rate sensor 200 are independent of zero-crossing and peak offset determination functions implemented by means of the CPU 268.

When the phase modulation circuit 224 has completed the "even" cycle phase shift pattern, a reset signal is again applied from CPU 268 by means of conductor 278 to the counter 274. The counter 274 is responsive to this signal to initiate a new phase modulator pattern cycle described as the "odd" phase modulator pattern cycle. During the cycle, third and fourth zero-crossing locations and modulator drive voltages corresponding thereto are determined in a manner similar to the previously described determination of the first and second zero-crossing locations. A second peak offset determination is then made which corresponds to the average values of the modulator drive voltages corresponding to the third and fourth zero-crossings.

The times of occurrence of the two peak offsets determined by utilization of the first/second and third-/fourth zero-crossing locations will differ and are utilized by CPU 268 as an input to a conventional optimal estimation sequence to provide a recursive estimate of the modulator drive voltage corresponding to the peak location and, hence, the Sagnac phase shift. The CPU 268 can then determine both an incremental angle and an angular rate of rotation by means of the known parameters of the various components of rate sensor 200, and can generate signals on conductors 296 and 298, respectively, corresponding thereto.

One problem particularly associated with optical rate sensors employed in aircraft and missile applications relates to the utilization of zero-crossing locations to determine a peak offset corresponding to the Sagnac-induced phase shift. Specifically, it is preferable that two and only two zero-crossings occur within any given scan of the phase modulator circuit 224. If more than two zero-crossing locations are present, extensive circuitry would be required to determine these crossings occurring immediately before and immediately after the peak of intensity signal S corresponding to the modulator phase shift equivalent to the Sagnac effect phase shift. However, an output rate for determination of the angular rotation rate is desirable in the range of 400 Hz. Accordingly, the phase modulation circuit 294 is required to complete two phase shift scans within 2500 microseconds. For an angular rotation rate which can have a maximum of 1000° per second and for an interval of 45° between zero-crossings, the phase modulator circuit 224 must be capable of scanning between $\pm 4\pi$ radians if the central peak is to be properly tracked and detected utilizing the zero-crossing locations of the intensity signal S. However, the capability of scanning across 8 radians in less than 1,250 microseconds with a 12-bit D/A conversion level for the modulator drive voltage pattern would allocate only a 0.035 microseconds maximum time per drive voltage state. Such a state time is entirely too small for utilization of the state of the art electronic components.

To overcome this problem, the nonreciprocal phase modulation scan provided by the modulator circuit 224 has an $8\pi$ radians length, but is divided into multiple overlapping "scanning windows" each having a length of $2\pi$ radians. By utilization of a $2\pi$ scanning window length, two and only two zero-crossings are present in any given scan.

To achieve the effect of an $8\pi$ scan length with scanning windows of $2\pi$ radians, the CPU 268 comprises scan initialization logic capable of determining an appropriate scanning window in accordance with the relative positions of the detected peak offsets within prior modulator scans. Since the modulator scan has an effective length of $8\pi$ radians, an actual $2\pi$ modulator scan utilizes only ¼ of the possible modulator voltage level states as defined by the digital information signals stored in the phase state register 282. Following a particular modulator scan, the appropriate logic circuitry within CPU 268 can determine if the current phase modulator scan window should be altered. If the central peak within the current scanning window is not substantially centered within the scan cycle, CPU 268 transmits signals on conductor 278 as depicted in FIG. 6 which cause the counter 274 to address an altered set of information storage locations within the register 282. This altered set of storage locations will then correspond to the new scanning window by applying a differing set of digital voltage signals to the D/A converter 284. Accordingly, the phase pattern produced by the phase modulation circuit 224 can be altered in an appropriate manner to ensure that only two zero-crossing locations are detected within a modulator scan. It is apparent from this discussion that scanning windows of lengths other than $2\pi$ radians can also be utilized, and the scanning windows can overlap and ensure no loss of tracking of the zero-crossing locations.

Referring to the sequence diagram of FIG. 10, the controlling sequence is designated therein as "EXEC" and provides transfer of control of the CPU 268 to background tasks when zero-crossing samples are being received by external circuitry. When zero-crossing A/D sampling is completed, the EXEC sequence can be interrupted and sequential control transferred from the background tasks to the appropriate sequence. As depicted in the timing diagram of FIG. 11, the sequence providing zero-crossing determination is performed after each zero-crossing. Determination of peak location of the intensity signal is performed only after every second scan, i.e. after four zero-crossing detections. Optimal estimation of the Sagnac phase shift is also performed only after every second scan, as is the conversion of the optimally-estimated intensity signal peak offset to an angular acceleration rate signal and an incremental angle signal. Initiation of a new scan for phase modulator 224 must occur after every scan. A recovery sequence for bad zero-crossing location signals can be performed if necessary. When processing for a particular sequence has been completed, sequential control can be returned to the current background task 25 until the next occurrence of an interrupt which will occur at the completion of the next zero-crossing A/D conversion cycle.

Exemplary embodiments of the particular sequences shown in FIG. 10 will now be described. The function of the zero-crossing detection sequence is to determine where zero-crossing locations exist in terms of equivalent differential phase modulator voltage. As previously described, the voltages corresponding to the two zero-crossing locations yield an average value corresponding to the shift of the peak with respect to its location at a zero rate of angular location. These detections can be accomplished by means of conventional methods such as "curve fitting" utilizing the principles of "linear least squares" as commonly known in the art.

The basis for deriving zero-crossing locations using linear least squares techniques is the assumption that the sinusoidal waveform of signal S (after removing its average value) near zero-crossing locations can be approximated by the following linear equation:

$$S(V_z) = a + bV_z \quad \text{(Equation 5)}$$

where $S(V_z)$ is the magnitude of the intensity signal corresponding to a modulator drive voltage $V_z$, a is the $V_z=0$ value of the linear function, and b is the slope of the linear function through the zero-crossing. In accordance with Equation 5, the modulator drive voltage corresponding to the zero-crossing location is:

$$V_z(S=0) = -a/b \qquad \text{(Equation 6)}$$

Conventional linear least squares methods can be utilized to estimate a and b and, accordingly, the modulator drive voltage corresponding to a zero-crossing location. In a physically realized reduction to practice of the invention, values of a and b for a functional relationship of signal samples of intensity signal S and corresponding time could be determined by measurements of sampled pairs of intensity signal S and time (derived from signals generated by master clock 246). For example, with the illustrative embodiment depicted in FIG. 6, a predetermined member of such signal pairs would be stored in clock register 262 and sample register 254. The gain of the transconductance amplifier 232 would be adjusted so that register words were caused to overflow for expected intensity signal samples outside of the sampled region. Accordingly, such signal samples are not included in the derivation of the zero-crossing location.

As previously described, the actual techniques for deriving the parameters of Equations 5 and 6 are commonly-known in the art. For example, such techniques are described in *Advanced Engineering Mathematics*, Wylie, Jr. (McGraw Hill 1966). When the zero-crossing "times" have been determined from the received signal pairs, they can be converted to corresponding differential modulator voltages. The modulator voltage corresponding to the central peak offset (and corresponding modulator phase shift) is then determined as an average of the voltages corresponding to zero-crossing locations. This peak offset voltage is independent of bias shifts in the intensity signal S; provided, of course, that such bias shifts are slow with respect to the modulator scan time.

It should be noted, however, that certain random errors can exist within determinations of the peak offset when using conventional curve fitting techniques, such as "least squares" determinations. Such errors can be caused, for example, by A/D quantization noise, laser diode intensity noise, shot noise within the photodiode 228, Johnson noise within the analog electronics and D/A uncertainty within the basic sampled voltage steps from the intensity signal S. To at least partially overcome these and other random errors, an optimal estimation sequence can be utilized within CPU 268 to better determine the peak offset voltage. Since the statistical parameters of the modulator voltage (mean, type of disturbance noise, etc.) can be readily determined, conventional sequential estimation can be utilized.

For example, a sequential Kalman filter can provide optimal estimates of the true value of the modulator drive voltage corresponding to the central peak of the intensity signal S, even with substantially noisy measurements of this peak location. Processes related to Kalman filters and apparatus thereof are well-known in the art and, for example, are described in such texts as *Probability, Random Variables, and Stochastic Processes*, Papoulis (McGraw-Hill 1965), and *Estimation Theory with Application to Communications and Control*, Sage & Melsa (McGraw-Hill, 1971).

Basically, a Kalman filter can be used to estimate, on the basis of noisy output measurements, the value of an inaccessible state variable of a system driven by stochastic input disturbances. In an optimal rate sensor in accordance with the Carrington et al invention, the Kalman filter estimation process can be used to optimally estimate the true value of he central peak modulator voltage by linearly combining past and present measurements of this modulator voltage such that the mean square errors between the true and expected values thereof are minimized. The utilization of such an optimal estimation technique is advantageous over simple averaging processes, in that it takes into account not only additive measurement noise on the central peak modulator voltage, but also the statistics of the vehicle dynamics.

Using terminology well-known in the art of statistical estimation, a state model is first derived which represents the true value of the central peak modulator voltage as a function of sensor rate correlation time, previous values of central peak voltage, and vehicle dynamics. The measured central peak voltage is represented as a function of both the true voltage value and a noise component representing residual noise from the previously-described zero-crossing/central peak determination. For each discrete Kalman filter "cycle," corresponding to a predetermined filter update rate, an "a priori" mean square estimation error is computed as a function of rate correlation time, previous mean square estimation error computations, and the statistical effects of the previously-described residual noise. The Kalman current measurement "gain" is then computed therefrom which, in turn, is utilized with previous computations to derive an optimal estimate of the central peak modulator voltage in accordance with functional processes well-known in the art.

During the Kalman filter processing, it is inherently desired to derive what is conventionally-known as the "innovations" sequence from the voltage estimates and measurements. This sequence is used for characterizing filter performance by the comparison of the square of the innovation value with the mean square estimation error which itself is derived as part of the filter computation. If the estimation mean square error is repeatedly larger than the innovations sequence value over a number of Kalman cycles, the Kalman gain may be too small to follow high rates of vehicle angle acceleration. In such instances, the filtering process parameters can be reinitialized or other appropriate strategy can be followed.

In providing a sequence for generating output signals representative of angular rotation, experience with missile guidance systems as known by those skilled in the art shows that angular rotation frequencies of a typical missile could extend up to 150 Hz. The high frequencies often result from high order "body bending" modes. In accordance with conventional Shannon sampling theory, the output data rate must be at least twice as large as the aforementioned highest frequency. If a 400 Hz update is utilized for determination of angular rate within the CPU 268, a random drift can be achieved of approximately 1° per hour. The modulator scan initiation sequence can be designed to require completion of two scans in 2500 microseconds. For example, with a ±1000° per second maximum rate and a 22.5° half angle zero-crossing interval, the phase modulator 224 must be capable of scanning ±4p radians if the central peak is to be tracked properly using the zero-crossing circuitry previously discussed herein. Multiple overlapping scanning windows, each having a length of 2 radians, can be utilized to guarantee that two and only two zero-crossings are detected in any given scan. The sequence within CPU 268 must determine the start and finish of the D/A converter 284 read-out sequence and, given the optimal estimation of angular rate, must also decide whether to stay in a current modular scan window or to decrease or increase one position.

In addition to the foregoing, it is also possible to include a "recovery" sequence within the sequential functions of the CPU 268. The purpose of the recovery sequence is to provide capability of handling "hard" measurement errors, for example, due to loss of one of the two required zero-crossings in a scan, or otherwise due to the selection of a scan window which does not properly contain the central signal peak and its two surrounding zero-crossings. The recovery logic sequence can be readily determined by one skilled in the art of signal processing design having knowledge of systems such as the optical rate sensor 200.

In summary, the signal processing functions of the known optical rate sensor 200 comprise the sampling of the intensity signal at various times when the functional relationship between the intensity signal and the modulator phase (and modulator voltage) is substantially linear. With the use of a least squares method for data smoothing, a central peak of this functional relationship is computed. The phase shift caused by modulation which corresponds to the central intensity signal peak also corresponds to the Sagnac phase shift resulting from the angular acceleration of the fiber ring.

It should be noted that the previously described optical rate sensor 200 is substantially an "open-loop" system with respect to operation of the phase modulator 224. That is, the phase modulator voltage applied as an input to modulator 224 is substantially independent from the measured central peak offset or any other parameters determined on a real-time basis from the intensity signal S.

To some extent, however, the foregoing statement regarding open-loop operation must be modified. In the optical rate sensor 200 as disclosed in Carrington et al, optimal estimation techniques are utilized to better determine the true value of the modulator drive voltage corresponding to the central peak of intensity signal S. Given the estimate (through use of a Kalman filter) of modulator voltage and, accordingly, the angular rate $G_I$, the particular scanning window is determined so as to better insure that two and only two zero-crossings are present in a given scan. That is, the modulator scanning window is shifted as a function of rate so as to "track" the movement of the central intensity peak as the input rate changes.

In view of the foregoing, there is some "feedback" associated with the optical rate sensor 200 with respect to phase modulator drive voltage. However, this feedback arrangement is solely directed to the function of modifying the phase modulator scanning window for purposes of maintaining only two zero-crossing locations within any given scan.

It should also be noted that information regarding the intensity signal is ignored in certain time slots, i.e. those time slots where the intensity signal is above or below certain predetermined thresholds and the functional relationship between the intensity signal and the modulator voltage is substantially non-linear. In accordance with conventional communication theory, ignoring these portions of the intensity signal results in a relative reduction of the signal to noise ratio. When the modulator voltage pattern is a substantially sinusoidal functional relationship between the intensity signal and modulator voltage, the S/N ratio reduction will be on the order of 3 to 6 db. This reduction will necessarily result in a loss of Sagnac phase measurement accuracy.

Still further, it can be noted that the optical rate sensor 200, when used in certain applications, will be subjected to relatively low frequency applied inertial rates, e.g. 200 Hz or less. If this low inertial rate is compared with the sampling rate and the frequency of the phase modulator output, it can be seen that the intensity signal can possibly be "aliased" to D/C. That is, because there is a finite period between scanning windows, it is feasible that a low frequency angular rate could actually be erroneously measured as a constant inertial rate input.

Finally, it can also be noted that although the measurement of the inertial rate input using the foregoing processes associated with optical rate sensor 200 is substantially independent of source wavelength, the measurement is dependent on phase modulator temperature. To illustrate, the modulator phase shift $P_B$ is a function of the modulator input voltage $V_M$ in accordance with the following:

$$P_B = (K_d/L)V_M \qquad \text{(Equation 7)}$$

where $K_d$ is a constant associated with the physical implementation of the modulator, and $L_o$ is the laser source wavelength. The constant $K_d$ is, however, dependent upon the temperature of the phase modulator.

Equation 1, functionally relating the Sagnac phase shift to the inertial input rate can be rewritten as follows:

$$G_I = K_p L_o P_s \qquad \text{(Equation 8)}$$

where $K_p$ is a physical parameter associated with the configuration of the fiber ring, e.g. ring radius, number of turns, etc. If the phase modulation $P_B$ is now set equal to the Sagnac phase shift $P_s$, which occurs at the central peak offset of the intensity signal, then the following functional relationship exists between the modulator voltage and the inertial input rate:

$$G_I = [(L_o K_p K_d)/L_o] V_M \qquad \text{(Equation 9)}$$

It can be noted from Equation 9 that the source wavelength terms "cancel out," with the result being independent of laser wavelength.

In addition, it can be noted from Equation 9 that the change in modulation as a function of phase modulator voltage can be calibrated by "swinging" $V_M$ sufficiently far so as to cause $P_B$ to cover a range of $2\pi$. From Equation 7, the change in phase modulation as a function of modulator voltage can be written as follows:

$$P_B/V_M = (K_d/L_o) \qquad \text{(Equation 10)}$$

In accordance with the foregoing, it can be seen that if deviations in source wavelength could be modeled or otherwise accurately measured, Equation 10 could be utilized to improve the accuracy of Equation 9. However, if the source wavelength cannot be accurately modeled or measured, the actual accuracy of Equation 9 is dependent upon the ability to accurately estimate or otherwise control $K_d$ over temperature. That is, the calibration provided by swinging $V_M$ sufficiently far so as to cause $P_B$ to cover a range of $2\pi$ can only provide calibration of the quantity $(K_d/L_o)$.

Another potential problem associated with any type of optical rate sensor adapted for use in applications such as missile control and the like, relates to the dynamic range required for sensor operation. For example, the maximum rate required of a sensor for measurement of inertial input rates may be on the order of 1000°/second. Correspondingly, the minimum rate measurement which may be required can be on the order of 1°/hour. If digital processing techniques are to be used with respect to sensor operation, such a dynamic range would require in excess of 23 bits to provide binary representation throughout the full dynamic range of operation.

Another potential problem associated with various types of optical rate sensors relates to the bias stability of commercially available D/A converters. For example, a conventional 16-bit D/A converter having the capability of representing inertial input rates up to 1000°/second will have a bias stability on the order of 30°/hour.

One problem somewhat independent of the particular optical rate sensor employed in any specific application relates to the requirement that a complete inertial reference guidance apparatus typically requires three gyroscopes. With the gyroscopes implemented by means of optical rate sensors rather than traditional components, such as spinning mass gyroscopes and associates electromechanical devices, physical size is clearly reduced. However, optical rate sensors are not inexpensive and any physical realization of an optical rate sensor requires some finite spatial area. In particular, certain of the optical and electronic elements of an optical rate sensor, such as a light source, photodetector and signal processing components, can be relatively expensive. Furthermore, certain of these and other elements may require spatial area which is of critical concern in aircraft and missile navigational systems, especially when the spatial area must be sufficient to accommodate three separate optical rate sensors.

SUMMARY OF THE INVENTION

In accordance with Applicants' invention, a rate sensor is provided for use in inertial reference systems for purposes of detecting angular rotations and measuring magnitudes and directional sense of the rates of angular rotation along a plurality of orthogonal axes. The rate sensor includes optical source means to generate an incoming optical source wave signal with a predetermined nominal wave length. A plurality of gyroscope channels is also provided, with each of the channels corresponding to one of the orthogonal axes.

Each gyroscope channel includes a passive ring path, along with splitting means for splitting the source wave signal into a pair of counter-propagating optical waves. Path means are provided to apply the counter-propagating optical waves through the associated ring path, with the counter-propagating optical waves emerging therefrom with a relative Sagnac phase shift indicative of the rate of angular rotation of the path. Combining means are provided for recombining the counter-propagating waves into an outgoing optical wave signal. The resultant low order fringe pattern is representative of the relative phases of the counter-propagating waves.

The rate sensor also includes detection circuit means connected to the gyroscope channels for generating an intensity signal indicative of the resultant low order fringe pattern. Signal processing means are providing which are connected to the detection circuit means and responsive to the intensity signal to generate output signals corresponding to the rates of angular rotation for each of the axes. Switch means are connected to the gyroscope channels, the optical source means and the detection circuit means to selectively apply the source wave signal to a first one of the gyroscope channels during a first predetermined time period. The switch means also apply the outgoing optical wave signal associated with a second one of the gyroscope channels to the detection circuit means during the first predetermined time period.

The switch means is adapted to periodically apply the incoming source wave to different ones of each of the gyroscope channels during a sequence of substantially equivalent time periods. The switch means is further adapted to periodically and sequentially apply each of the outgoing wave signals to the detection circuit means during the sequence of substantially equivalent time periods. During any given one of the substantially equivalent time periods, the gyroscope channel to which the source wave is being applied is a different one of the gyroscope channels than the gyroscope channel from which the outgoing wave signal is applied to the detection circuit means.

The rate sensor also includes phase modulation means to apply non-reciprocal phase shift to each of the pairs of counter-propagating waves. The modulation means includes means for applying a modulator phase signal to each of the channels, with the level of the modulator phase signal applied to a particular one of the gyroscope channels being held constant during any given time period while the switch means is applying the incoming source wave to the particular gyroscope channel. The level of the modulator phase signal applied to a particular one of the gyroscope channels is held constant during any time period while the switch means is applying the recombined pair of the counter-propagating waves associated with the particular gyroscope channel to the detection circuit means.

The optical source means can comprise a single light source connected to the switch means. The detection circuit means can comprise a single photodiode connected to the switch means. Further, the signal processing means can include means for generating a plurality of modulation control signals, with each of the control signals corresponding to a different one of the channels. Further, each of the modulation control signals can be applied to a separate one of the phase modulation means and comprise information indicative of the relative Sagnac phase shift of the corresponding pair of counter-propagating waves.

Each control signal can include a time-variant feedback signal having a change in amplitude substantially proportional to the rate of angular rotation of the ring path of the corresponding gyroscope channel. The control signal can also include a periodic AC bias signal having an amplitude so as to operate in a high-slope region of the functional relationship between the intensity signal and the relative phases of the counter-propagating waves. The frequency of the feedback signal can be approximately two-thirds of the frequency of the AC bias signal. The AC bias signal can have a period approximately twice the ring transit time for an optical wave traversing any of the ring paths. The amplitude of the time variant feedback signal can vary and substantially correspond to a non-reciprocal phase shift equal and opposite to the then-current relative Sagnac phase shift of the pair of counter-propagating waves associated with the corresponding gyroscope channel.

The intensity signal can be divided in time into repetitive series, with each of the series comprising a plurality of sequential time periods. The intensity signal can be provided so that, during a given one of the time series, the signal is sequentially indicative of each of the resultant low order fringe patterns, and during any given one of the time periods, is indicative of only one of the low order fringe patterns.

The signal processing means can include a single analog-to-digital converter responsive to a time multiplexed analog signal divided into sequential time periods. The magnitude of the time multiplexed signal during a given time period can be indicative of the rate of angular rotation of one of the ring paths of a corresponding one of the gyroscope channels. The analog-to-digital converter converts the time multiplexed analog signal into a representative digital signal.

The signal processing means can also include demodulation means responsive to the intensity signal for demodulating the intensity signal and for generating a plurality of resultant phase error signals. Each of the phase error signals is associated with a different one of the gyroscope channels. The signal processing means can also include integration means connected to the demodulation means to integrate the phase error signals and to generate a plurality of integrated signals, with each of the signals corresponding to a different one of the phase error signals.

The demodulation means can include a plurality of demodultors, with each of the demodulators corresponding to a different one of the gyroscope channels. Means can be provided for applying to each of the demodulators a different one of the plurality of periodic demodulator reference signals. Each of the reference signals can have a period approximately equal to six ring transit times of an optical wave traversing any one of the ring paths. Only one of the plurality of demodulator reference signals is of a non-zero amplitude at any given period of time.

The signal processing means can also include multiplexing means for time multiplexing the plurality of integrated signals into a single integrated error signal. Means are responsive to the integrated error signal to generate a plurality of modulation control signals, with each of the control signals corresponding to a different one of the gyroscope channels.

The signal processing means can also include central processing means responsive to the digital error signal to generate the plurality of control signals, with each of the control signals corresponding to a different one of the gyroscope channels and indicative of the rate of angular rotation of the ring path of the corresponding gyroscope channel. Modulation means can be provided to modulate each of the control signals so as to apply level adjusted AC signals to phase modulation means, and to generate a plurality of modulator reference signals, with each of the reference signals corresponding to a different one of the control signals. Adder means can also be provided for summing a periodic time variant AC bias signal with each of the plurality of modulated reference signals, and for generating a plurality of modulator control signals. Each of the modulator control signals corresponds to a different one of the gyroscope channels and is representative of the relative Sagnac phase shift of the pair of counter-propagating waves associated with the corresponding gyroscope channel. The AC bias signal and any one of the modulated reference signals are both of a non-zero amplitude only during given time periods when the switch means is active to apply the outgoing wave signal of the corresponding gyroscope channel to the detection circuit means.

The switch means can include a directional coupler having a plurality of electrodes capable of switching a given input signal between one of two output paths. The splitting means can comprise a Y-coupler. The sensor apparatus can further include phase modulation means for externally applying a non-reciprocal phase shift to each pair of counter-propagating waves, and can comprise a plurality of electrode pairs located along branches of the Y-couplers. Further, each of the gyroscope channels can include a modal filter connected between the switch means and the corresponding Y-coupler. The switch means, splitting means, phase modulation means and modal filters can be mounted on a monolithic integrated optics chip.

The invention also includes a method for use in inertial reference systems for detecting and measuring rates of angular rotation along three orthogonal axes. The method includes the steps of generating an incoming optical source wave signal having a predetermined nominal wave length, and periodically splitting the source wave signal into pairs of counter-propagating optical waves. Each of the pairs of counter-propagating waves is applied through one of three ring paths, with each of the ring paths corresponding to one of the axes. Each pair of counter-propagating waves is recombined into a separate outgoing wave signal, with the resultant low order fringe pattern of each outgoing optical wave being representative of the relative phases of the corresponding counter-propagating waves. An intensity signal is generated which is indicative of the resultant low order fringe pattern. The intensity signal is processed and output signals are generated corresponding to the rates of the angular rotation for each of the axes. The source wave signal is selectively applied as a pair of counter-propagating waves through a first one of the ring paths during a first predetermined time period. The intensity signal is selectively generated so as to be indicative of the resultant low order fringe pattern from one of the outgoing wave signals associated with a second one of the ring paths during the first predetermined time period.

BRIEF DESCRIPTION OF DRAWINGS

The background art pertaining to the invention has been previously described with reference to the drawings in which.

Figure 12:
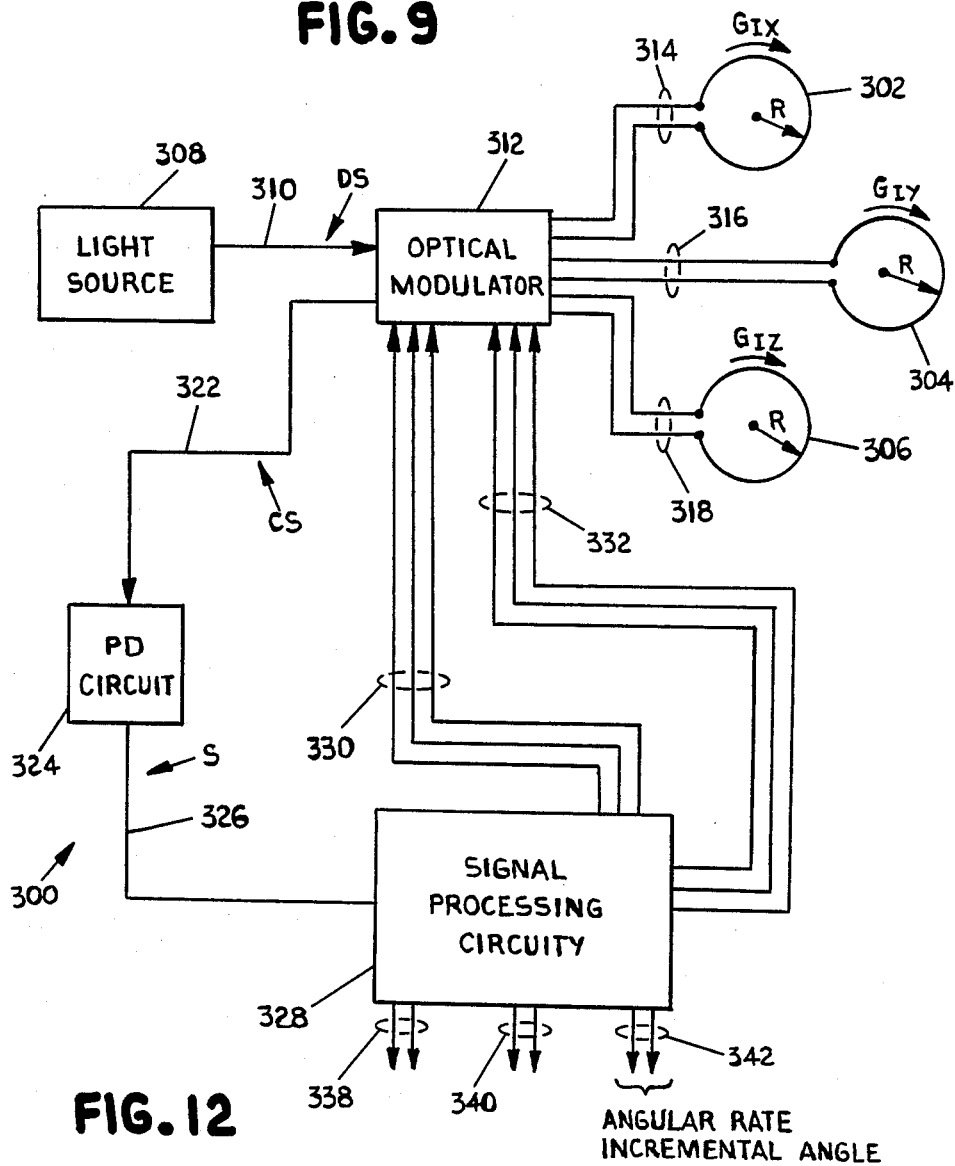
Figure 10:
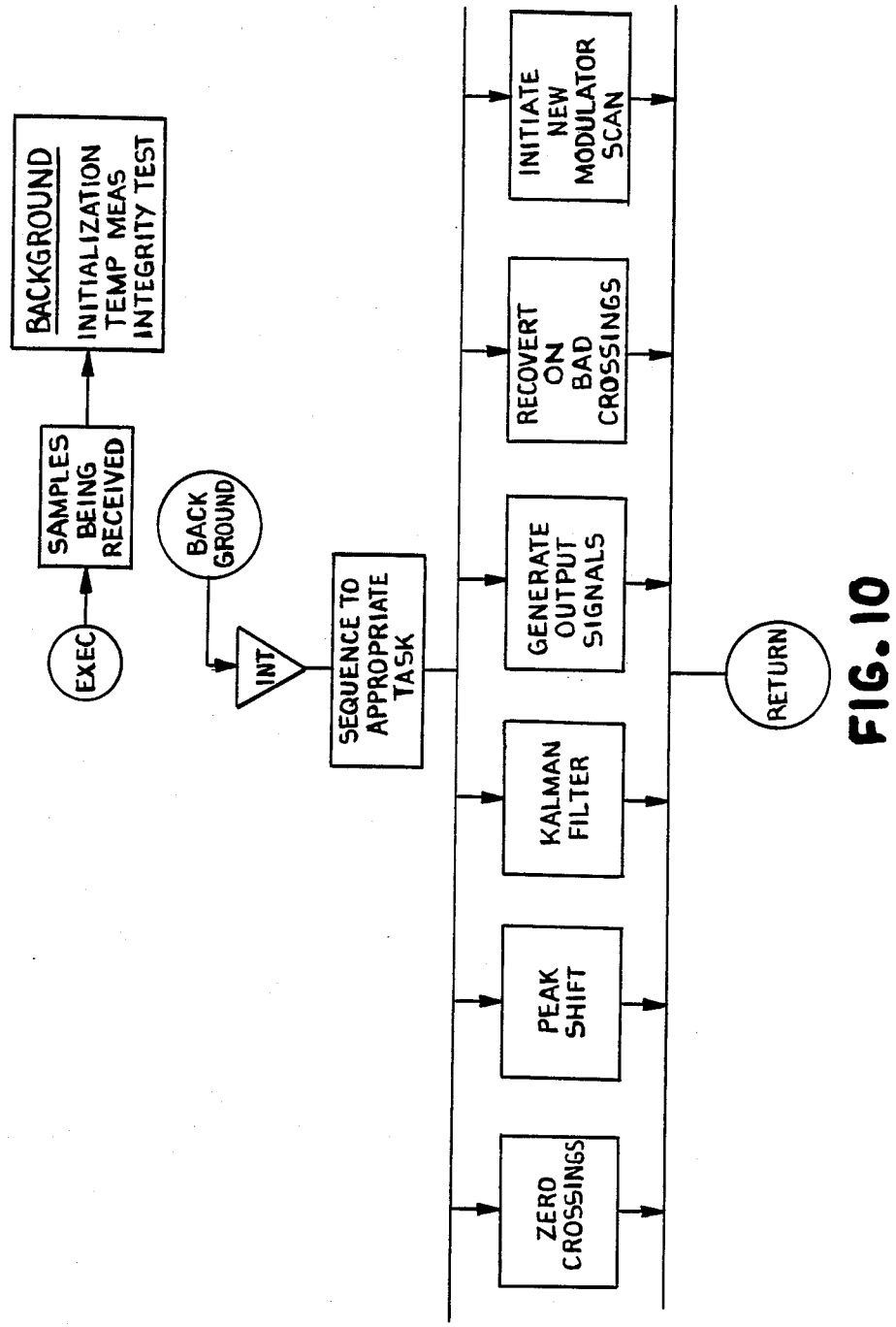
FIG. 10 is a sequence diagram illustrating an exemplary control sequence within the central processing unit of the optical rate sensor shown in FIG. 6.
Figure 11:
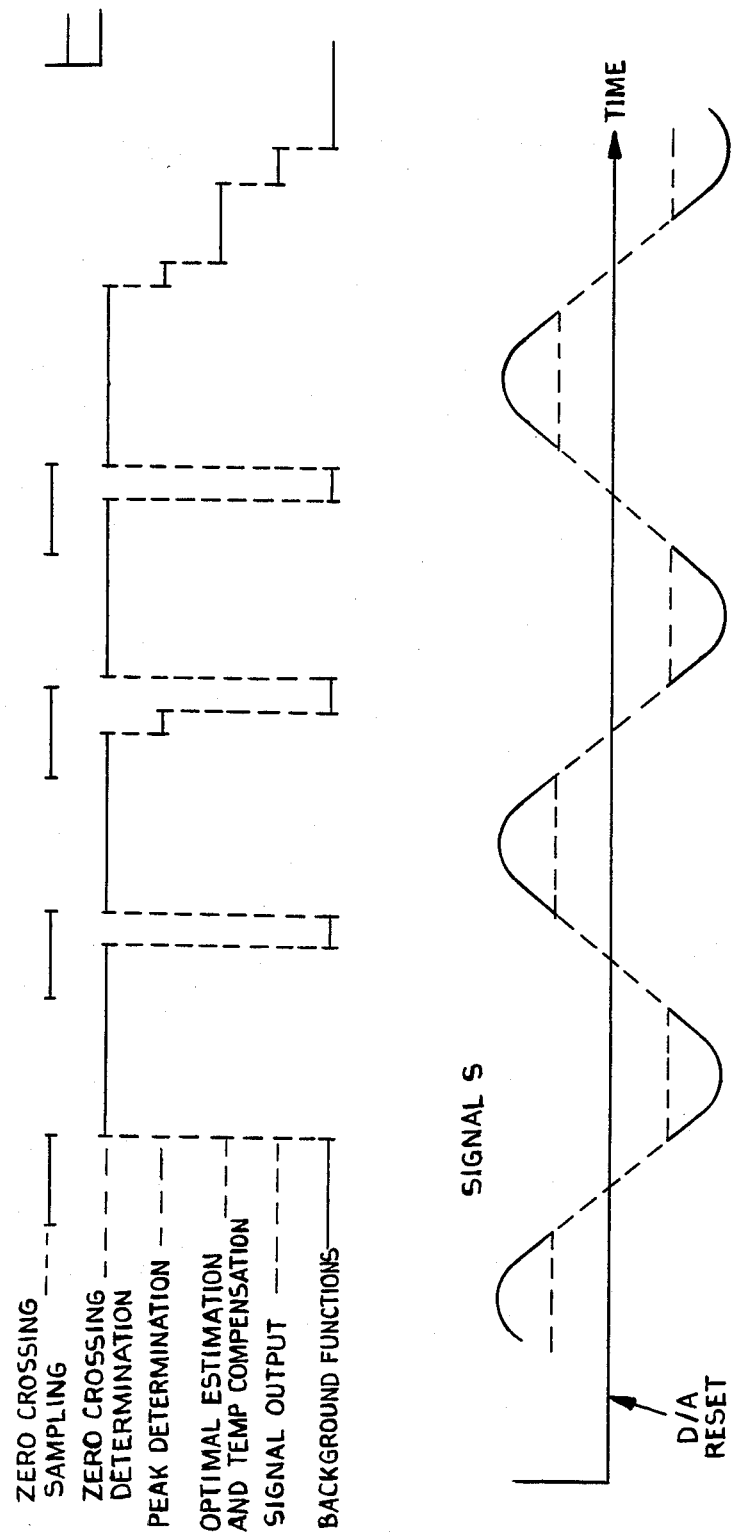
FIG. 11 is a sequence timing diagram illustrating the relationship of the output signal indicative of Sagnac phase shift to the control functions shown in FIG. 10 for the optical rate sensor depicted in FIG. 6.
Figure 13:
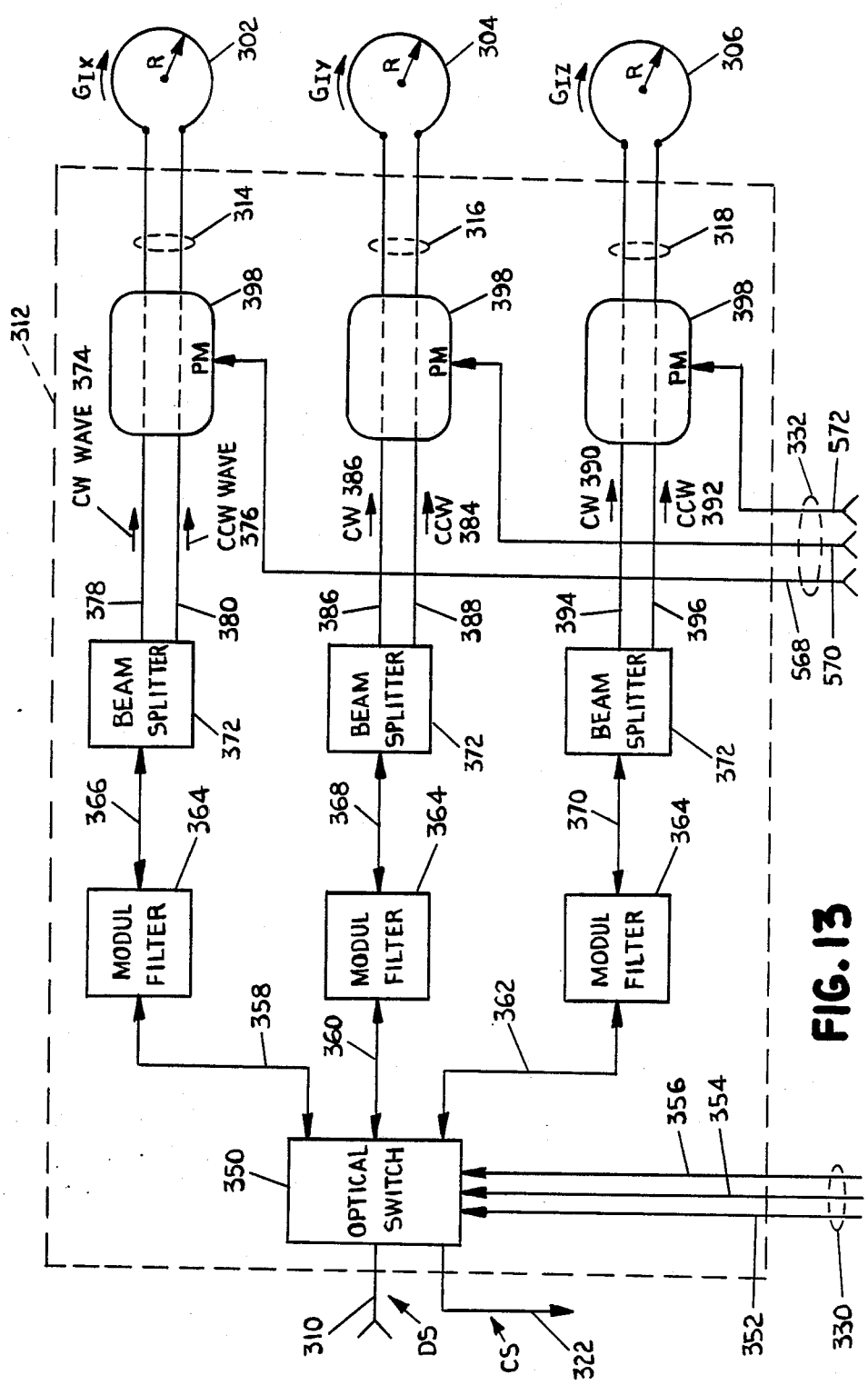
Figure 14:
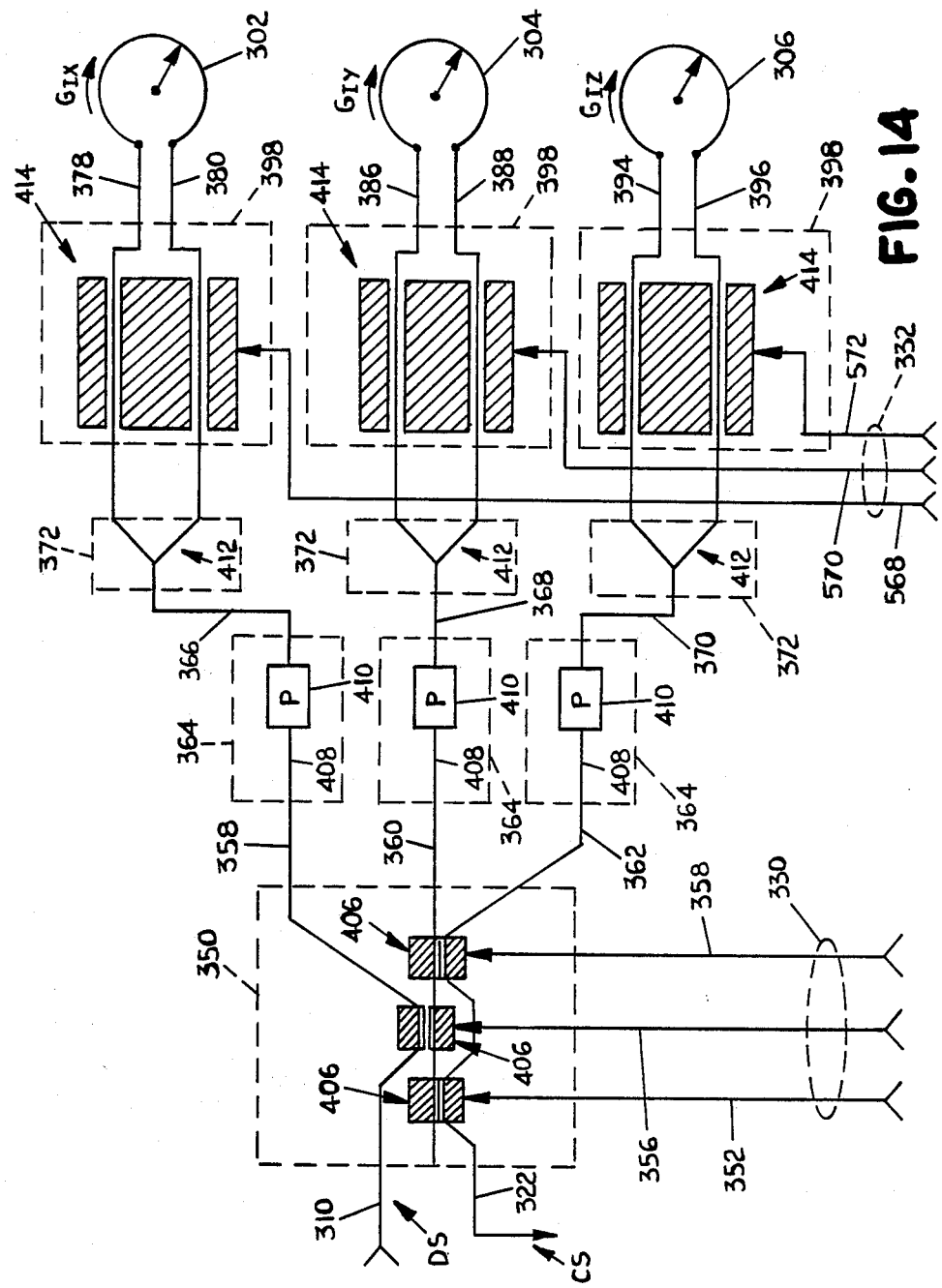
Figure 15A:
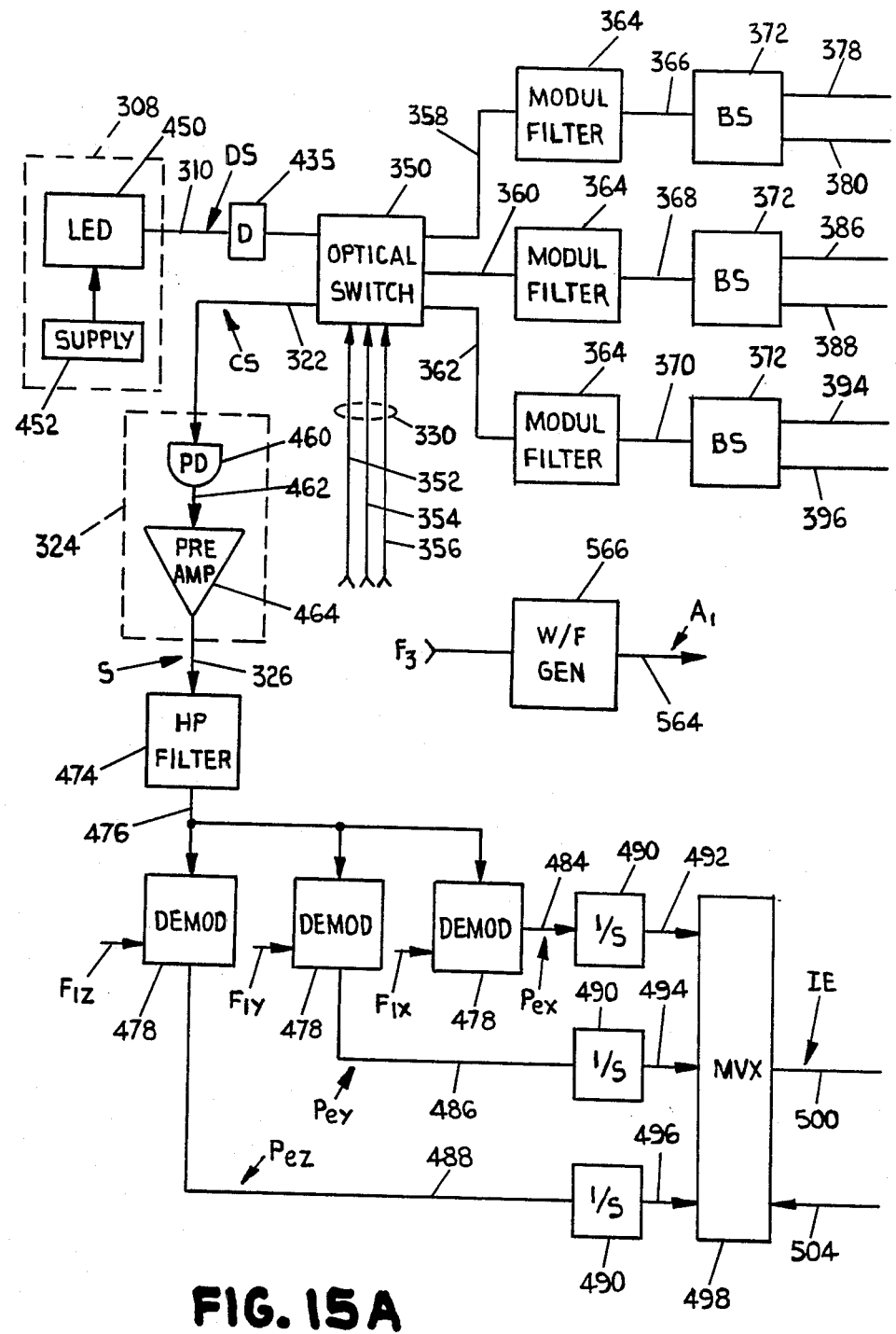
Figure 15B:
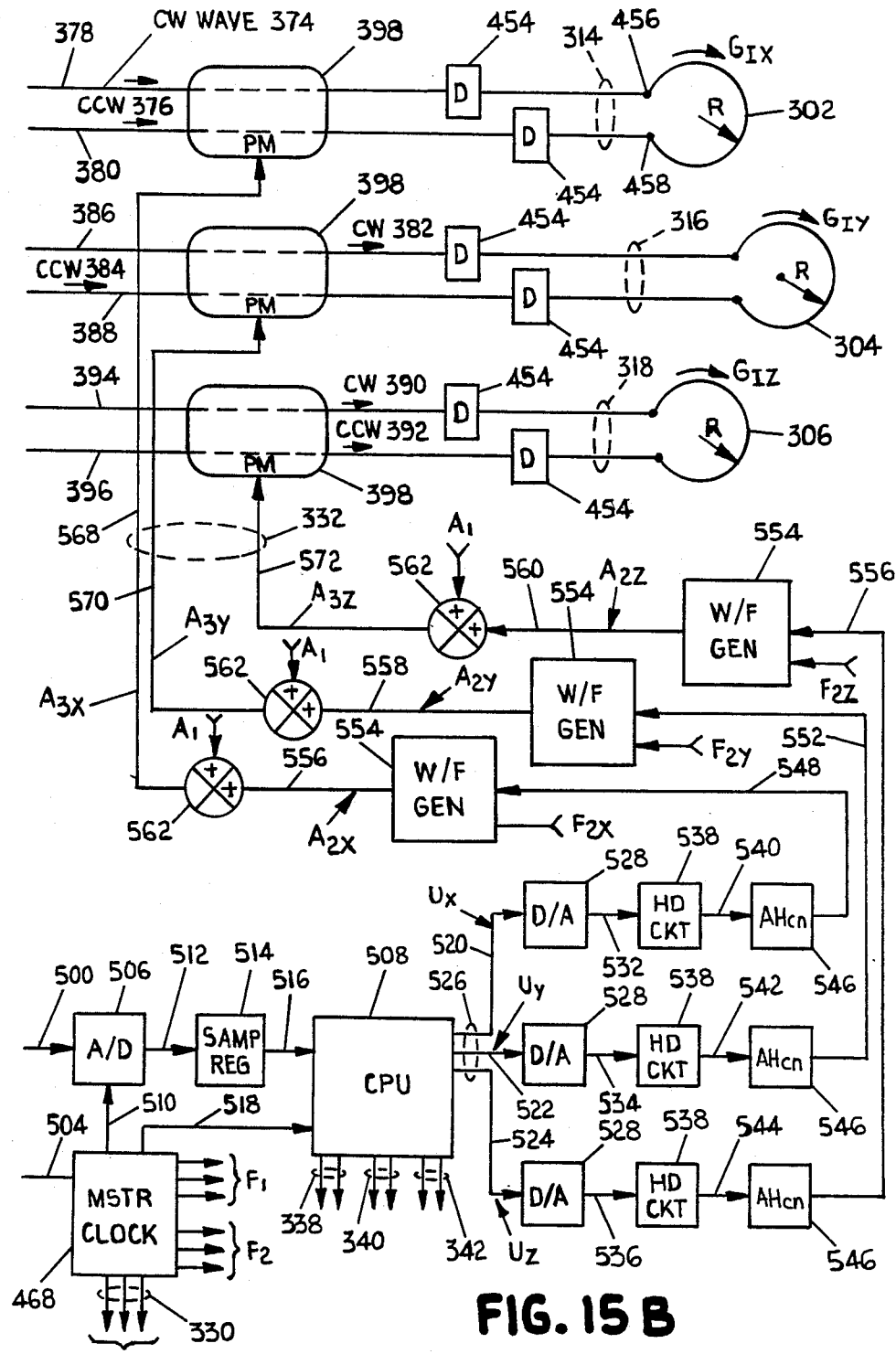
Figure 16:
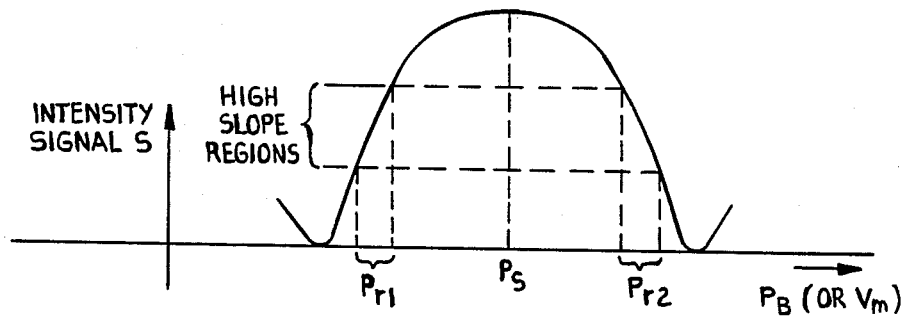

The invention will now be described with reference to the drawings in which:

FIG. 12 is a block diagram of one illustrative embodiment of a triad sensor apparatus in accordance with the invention;

FIG. 13 is a schematic diagram of illustrative embodiment of the optics/modulator circuit of the triad apparatus depicted in FIG. 12;

FIG. 14 is a schematic diagram of one illustrative embodiment of an integrated circuit arrangement for certain electro-optical components of the circuit depicted in FIG. 13;

FIG. 15 is a relatively more detailed block diagram of the triad apparatus shown in FIG. 12 in accordance with the invention;

FIG. 16 depicts a wave form showing the functional relationship between the intensity signal and the modulator phase or modulator input voltage.

Figure 20:
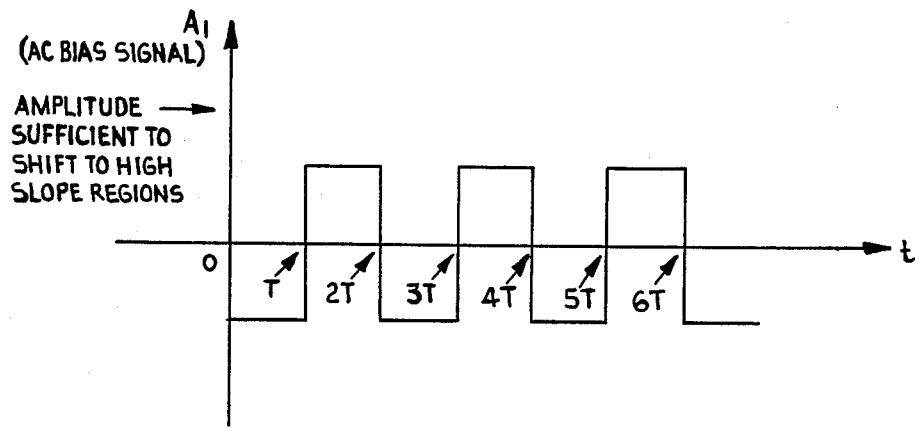
Figure 21:
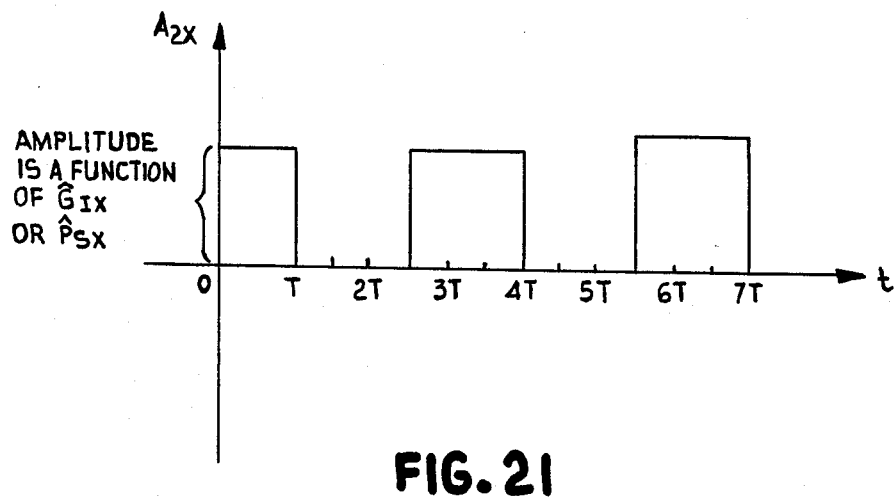
Figure 17:
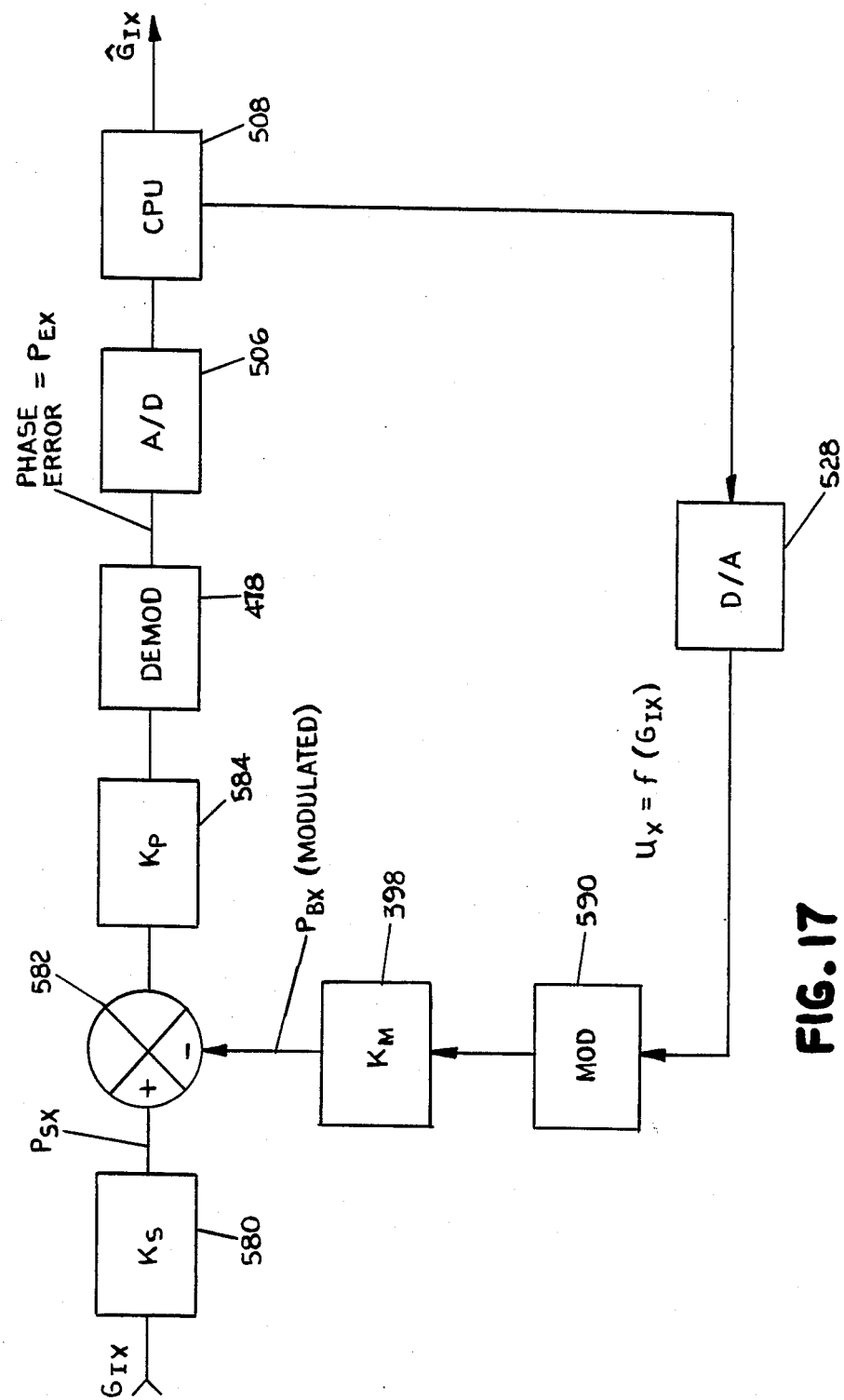
Figure 18:
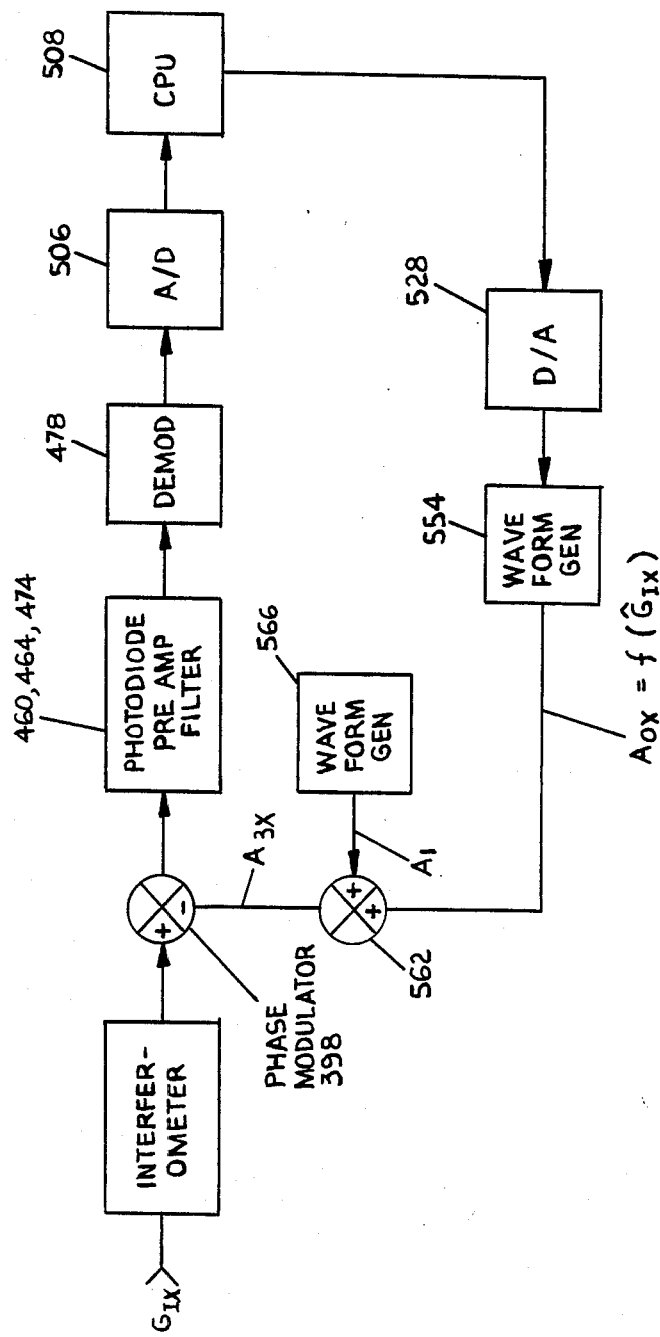
Figure 19:
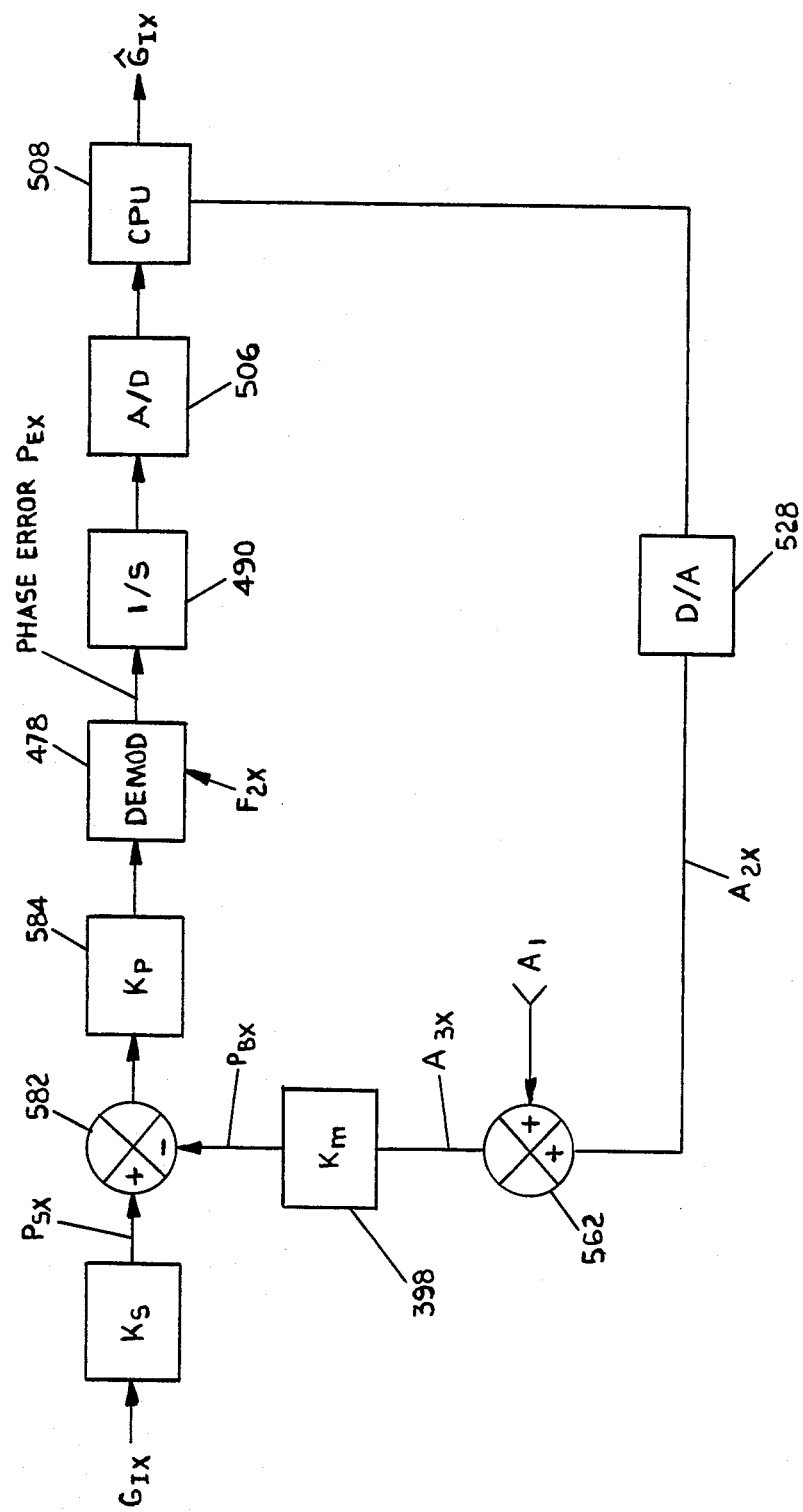
Figure 22:
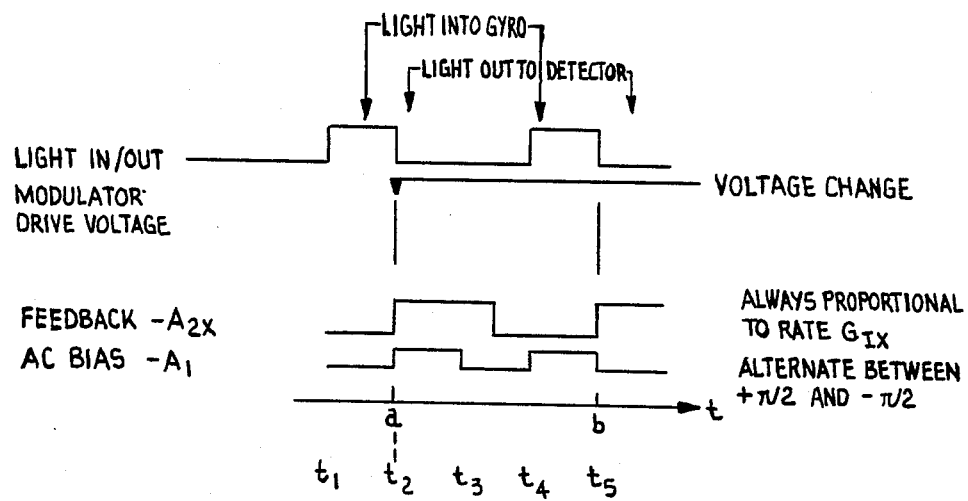
Figure 23:
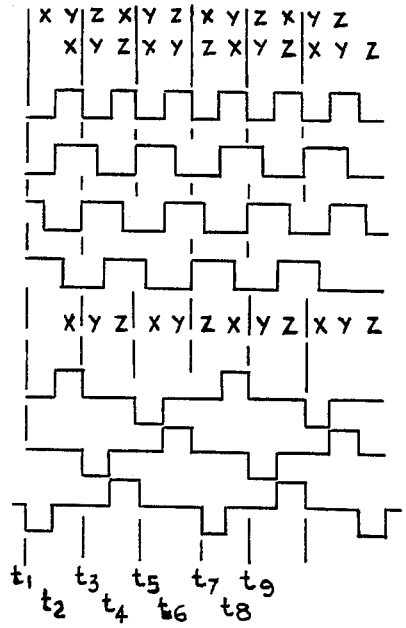
Figure 26:
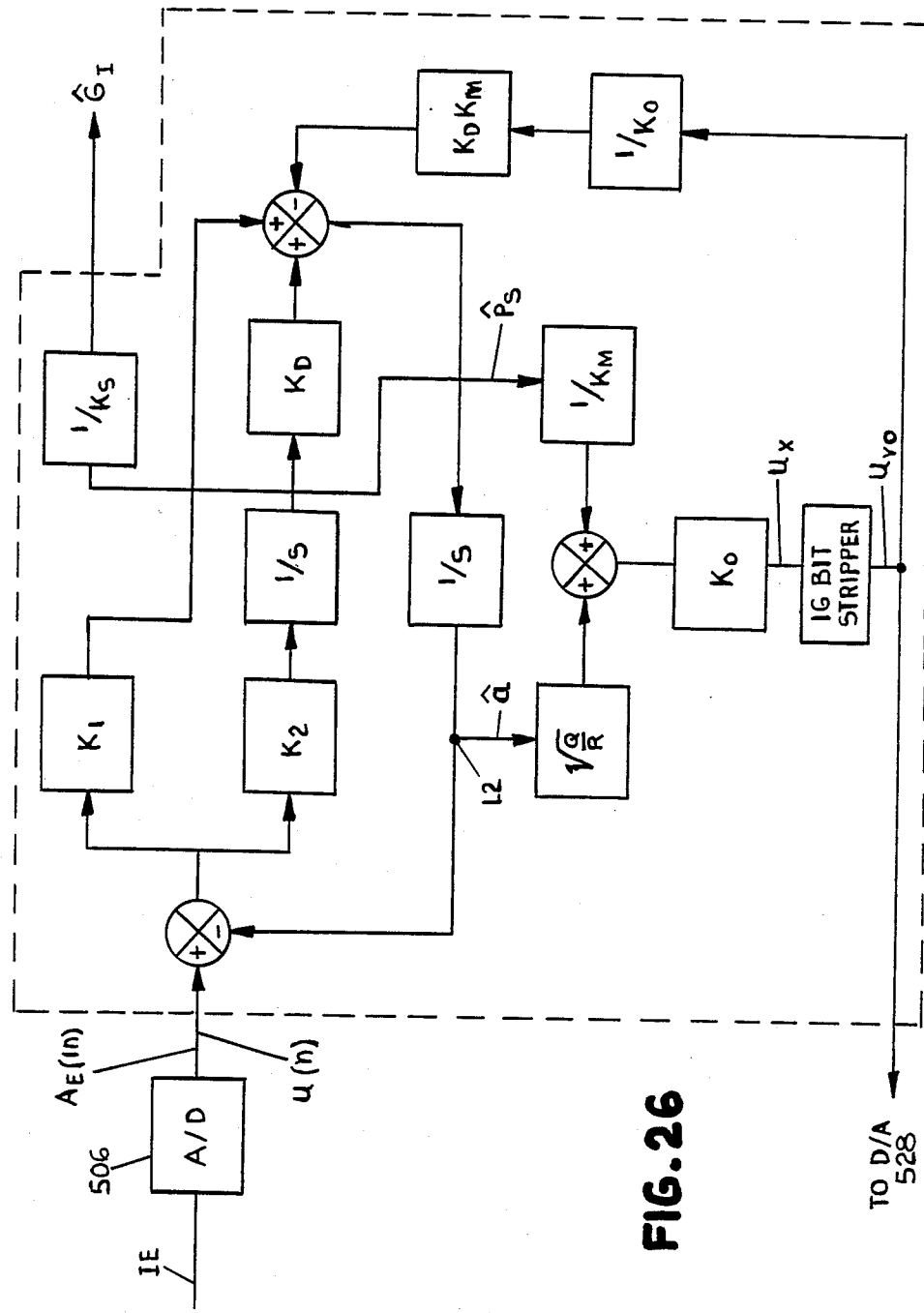
Figure 27:
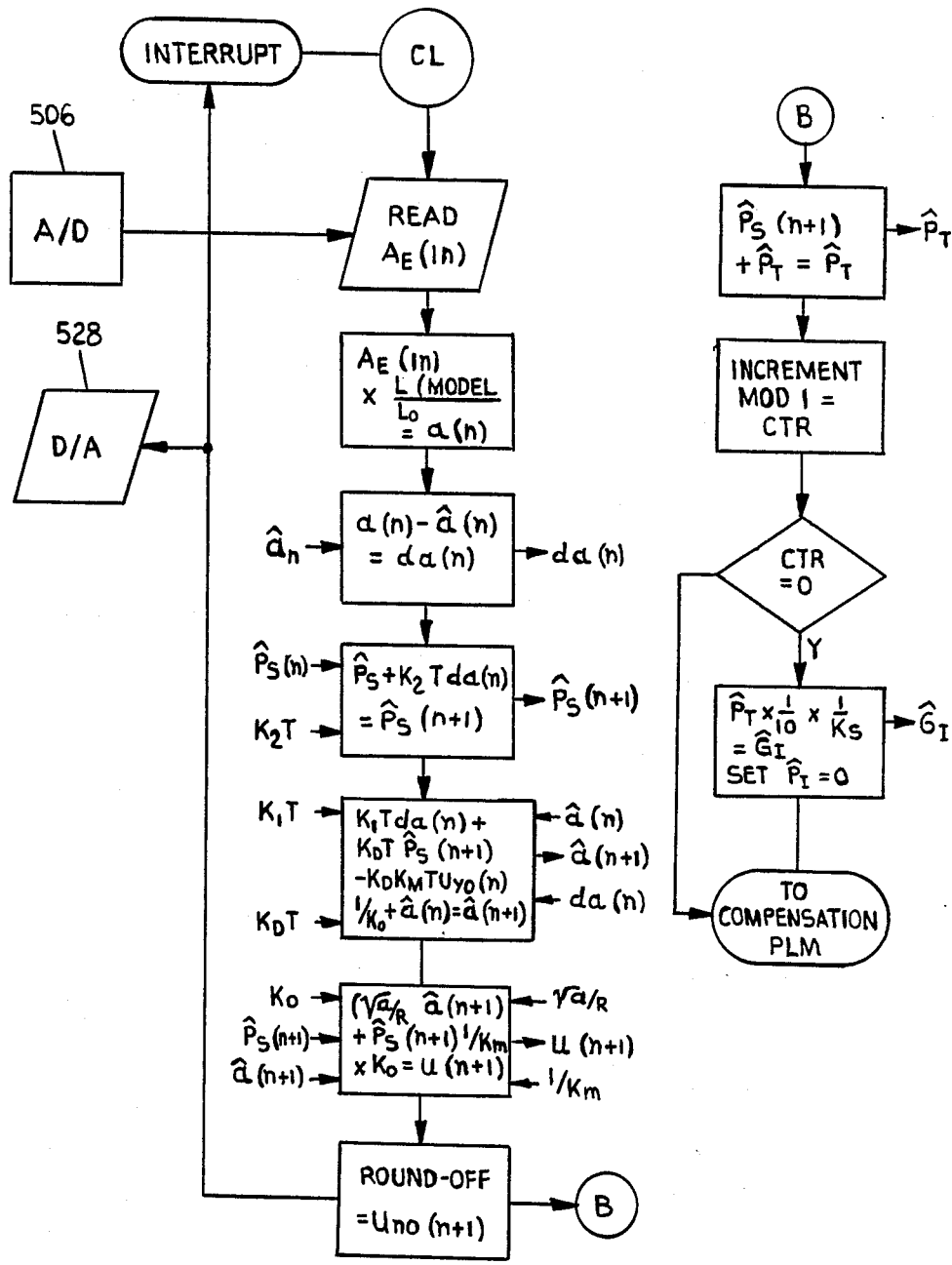

FIG. 17 depicts a system block diagram representative of an optical rate sensor having a closed-loop operation, with the addition of modulation and demodulation;

FIG. 18 depicts a simplified system diagram showing closed loop operation of the optical rate sensor with respect to one gyroscope channel, with the use of the wave forms $A_1$ and $A_{2x}$;

FIG. 19 depicts a system block diagram representation similar to that shown in FIG. 18, with the addition of an analog integrator shown in LaPlace Transform notation;

FIG. 20 depicts one exemplary wave form $A_1$ which can be utilized as a "dither" wave form as an input to one of the phase modulators associated with a gyroscope channel of the triad apparatus shown in FIG. 15;

FIG. 21 depicts an exemplary wave form $A_{2x}$ which can be generated as a function of an estimate of the Sagnac phase and utilized as an input to a phase modulator of a gyroscope channel for the triad apparatus shown in FIG. 15;

FIG. 22 is a timing diagram showing the relationship of the light source and detector timing, modulator drive voltage and modulator drive signal comprising an AC bias signal and a feedback signal for the triad apparatus shown in FIG. 15;

FIG. 23 is a more detailed timing diagram showing several of the more relevant signals and the relative timing relationships for the three gyroscope channels of the triad apparatus shown in FIG. 15;

FIG. 24 depicts a system block diagram representation showing open loop operation of an optimal controller without noise input;

FIG. 25 is similar to FIG. 24, but includes signals representative of noise input;

FIG. 26 is a system block diagram representation of an optimal controller and filter adapted for use with the triad apparatus shown in FIG. 15 (with respect to only one gyroscope channel), and with the use of a stripping function to obtain the most significant bits of the output; and FIG. 27 is an exemplary sequence diagram of one type of sequence which can be utilized to provide closure loop functions in the central processing unit shown in the triad apparatus of FIG. 15, with respect to one gyroscope channel.

DETAILED DESCRIPTION

The principles of the invention are disclosed, by way of example, in an integrated optical rate sensor apparatus 300 as depicted in FIGS. 12–27. Rate sensor apparatus of this type can be utilized in inertial reference systems to detect angular rotations and measure magnitudes and directional sense of the rates of rotation along various axes. Apparatus 300 overcomes or minimizes several of the previously described inherent problems of rate sensors employing Sagnac interferometric principles and utilized in a manner corresponding to that of the interferometers previously described in the section entitled "Background Art." In addition, apparatus 300 provides further advantages with respect to increased signal to noise (S/N) ratio performance, and the ability to operate over a wide dynamic range, including low angular rates.

The rate sensor apparatus 300 is particularly advantageous in that it comprises the electrical and optical components required for measuring angular rotation rates along three orthogonal axes, thereby providing sufficient information for complete navigational application. For this reason, apparatus 300 will be referred to herein as a "triad" rate sensor apparatus. In addition, and in accordance with the invention, the triad apparatus 300 comprises a configuration whereby certain optical and electrical components, which must typically be replicated for navigational instrumentation comprising a plurality of optical rate sensors, are shared among the rate sensor configurations. In part, this sharing of components is achieved by time-sharing the processing of operative signals and the particular modulation techniques employed in the apparatus 300.

Still further, and also in accordance with the invention, an integrated optics chip can be employed to physically realize certain optical and electro-optical components of the sensor apparatus 300. By sharing certain of the rate sensor components and physically realizing certain components through an integrated chip configuration, typical cost and volume requirements are significantly reduced.

The triad apparatus 300 is illustrated in a relatively simplified block diagram format in FIG. 12. In part, the apparatus 300 differs from the previously described rate sensor 200 in that the triad apparatus 300 comprises a closed loop configuration, whereby optical signals are modulated in a manner so as to generate a detector signal having a substantially nulled DC component. The circuit configurations, signal processing features and principles of operation for a closed loop configuration similar to apparatus 300, but operating as a single optical rate sensor with one ring and angular rotation rates thus measured only along one axis, are described in detail in commonly-assigned Sugarbaker et al, U.S. patent application Ser. No. 854,190, filed Apr. 21, 1986. Accordingly, substantial details as to the theory of the closed loop operation and the advantages provided thereby will not be repeated herein. However, it should also be emphasized that the advantages provided by the principles of a component-sharing circuit configuration, time-shared signal processing and integrated component realization, as described herein in accordance with the invention, are not limited to the specific closed loop arrangement of triad apparatus 300. These principles can be employed with other types of optical rate sensors without departing from the novel concepts of the invention.

Referring specifically to FIG. 12, the triad apparatus 300 comprises several components similar in structure and operation to corresponding components of the previously-described optical rate sensors 100 and 200. However, unlike the rate sensors 100 and 200, whereby only one passive fiber optic ring was employed, and angular rates of rotation were measured only along one axis, the triad apparatus 300 employs three multiple-turn fiber optic passive rings 302, 304 and 306. Preferably, the rings 302, 304 and 306 are aligned along three orthogonal axes. For purposes of subsequent description herein, ring 302 will be characterized as being aligned along the x axis of rotation, and employed to indicate angular rotation along the x axis. Correspondingly, rings 304 and 306 will be characterized as aligned with mutually perpendicular y and z axes, respectively, and employed to indicate angular rotation along these axes. Each of these axes of rotation and the structural components and functional operations associated therewith are referred to herein as a "gyroscope channel."

As further shown in FIG. 12, the triad apparatus 300 includes a light source circuit 308 which provides a means for generating an optical signal DS on conductor 310, having a nominal wavelength $L_o$. The optical signal DS on conductor 310 is applied as an input signal to a circuit configuration characterized as the optics/modulator circuit 312.

As described in greater detail in subsequent paragraphs herein, the optics/modulator circuit 312 provides several functions. The circuit 312 includes means for selectively switching the optical signal DS for transmission through one of the three passive rings 302, 304 or 306. The signal DS is therefore time multiplexed among the passive rings. Circuit 312 also includes means for filtering the signal DS so that the resultant signals comprise light in only one polarization state of a single spatial mode. Further, circuit 312 includes means for "splitting" or otherwise dividing the filtered signal DS into two equivalent wave signals separately transmitted on the individual conductors of each of the conductor pairs 314, 316 and 318 associated with the rings 302, 304 and 306, respectfully. Optics/modulator circuit 312 also advantageously includes phase modulation components for selectively applying nonreciprocal phase shift (NRP) to optical wave signals appearing on the conductor pairs 314, 316 and 318.

After the wave signals propagate through the passive rings, they are again applied through the optics/modulator circuit 312. As previously described with respect to prior art passive ring Sagnac interferometers, the counter-propagating wave signals on the individual conductors of the conductor pairs will have a relative Sagnac phase shift directly proportional to the angular rotation rate $G_I$ for each of the passive rings 302, 304 and 306. The circuit 312 again functions to modulate and filter these returning wave signals, and to recombine the signals and apply them as an optical wave signal CS on conductor 322. The CS wave signal is applied as an input signal to a photodiode circuit 324, which provides a means for generating a voltage signal on conductor 326 indicative of the magnitude and phase of the optical wave signal CS.

The signal on conductor 326 is applied as an input signal to signal processing circuit 328. As described in greater detail in subsequent paragraphs herein, the signal processing circuitry 328 performs several functions. Circuitry 328 in part provides control signals on conductor group 330 which are applied as input signals to the optics/modulator circuit 312 to selectively control switching of wave signals between the conductor 310 and the passive rings 302, 304 and 306, and also to control switching between the passive rings and the conductor 322 on which the CS wave signal is applied.

The signal processing circuitry 328 is also responsive to the output signal from photodiode circuit 324 to apply modulator control signals on conductor group 332. The modulator control signals are applied as input signals to phase modulator circuitry within circuit 312.

These signals on conductor group 332 are utilized to control phase modulation of the optical wave signals propagating through the passive rings 302, 304 and 306. Still further, the signal processing circuitry 328 is adapted to generate output signals on the conductor pairs 338, 340 and 342 indicative of the incremental angles and angular rates of rotation of the passive rings corresponding to the x, y and z axes, respectively. It should be noted that indication of the angles and rotation rates may be provided in the form of digital and/or analog data.

Figure 5:
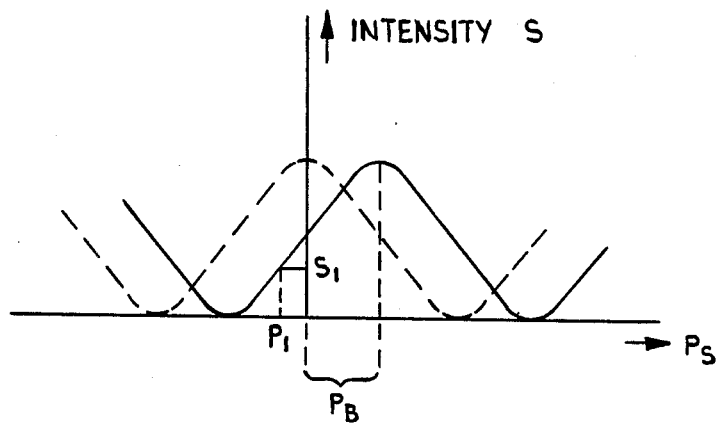
FIG. 5 is a diagram illustrating the effect of application of a constant phase shift of 90° on the measurement of Sagnac phase shift within the interferometer shown in FIG. 1.
Figure 7:
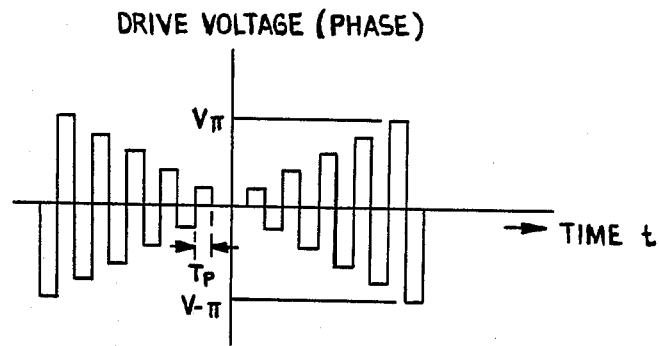
FIG. 7 depicts a typical drive voltage pattern for the phase modulator shown in the optical rate sensor depicted in FIG. 6.

As earlier described, a principal concept associated with optical rate sensors employing ring interferometers is that counter-propagating optical wave signals within each passive ring experience a differential phase shift in the presence of ring rotation. This differential phase shift, commonly designated as the Sagnac effect, results in a change in intensity of the recombined wave signals in accordance with the sinusoid previously described and depicted in FIG. 5. This differential phase shift is referred to as a non-reciprocal phase (NRP) shift in the sense that the normal reciprocal (equal travel time for light entering either end of the passive fiber ring) behavior of the ring has been altered by the rotation.

As also previously described, a non-reciprocal phase can be generated, at least instantaneously, by the action of an optical phase modulator placed at one end of the passive fiber ring. If the modulator produces an alternating non-reciprocal phase shift, the resulting signal emerging from the beam and modulated by the optical phase modulator will have an oscillating light intensity output. The greatest intensity variation is created if the modulator drive period is twice the light transit time through the ring. By sampling the intensity of the light at appropriate times relative to the modulation waveform, the non-reciprocal phase created by the modulator may either add or subtract instantaneously from the Sagnac phase shift resulting from rotation. In this manner, a signal can be created which yields a measure of the rotation rate.

Referring again to FIG. 12, the optical wave signal CS will have an intensity and phase which is a function of the Sagnac phase shift resulting from angular rotation of the fiber rings, and any non-reciprocal phase shift resulting from modulation of the wave signals propagating through the passive rings. The signal processing circuitry 328 is responsive to the signal at the output of the photodiode circuit 324 (a voltage signal representative of the intensity of signal CS) to apply control signals on the conductor group 332 so that the non-reciprocal phase shift resulting from modulation by the optics/modulator circuit 312 will be substantially equal and opposite to the Sagnac phase shift at specific time periods. By sampling these "feedback" signals at appropriate sampling points, the signals will provide a direct indication of the angular rotation rates of the passive rings, given the proportionality between Sagnac phase and rotation rate.

In addition to the foregoing, the optics/modulator circuit 312 is appropriately controlled by signals generated from the signal processing circuitry 328 so that only one light source circuit 308 and only a single photodetector circuit 324 is required to provide accurately-measured angular rates of rotation for each of the passive rings 302, 304 and 306. The optical signals generated by the light source circuit 308 and the signal CS on conductor 322 are essentially multiplexed with the three passive rings 302, 304 and 306. In addition, as subsequently described, certain components of the signal processing circuitry 328 are also multiplexed relative to detection of angular rotation for each of the passive rings, thereby avoiding replication of these signal processing components.

An exemplary embodiment of an optics/modulator circuit 312 in accordance with the invention is depicted in FIG. 13. As shown therein, the optics/modulator circuit 312 includes an optical switch circuit 350. The optical switch circuit 350 provides a means for multiplexing the incoming optical signal DS on conductor 310 from the light source 308, and the output wave signal CS on conductor 322 among each of the three gyroscope channels comprising the passive fiber rings 302, 304 and 306. The optical switch circuit 350 is controlled by the switch control signals applied as input signals from conductor group 330 on the individual conductors 352, 354 and 356. The control signals will selectively multiplex the incoming light source signal DS from conductor 310 onto one of the individual conductive paths 358, 360 or 362. Path 358 is associated with the fiber ring 302 corresponding to the x axis, while the paths 360 and 362 are associated with the fiber rings 304, 306 and the y and z axes, respectively. Correspondingly, wave signals on each of the paths 358, 360 and 362 propagating into the optical switch circuit 350 can be selectively multiplexed by circuit 350 (under control of the signals from conductor group 330) to the conductor 322. Accordingly, the wave signal CS, at any given period of time, will correspond to a signal associated with an individual one of the x, y or z gyroscope channels.

The individual conductive paths 358, 360 and 362 are each connected to one of a series of three modal filters 364. The modal filters 364 are adapted to filter incoming signals in a manner so as to allow outgoing signals to comprise only one polarization state of one spatial mode. This polarization selection minimizes thermal and pressure-induced phase errors within the passive rings 302, 304 and 306.

Each of the modal filters 364 is connected by means of one of the conductive paths 366, 368 or 370 to an individual one of a series of three beamsplitters 372. Each beamsplitter 372 is adapted to divide incoming optical wave signals from one of the paths 366, 368 and 370 into two equivalent wave signals separately transmitted on individual paths of the conductive path pairs 314, 316 and 318. For purposes of description, the resultant counter-propagating wave signals traveling from the beamsplitter 372 toward the corresponding passive ring 302 (associated with the x axis gyroscope channel) are referred to herein as the clockwise (CW) wave signal 374 and counterclockwise (CCW) wave signal 376 transmitted toward ring 302 on paths 378 and 380, respectively. Correspondingly, with respect to the mutually orthogonal y gyroscope channel and the passive ring 304 associated therewith, the counter-propagating waves are referred to as CW wave signal 382 and CCW wave signal 384 transmitted toward ring 304 on paths 386 and 388, respectively. The wave signals emerging from the beam splitter 372 associated with the z axis gyroscope channel and the passive ring 306 are referred to herein as CW wave signal 390 and CCW wave signal 392 transmitted toward ring 306 on paths 394 and 396, respectively.

The conductive paths connected to the beam splitters 372 are further connected to a series of phase modulators 398. Each phase modulator 398 is responsive to one of the modulator control signals on the conductive paths 568, 570 and 572 of path group 332 for externally applying a time-variant non-reciprocal phase shift to the counter-propagating wave signals appearing on the paths 314, 316 and 318. More specifically, each phase modulator 398 will apply a phase shift of a particular magnitude and polarity to the corresponding CW wave signal as it enters a ring, and will also apply a phase shift of equal magnitude but opposite polarity to the corresponding CCW wave signal as it enters the ring. The magnitude of phase shift will be proportional to the voltage level of the modulator control signal applied to the corresponding phase modulator 398.

After a pair of counter-propagating CW and CCW waves traverse the corresponding ring and emerge therefrom, the corresponding phase modulator will again apply phase shift to the waves, dependent upon the magnitude of the then current modulator control signal. However, the CW and CCW wave signals will now be transposed relative to the conductive paths on which they are propagating.

As an example, assume that as the CW wave signal 374 is propagating toward ring 302 (the x gyroscope channel), corresponding phase modulator control signal applied to the modulator 398 associated with the x gyroscope channel is of a magnitude so as to apply a phase shift of $+A$ (expressed, for example, in radians) to wave signal 374. The modulator 398 will correspondingly apply a phase shift to the CCW wave signal) 376 of $-A$. If it is further assumed that the voltage level of the modulator control signal is reversed in polarity but equal in magnitude when the wave signals 374, 376 emerge from the ring 302, the CCW wave signal, now travelling on path 378, will again experience a phase shift of $-A$. Correspondingly the CW wave signal, now travelling on path 380, will again experience a phase shift of $+A$. The overall relative phase shift (ignoring Sagnac effect shift) between the counterpropagating waves is thus 4 A.

The particular type of phase modulator 398 described above, referred to as a "push-pull" modulator, is advantageous in that it essentially provides a multiplier factor to the modulator gain, thus allowing for a relatively high modulator scale factor, while simultaneously allowing for low voltage modulator control signal operation and a relatively small modulator volume size. However, it should be emphasized that other types of phase modulators could be employed without departing from the basic principles of the invention. For example, a modulator of the type described in the Carrington et al patent could potentially be employed.

One illustrative embodiment of a particularly advantageous physical realization of the optics/ modulator circuit 312 is shown in FIG. 14. As earlier described with respect to FIG. 13, the optical switch circuit 350 is utilized to multiplex the light source circuit 308 and the photodetector circuit 324 between each of the individual x, y and z gyroscope channels. In the embodiment shown in FIG. 14, the optical switch circuit 350 comprises three electro-optic switches 406. Each of the switches in this particular embodiment is an evanescent mode, directional coupler having electrodes configured so that a given input can be switched between either of two outputs by the application of a voltage control signal. The other input of each of the switches 406 is simultaneously switched to the remaining output, with the two switch positions commonly referred to as the "bar" state and the "crossed" state. The control voltage signals are applied to the electrodes on the previously described conductive paths 352, 354 and 356, with each of the paths associated with an individual one of the switches 406. With the use of three of the electro-optic switches 406, the optical signal DS on conductor 310 from the light source 308 can be selectively switched onto any individual one of the conductive paths 358, 360 or 362, associated with the individual gyroscope channels x, y and z, respectively.

Correspondingly, the optical signals appearing on conductive paths 358, 360 or 362 can be selectively multiplexed so that one of the signals is directly coupled to the photodetector circuit 324 by application of the signal onto conductive path 322 as optical wave signal CS. It should be emphasized that the switch configuration shown in FIG. 14 allows multiplexing of the light source signal DS into one of the individual gyroscope channels, while the photodetector circuit 324 is simultaneously connected to a different one of the gyroscope channels. Electro-optic switches are available which can be configured so that a given input signal is switched between either of two outputs by application of a control signal on the order of approximately 25 volts. It has been found that cross-talk associated with a switch configuration as shown in FIG. 14 is less than −30 db, and does not result in any significant interference with respect to the switched signals.

The modal filters 364, as also shown in FIG. 14, can each be physically realized by means of a section of a single mode wave guide 408 and a polarizer 410. Each of the wave guides 408 essentially allows propagation of only one spatial mode of an optical signal. Correspondingly, each of the polarizers 410 essentially "passes through" only one of the two possible polarization states associated with the spatial mode. Details as to the problems associated with potential use of an optical rate sensor with multiple spatial modes and/or polarization states are set forth in the commonly assigned Fredericks et al U.S. patent application Ser. No. 853,475, filed Apr. 18, 1986.

The beam splitters 372 of the optics/modulator circuit 312 are physically realized in the embodiment shown in FIG. 14 by means of a series of Y-couplers 412. The Y-couplers 412 are responsive to input signals appearing on the conductive paths 366, 368 and 370 so as to divide the signals into two substantially equivalent wave signals which then propagate in counter-traveling directions through the passive fiber rings 302, 304 and 306.

As further shown in FIG. 14, the phase modulators 398 of the optics/modulator circuit 312 are physically realized by means of a series of electrode pairs 414 which are located along branches of the Y-couplers 412. Each of the phase modulators 398 is controlled by means of a modulator control signal from one of the conductive paths 568, 570 or 572. Voltage signals applied as control signals on these conductive paths will cause phase shifts in the optical light wave signals appearing on the Y-coupler branches by means of a relatively well-known electro-optic effect. With the particular geometry of the Y-couplers 412, each of the phase modulators 414 is essentially operated in a "push-pull" configuration. As earlier described, this pushpull operation allows use of a relatively high modulator scale factor, while simultaneously allowing for low voltage operation and a relatively small volume size for each of the modulators 398.

The electro-optical switches 406, wave guides 408, polarizers 410, Y-couplers 412 and phase modulator electrode pairs 414 can advantageously be integrated onto a single integrated chip comprising a crystal of z-cut lithium niobate ($LiNbO_3$) With the use of conventional photolithographic techniques, the various wave guide structures can be put on the surface of the crystal in the form of a thin film of titanium (450 or 650 angstrom thickness for 0.85 or 1.3-microns wavelength, respectively). The titanium can then be indiffused into the crystal at a relatively high temperature (e.g. 1050° C.) for a period of several hours in an atmosphere of flowing "wet" oxygen so as to inhibit the "out diffusion" of lithium oxide, which would otherwise form an unwanted planar wave guide structure. When the titanium is indiffused, the result is a local increase in the refractive index of the crystal along the conductive paths, thereby providing the conditions necessary for appropriate transmittal of light waves.

Following this procedure, appropriate dielectric and metal layers are applied in conjunction with the lithographic process so as to form electrode structures having buffer layers beneath the structures. The elements comprising the polarizers 410, composed of metal and dielectric layers such that one of the orthogonal polarization states is removed from the wave guide beneath the layer, are fabricated in a relatively similar process.

A detailed block diagram of the triad apparatus 300 is illustrated in FIG. 15, and the structure and functional operation of the apparatus 300 will now be described with reference to FIGS. 15–28. The light source circuit 308 which provides a means for generating the optical wave signal DS on conductive path 310 can comprise a light emitting diode (LED) device 450 driven by a power supply 452. The LED device 450 can be conventional in design and is a relatively lower cost alternative to the more expensive laser diode-type device typically used in several known optical rate sensors. The LED device 450 has an inherently wide optical bandwidth, and generates the optical signal DS with a nominal wave length of $L_o$. Various types of relatively well-known LED devices can be utilized for the laser source circuit 308. It should be emphasized, however, that a triad apparatus in accordance with the invention is not limited to use of the particular LED source 450. Other light source circuits capable of generating optical or similar electromagnetic wave signals can be utilized.

The optical signal DS on conductor 310 is applied, as previously described, as an input signal to the optical switch circuit 350. The switch circuit 350 selectively multiplexes the signal DS onto one of the conductive paths 358, 360 or 362 associated with the x, y or z gyroscope channels, respectively. Any one of various types of circuit configurations can be employed for the switch circuit 350. However, a preferable physical realization of the switch circuit 350 comprises the electro-optical switches 406 previously described with respect to FIG. 14.

The remaining portion of the optics/modulator circuit 312 will now be described primarily with respect to the x gyroscope channel, since the structural configuration of each of the y and z gyroscope channels is substantially equivalent. Assuming that the optical signal DS is multiplexed onto the conductive path 358 and the effective gyroscope channel x by means of the optical switch circuit 350, the signal DS is applied as an input signal to modal filter 364. As also previously described with respect to FIG. 14, the modal filter 364 can comprise a section of a single mode wave guide so as t pass through only one low order spacial mode, thereby filtering out the high order modes. Correspondingly, the modal filter 360 can also comprise a polarizer so as to essentially pass through only one of the two possible polarization states for the single spacial mode optical signal. Details relating to the principles of operation of single mode optical fibers and polarizer elements are described in the commonly-assigned U.S. patent application Ser. No. 853,475 filed Apr. 18, 1986.

The optical signal filtered by the modal filter 364 is applied as an input signal on conductive path 366 to the beam splitter 372 associated with the x gyroscope channel. As earlier described, the beam splitter 372 can comprise, for example, a directional coupler and provides a means for dividing the optical signal DS (filtered by the modal filter 364) into the equivalent counter-propagating CW wave signal 374 and CCW wave signal 376 on paths 378 and 380, respectively. Although one embodiment of the beam splitter 372 can be configured as a directional coupler as described with respect to FIG. 14, various other types of circuitry can be utilized to provide the appropriate beam splitting function.

If certain types of devices are employed for the splitters 372, it is preferable to employ two splitters for each gyroscope channel. The concepts associated with the use of two beamsplitters are relatively well known and described, for example, in the previously referenced Fredericks et al patent application. However, in the embodiment shown in FIGS. 14 and 15, the use of the optical switch 350 eliminates the need of a second beam splitter for each gyroscope channel. In addition, it should be noted that use of any conventional beam splitter typically results in power loss of the optical wave. The use of the optical switch 350 instead of an additional couplertype splitter substantially eliminates the typical 6 db power loss associated with such a splitter.

As further illustrated in FIG. 15, the counter-propagating wave signals 374 and 376 are applied on the conductive paths 378 and 380 as input signals to the corresponding phase modulator 398. The phase modulator 398 operates as previously described so as to apply a phase shift to the CW wave 374 of a particular magnitude and polarity, and to also apply a phase shift of equivalent magnitude but opposite polarity to the CCW wave 376. With respect to the phase modulator 398 associated with the x gyroscope channel, the magnitude and polarity of the applied phase modulation shift at any given time is directly proportional to the modulator control signal voltage applied on conductor 568.

After relative phase shift has been applied between the counter-propagating wave signals 374, 376, the signals are each preferably applied through a depolarizer 454. The depolarizers 454 serve to reduce potential signal fading resulting from cross-coupling ring interreactions. In addition, it is also preferable to include a similar depolarizer 455 on path 310 between the light source circuit 308 and the optical switch circuit 350 as shown in FIG. 15. The depolarizer 455 serves to reduce the bound on the amount of nonreciprocal phase error to a value substantially corresponding to the product of the amplitude extinction ratio of the polarizer associated with the modal filter 364, and the residually polarized light entering the optical fiber ring 302. Although any of several types of optical circuit configurations can be employed to physically realize each of the depolarizers 454 and 455, one preferable type of depolarizer is commonly referred to as a Lyot depolarizer described in *Annales De L'Observatire D'Astronomie De Paris* (Mendon), Volume VIII, p. 102, 1929 by Lyot, and *A Monochromatic Depolarizer*, J. Opt. Soc. Amer., Volume 41, pp. 966–975, 1951.

Relatively recently, Lyot depolarizers have been described which are constructed from birefringent single mode fibers, instead of the previously-known crystal plates. A mathematical description of the operation of a fiber Lyot depolarizer with a wide band light source is described in "Degree of Polarization in the Lyot Depolarizer", *IEEE Journal of Light Wave Technology*, Volume LT-1, No. 3, September 1983 by Burns. In addition a heuristic description of the Lyot depolarizer's operation is provided in the "The Temporal Coherence of Various Semiconductor Light Sources Used in Optical Fiber Sensors," *First International Conference on Fiber-Optic Rotation Sensors*, MIT, Cambridge, Mass., November, 1981, Springer-Verlag, 1982 by Epworth. Several of the principles associated with the use of Lyot depolarizers and optical rate sensors are described in the previously referenced and commonly assigned U.S. patent application Ser. No. 853,475.

The CW wave signal 374 and the CCW wave signal 376, as they emerge from the depolarizers 454, are applied by means of the ring ports 456 and 458, respectively, to the optical fiber ring 302, and propagate in opposite directions relative to each other. The fiber ring 302 can be circular in structure with a radius of R and a physical path length of L. The ring 302 is preferably a multiple turn coiled ring so as to provide an increased path length which effectively increases the resultant Sagnac induced phase shift for given values of angular rotation rate $G_{IX}$ of the ring 302 associated with the x gyroscope channel. The fiber ring can, for example, consist of approximately one kilometer of single mode fiber material wound into a multi-turn configuration. The optical fiber ring should be thermally designed so as to minimize time-varying thermal gradients which can produce transient bias errors in all fiber ring optical sensors as commonly known in the art.

After propagation through the ring 302, the wave signals 374, 376 emerge therefrom with a relative Sagnac-induced phase shift resulting from a non-zero angular rotation rate $G_{IX}$ of ring 302. With the CW wave 374 then propagating on path 380 and CCW wave 376 propagating on path 378, the corresponding phase modulator 398 again applies relative phase shift to the waves (in the manner earlier described), with the magnitude and polarity of phase shift proportional to the magnitude and polarity of the modulator control signal voltage then currently applied to modulator 398 from conductive path 568. The wave signals 374, 376 again propagate through the splitter 372, filter 364 and switch 350, with the splitter 372 recombining the wave signals 374, 376. The recombined wave signal will have a phase angle dependent on the total relative shift between the corresponding counter-propagating waves 374, 376 resulting from the Sagnac effect and the phase modulator 398. The switch circuit 350 will operate to selectively apply the recombined signal to the conductive path 322. This signal corresponds to optical wave signal CS previously described with respect to FIG. 12.

The conductive path 322, connected to the optical switch circuit 350, leads to an input terminal of the photodiode circuit 324. The photodiode circuit 324 comprises a conventional photodiode 460 which provides a means for generating a current signal on conductor 462 representative of a spatially sampled portion of a low order fringe pattern of the wave signal CS. For example, photodiode 460 can comprise a PIN silicone photodiode having substantially low dark current and noise, and operable in a photo-conductive mode with relatively fast response.

Connected to the photodiode 460 by means of conductor 462 is a photodiode transconductance amplifier or "preamp" 464 which provides a means for converting low level output current from the photodiode 460 on conductive path 462 to a voltage level signal on conductor 326. The voltage level of the signal on conductor 326 is of a magnitude suitable for subsequent sampling and analog-to-digital (A/D) conversion functions. The transconductance amplifier 464 is well known in the circuit design art and can for example, comprise a conversion ratio of $2.5 \times 10^8$ volts per ampere, with a bandwidth in the range of 1 MHz and an output voltage range of 10 volts. The output signal from preamp 464 on path 326 is characterized as intensity signal S.

Connected to an output terminal of transconductance amplifier 338 by means of conductor 326 is a high pass filter 474. The filter 474 provides a means for filtering low-frequency transients and similar undesired signals. Circuit 474 is a conventional high pass filter with a frequency cutoff, for example, of approximately 1 kHz.

The filtered signal from the high pass filter 474 is applied as a input signal from conductive path 476 to each of a series of three demodulators 478 as also shown in FIG. 15. Each demodulator 478 is associated with one of the x, y or z gyroscope channels. Also applied as an input signal to each demodulator 478 is one of three periodic signals $F_{1x}$, $F_{1y}$ and $F_{1z}$, corresponding to the x, y and z gyroscope channels, respectively. Each of these three signals is generated by master clock 68 and is of a frequency $f_1$, and is shown in the timing diagram of FIG. 23. The demodulators 478 provide means for removing the high frequency modulation components of the filtered signal input from conductive path 476. The demodulators 478 are conventional in design and can comprise, for example, conventional signal multipliers or "dividers" for purposes of shifting the frequency spectrum of the input signal on conductive path 476 by the frequency $f_1$.

The filtered signal input to the demodulators 478 will, for given time periods, comprise a modulated signal representative of the difference between the Sagnac effect phase shift resulting from externally-induced angular rotation rate, and the non-reciprocal phase shift induced by one of the phase modulators 398 for a particular one of the gyroscope channels x, y or z. The demodulators 478 are synchonous with respect to the modulation of the input signal, and thus remove the modulation from this "phase error" signal.

The resultant demodulated phase error signals output from the demodulators 478 are designated in FIG. 15 as phase error signals $P_{ex}$, $P_{ey}$ and $P_{ez}$. Each of these signals is applied on one of the conductive paths 484, 486 or 488 to a corresponding one of three analog integrators 490. Each of the three analog integrators 490 is associated with one of the gyroscope channels x, y or z. Each analog integrator 490 is essentially a storage circuit which integrates the applied phase error signal over time, and provides a means for presenting the information contained in the phase error input signal in a manner so as to contain or bound error sources resulting from noise and the subsequently described A/D conversion function.

The integrated signals from the integrators 490 are applied on conductive paths 492, 494 and 496 to a multiplexer 498. The multiplexer 498 operates so as to time multiplex the output signals from each of the analog integrators 490 onto the conductive path 500. Timing for operation of the multiplexer 498 can be provided by clock signals from master clock 468 on conductive path 504. The resultant integrated phase error signal, designated signal IE in FIG. 15, is then applied on conductive path 500 as an input signal to a conventional A/D converter 506. The A/D converter 506 comprises a means for converting the integrated phase error signal on path 500 to a digital signal for purposes of subsequent processing by central processing unit (CPU) 508.

A/D converter 506 is preferably controlled by means of clock pulses applied on conductor 510 from the master clock 468. The clock pulses operate as "start" pulses for performance of the A/D conversion. A/D converter 506 can be any suitable analog-to-digital conversion circuit well known in the art and can, for example, compose 12 binary information bits, thereby providing a resolution of 4,096 levels per integrated signal. A conversion time of 30 microseconds or less is suitable for purposes of using the triad apparatus 300 in various aircraft and missile applications.

The A/D converter 506 is connected by means of conductive paths 512 to a sample register 514. The sample register 514 comprises a means for storage of digital information signals representative of the sampled and integrated signals from the A/D converter 506. Sample register 514 is conventional in design and, for example, can comprise a 12-bit latch memory. The output of the sample register 514 is connected to the CPU 508 by means of conductive path 516. The conductive path 516 provides a means for transmitting the binary information signals stored in sample register 514 directly to the CPU 508 one at a time.

The CPU 508 provides several functions associated with operation of the triad apparatus 300. In the embodiment described herein, the CPU 508 is utilized to perform these functions by means of digital processing and computer programs. However, it should be emphasized that the functional operations of CPU 508 could also be provided by means of discrete hardware components.

In part, the CPU 508 is utilized to compute a "best estimate" of each of the angular rates $G_{IX}$, $G_{IY}$ and $G_{IX}$ associated with the x, y and z gyroscope channels, respectively. Signals representing these angular rates and the corresponding incremental angles are generated as output signals on the conductive path pairs 338, 340 and 342. In addition, the CPU 508 utilizes the phase error information from signal IE to generate signals which, through subsequently described circuitry of the triad apparatus 300, are applied to the phase modulators 398 in a manner so that the modulators 398 generate non-reciprocal phase shifts equal in magnitude and opposite in polarity to the Sagnac effect phase shift resulting from angular rotations of the passive fiber rings. In accordance with the foregoing, the actual signals generated by the CPU 508 are dependent on the integrated phase error signal IE. Accordingly, triad apparatus 300 differs in part from the Carrington et al arrangement in that the apparatus 300 operates in a true closed-loop mode, while Carrington et al is better described as an open-loop arrangement, with the exception of minor variations in the phase modulator drive voltage pattern to attempt to "center" the intensity signal peak as earlier described in the section entitled "Background Art." The principles associated with such closed-loop operation are described in substantial detail in the previously-referenced and commonly-assigned Sugarbaker et al patent application.

The CPU 508 operates under control of clock signals from the master clock 468 applied through conductive path 518. Signals generated by CPU 508 for use with the phase modulators 398 are applied as output signals in the form of digital information signals on the conductive paths 520, 522 and 524 which form the conductive path group 526. The output signal from the CPU 508 on conductive path 520 is characterized herein as the control signal $u_x$. Correspondingly, the output signals on conductive paths 522 and 524 are characterized as control signals $u_y$ and $u_z$, respectively. Control signal $u_x$ is associated with the Sagnac effect phase shift induced by angular rotation of ring 302, and the nonreciprocal phase shift induced by the corresponding phase modulator 398, i.e. the x gyroscope channel. Control signals $u_y$ and $u_z$ are similarly associated with the y and z gyroscope channels, respectively.

The control signals $u_x$, $u_y$ and $u_z$ are each applied to one of three digital-to-analog (D/A) converters 528. Each of the D/A converters 528 is conventional in design and provides a means for converting its input digital signal to a corresponding analog signal which is applied as an output signal on one of the conductive paths 532, 534 and 536, each path associated with one of the x, y and z gyroscope channels, respectively.

The signal $u_x$ on conductive path 532 is a variable amplitude feedback signal which contains information representative of an estimated value of the Sagnac phase shift $P_{sx}$ resulting from angular rotation of the passive ring 302 for the x gyroscope channel. The signals $u_y$ and $u_z$ are also variable amplitude feedback signals containing information representative of estimated values of Sagnac phase shifts $P_{sy}$ and $P_{sz}$ resulting from angular rotations of the passive rings 304, 306 for the y and z gyroscope channels, respectively.

The converters 528 can be any suitable D/A conversion circuits capable of providing latched analog output signals corresponding to 16 bit binary input signals, with a conversion and settling time of less than 10 microseconds. It should be noted that the 16-bit analog output signals from each of the D/A converters 528 will be sufficient to provide appropriate resolution of the driving voltage input signals to the phase modulators 398, notwithstanding that inertial rotation rates of the rings 302, 304 and 306 may have a dynamic range on the order of $3.6 \times 10^6$. The manner in which this resolution is achieved with the use of a 16-bit D/A converter is briefly described in subsequent paragraphs herein, and set forth in substantial detail in the previously-referenced Sugarbaker et al patent application. The analog output signals generated from the D/A converters 528 are each applied on individual conductors 32, 534 and 536 to one of a series of three conventional hold circuits 538. The hold circuits 538 provide appropriate interfaces between the converters 28 and the subsequent circuitry described herein. The output signals from the hold circuits 538 are each applied as input signals on conductive paths 540, 42 and 544 to one of a series of three attenuators 46. Each of the attenuators 546 may have an attenuation constant of $1/K_o$, and is utilized in part because of the relatively high gains which must be employed in the CPU 508 for purposes of relatively accurate control and rate estimation as will be described in subsequent paragraphs herein. For low inertial rate inputs, the attenuation constant should be relatively high (i.e. $K_o \gg 1$). For high rate inertial inputs, the attenuation constant can approach unity. It should be emphasized, however, that any changes in the attenuation constant must be accompanied by corresponding changes in the attenuation constant $K_o$ within CPU 508 as described in subsequent paragraphs herein with respect to FIG. 26.

The attenuated output signals from the attenuators 546 are applied on conductive paths 548, 550 and 552 to each of a series of three wave form generators 554. Also applied as input signals to each of the wave form generators 554 is one of three periodic signals $F_{2x}$, $F_{2y}$ and $F_{2z}$, each signal having a period $f_2$ and generated by master clock 468. These signals are employed to modulate the attenuated and analog-converted control signals $u_x$, $u_y$ and $u_z$, respectively, so as to apply level adjusted AC signals resulting from the control signals to their corresponding phase modulators 398 at appropriate time periods.

Each wave form generator 554 utilizes the input signals to generate one of the signals $A_{2x}$, $A_{2y}$ and $A_{2z}$ on a corresponding one of the conductive paths 556, 558 and 560, respectively. The signals $A_{2x}$, $A_{2y}$ and $A_{2z}$ correspond to the x, y and z gyroscope channels, respectively. As will be described in greater detail herein, the change in amplitude of each of these signals from one given time period to the next will be a function of the Sagnac effect phase shift for the corresponding gyroscope channel.

Each of the signals $A_{2x}$, $A_{2y}$ and $A_{2z}$ is applied as an input signal to one of a series of three "adder" circuits 562. Also applied as an input signal to each of the adder circuits 562 is a signal $A_1$ on conductive path 564 as generated by the wave form generator 566. The wave form generator 566 utilizes an input signal $F_3$ generated from master clock 468, comprising periodic clock pulses having a frequency $f_3$. The signal $A_1$ can be characterized as an AC bias or "dither" signal, with a period equal to twice the time period T corresponding to the transit time for light waves to propagate through any one of the rings 302, 304 or 306.

The AC bias signal is applied as a portion of the input signal to each of the phase modulators 398, and the amplitude and polarity thereof at any given time will determine in part the magnitude and polarity of the phase shift induced in the counter-propagating wave signals passing through the phase modulators. This signal will thus operate to cause the relational pattern of the output intensity signal S to be "shifted" with respect to the Sagnac phase shift for each gyroscope channel. In the absence of any Sagnac effect phase shift, the non-reciprocal phase shift resulting from the AC bias signal will cause the measured intensity signal S to essentially continuously operate on a substantially linear and "maximum slope" portion of the relational pattern. In accordance with conventional digital sampling and communication theory, such a system will be substantially more sensitive to changes in Sagnac phase shift due to angular rotation rate changes, than will a system where the expected values of phase shift occur on or near peaks or valleys of the sinusoidal relational pattern between the intensity signal and the Sagnac effect phase shift.

Although the AC bias signal will be of an amplitude and frequency so as to cause the relational pattern of intensity signal S versus induced phase shift to operate at a high slope region in the absence of Sagnac effect phase shift, a non-zero angular rotation rate would produce Sagnac induced phase shift and cause the relational pattern to shift away from the high slope region. However, the signals $A_{2x}$, $A_{2y}$ and $A_{2z}$ will be generated with amplitudes which will also produce nonreciprocal phase shift so as to offset the Sagnac effect phase shift, thereby maintaining the relational pattern at the high slope regions. In accordance with the foregoing, the triad sensor apparatus 300 will operate in a manner such that changes in inertial rate and, correspondingly, Sagnac phase shift will have a substantially "maximum" and linear effect on corresponding changes in magnitude of the intensity signal S at the output of the photodiode circuit 324.

In further explanation, and as shown in FIG. 15, each of the adder circuits 562 generates one of a series of three modulator control signals $A_{3x}$, $A_{3y}$ and $A_{3z}$, on one of the three conductive paths 568, 570 or 572 (forming path group 332), respectively. $A_{3x}$, $A_{3y}$ and $A_{3z}$, correspond to signals associated with the x, y and z gyroscope channels, respectively. The signal $A_{3x}$ comprises the sum of the signals $A_1$ and $A_{2x}$ applied as input signals to the corresponding adder circuit 562. Similarly, the signals $A_{3y}$ and $A_{3z}$ on conductive paths 570 and 572, respectively, each comprises the sum of the signals $A_1$ and $A_{2y}$, and the signals $A_1$ and $A_{2z}$, respectively.

Each of the modulator control signals $A_{3x}$, $A_{3y}$ and $A_{3z}$ generated from the adder circuits 562 is applied as an input signal to a corresponding one of the three phase modulators 398. The phase modulators 398 are responsive to the modulator control voltage signals on the conductive paths 568, 570 and 572 to induce phase shifts to the CW and CCW wave signals then propagating through the modulators. The magnitudes and polarities of the phase shifts are directly dependent and proportional to the modulator control signal driving voltages from the adders 562. Accordingly, the magnitude and polarity of the phase shift applied by phase modulator 398 associated with the x gyroscope channel to the CW and CCW wave signals propagating on paths 378, 380 is thus proportional to the magnitude and polarity of signal $A_{3x}$. Correspondingly, the magnitudes and polarities of the phase shifts applied to the CW and CCW wave signals appearing on conductive paths 386, 388 and 394, 396 are proportional to the magnitudes and polarities of the signals $A_{3y}$ and $A_{3z}$, respectively.

It should be emphasized that a distinction must be made between the instantaneous phase delay applied to light wave signals traveling through the phase modulators 398, and the non-reciprocal phase shift of the intensity signal S or CS wave resulting from the phase modulator outputs. That is, although the absolute phase delays induced by the phase modulators 398 at any given instant of time are directly proportional to the magnitudes of the instantaneous voltages applied as input to the phase modulators, the non-reciprocal phase shift $P_B$ of the intensity signal S resulting from the output of any one of the phase modulators is dependent on the difference in phase delay applied by the phase modulator to the two counter-propagating waves associated with the corresponding gyroscope channel. Accordingly, the nonreciprocal phase shift $P_B$ of the intensity signal is dependent in part on the change in phase modulator input voltage over a time period corresponding to the nominal transit time of a wave through the corresponding passive ring 302, 304 or 306.

Although not shown in FIG. 15, and also not comprising any principal basis for the novel concepts of the invention, the triad sensor apparatus 300 can include means for achieving temperature compensation for measurements of angular inertial rotation rates. For example, temperature monitors can be associated with the phase modulators 398, and analog signals generated by the monitors applied to A/D conversion circuitry. The A/D conversion circuitry could be utilized to convert the temperature monitor signals to digital signals capable of storage within a buffer and application to the CPU 508. Such temperature compensation could be utilized to adjust the particular voltage drive patterns applied to the phase modulators 398 on the basis of temperature changes of the modulators themselves. It should also be noted that temperature compensation can be advantageous in that variations in ring diameter can also occur as a result of temperature variations. Such changes in ring diameter can affect the proportional relationship between the Sagnac effect phase shift $P_s$ and the angular rotation rate $G_I$, previously referenced herein as the ring scale factor $K_s$.

The complete functional operation of the triad sensor apparatus 300 in accordance with the invention will now be described. Referring again to FIG. 15, a light wave signal DS is applied from the LED source 450 on the conductive path 310. The wave signal DS first passes through the depolarizer 455. Under control of timing switch signals applied on the conductive path group 330 from master clock 468, the optical switch circuit 350 will operate to time multiplex light signal DS (having a nominal wave length $L_o$) onto a selective one of the conductive paths 358, 360 or 362, corresponding to the x, y and z gyroscope channels, respectively.

For purposes of description, the propagation of light wave DS through the optics/modulator circuit 312 will be described primarily with respect to the x gyroscope channel, since propagation is similar with respect to each of the other y and z gyroscope channels. The light wave DS will be sequentially multiplexed onto each of the output conductive paths from the switch circuit 350 for equivalent time periods, with each time period equal to the transit time T of optical waves through each ring. With reference to the timing diagrams of FIGS. 22 and 23, the light wave DS is shown as being time multiplexed onto the conductive path 358 for a period between relative times $t_1$ and $t_2$. The time multiplexed portion of the signal DS on conductive path 358 is then applied through modal filter 364 and beam splitter 372 as previously described herein. The resultant CW wave signal 374 and CCW wave signal 376 on conductive paths 378 and 380, respectively, are then applied through the corresponding phase modulator 398, which induces a relative phase shift between the wave signals as earlier described. The magnitude of this phase shift at any given instant of time is proportional to the modulator control voltage signal $A_{3x}$ applied on conductive path 400 from the previously described adder 562 associated with the x gyroscope channel.

After phase modulation, the CW wave signal 374 and CCW wave signal 376 are applied through depolarizers 454 and into ring 302 through ring ports 456 and 458, respectively. Ignoring for a moment Sagnac effect phase shift, the transit time for each of the wave signals to traverse the ring 302 is the time period T.

As the CW signal 374 and CCW signal 376 emerge from fiber ring 302, they appear on conductive paths 380 and 378, respectively, and are again applied through the depolarizers 454 and corresponding phase modulator 398. Another relative phase shift is then induced between the counter-propagating waves, proportional to the then current magnitude of the modulator control voltage signal $A_3{}^x$. The CW and CCW wave signals 374, 376 are then applied to beam splitter 372 and modal filter 364, which operate to recombine the wave signals. The recombined wave signal will have an overall phase shift resulting from both Sagnac effect phase shift and non-reciprocal phase shift induced by phase modulator 398. As the recombined wave signal appears on conductive path 358, it is time mulitplexed through the optical switch circuit 350 onto the conductive path 322 during a time period shown in the timing diagrams of FIGS. 22 and 23 as the relative period of time between the times $t_2$ and $t_3$.

During this same time period, the optical switch circuit 350 will also be operative, under control of switch signals applied from master clock 468 to the conductive path group 330, to multiplex the incoming wave signal DS onto the conductive path 360 for the y gyroscope channel. The portion of the wave signal DS multiplexed onto the conductive path 360 during this time period is applied through the modal filter 364, beam splitter 372 and phase modulator 398 corresponding to the y gyroscope channel, and through the fiber ring 304. After this wave signal propagates through the fiber ring 304, the optical switch circuit 350 is controlled so as to switch the signal onto conductive path 322 during the period of time shown in the timing diagrams of FIGS. 22 and 23 between time periods $t_3$ and $t_4$. During this same period, the switch circuitry 350 is operative so as to time multiplex the incoming wave signal DS onto the conductive path 362 associated with the z gyroscope channel. The wave signal DS applied to the conductive path 362 is further applied through the modal filter 364, beam splitter 372 and phase modulator 398 associated with the passive fiber ring 306 and the z gyroscope channel. After the wave signal on conductive path 362 traverses the fiber ring 306, switch circuit 350 will be operative so as to apply the returning wave signal to the conductive path 322 during the period of time shown in the timing diagram of FIGS. 22 and 23 as between the time periods $t_4$ and $t_5$. During this same time period, the incoming wave signal DS is again being applied through ring 302 associated with the x gyroscope channel under control of the optical switch circuit 350.

With the output wave signal CS on conductive path 322 being applied to the photodetector circuit 324, the switching pattern shown in the timing diagram of FIG. 23 is readily apparent. That is, while the incoming light wave signal DS is being applied to the x gyroscope channel, the light wave signal CS on conductive path 322 being detected by the photodiode circuit 324 corresponds to the light wave signal which has been transmitted through the fiber ring 306 associated with the z gyroscope channel. For purposes of description, when the optical switch circuit 350 is multiplexing a light wave signal onto or from a conductive path associated with a particular gyroscope channel, the gyroscope channel will be characterized as being "active." In a manner similar to the foregoing, when the y gyroscope channel is active to receive the incoming light wave signal DS, the x gyroscope channel will be active so as to apply to conductive path 322 the light wave signal which has been transmitted through the passive ring 302. Correspondingly, when the z gyroscope channel is active so as to receive the incoming light wave signal DS, the y gyroscope channel will be active so as to apply the wave signal transmitted through the passive ring 304 to the conductive path 322.

Each of the individual time periods during which a particular gyroscope channel is active to receive the incoming light wave signal DS or to apply to conductive path 322 the light wave signal transmitted through its corresponding passive ring is equivalent to one full transit time of each ring. Accordingly, during any given time period, two of the three gyroscope channels will be active. The incoming modulator control signal voltages applied to the phase modulators 398 will be held constant during any given time period when their corresponding gyroscope channels are active. Further, however, the incoming modulator control signal voltage for the phase modulator 398 associated with any given gyroscope channel will be changed to a different level at the point in time when the incoming light wave signal DS is essentially "turned off" with respect to the particular gyroscope channel, and the optical switch circuit 350 commences application of the wave signal transmitted through the gyroscope channel's fiber ring onto the conductive path 322. This change in incoming modulator voltage will cause a proportional nonreciprocal phase shift, and the output of the photodiode circuit 324 will be a function of the inertial input rate for the fiber ring of the particular gyroscope channel, and the proportional non-reciprocal phase shift resulting from the operation of the corresponding phase modulator 398. In view of the given time period during which a particular gyroscope channel will remain active, the phase modulation for the corresponding channel will be changed between the time that the corresponding CW and CCW wave signals are transmitted into the associated fiber ring, and the time at which the wave signals emerge from the fiber ring. The value of the non-reciprocal phase shift applied by the phase modulator will be dependent in part on the change in phase modulator output between these two instances of time.

The CS wave on conductive path 322 is applied as an "impinging" signal to the photodiode 460 as depicted in FIG. 15. The photodiode 460 generates an output current signal, represented as intensity signal S, having an intensity representative of the "low order" fringe pattern of the CS wave signal. The low order fringe pattern of the CS wave will be representative of the relative phases of the CW and CCW wave signals having propagated through the fiber ring associated with the corresponding gyroscope channel. Photodiode 460 provides a current output signal specifically representative of the zero order fringe pattern of the wave signal on conductive path 322. Elements other than the photodiode 460 could be utilized to derive an output signal having an intensity proportional to first, second or other order fringe patterns of the CS wave. The current output signal on conductive path 462 is directly applied as an input signal to the transconductance amplifier 464 which, as previously described, provides a voltage output intensity signal S on the conductive path 326 having a level suitable for subsequent functional operations thereon.

As previously discussed with respect to prior art systems employing passive ring Sagnac interferometers and sensors, such as the optical rate sensor 100, the relationship of an intensity signal S to a Sagnac phase shift $P_S$ and fixed induced phase shift $P_B$ is shown in Equation 3. With respect to an optical rate sensor such as the rate sensor 200, wherein a time variant nonreciprocal phase shift is applied to the counter-propagating waves, the relationship of the intensity signal S to the Sagnac phase shift $P_S$ is as shown in Equation 4.

Figure 1:
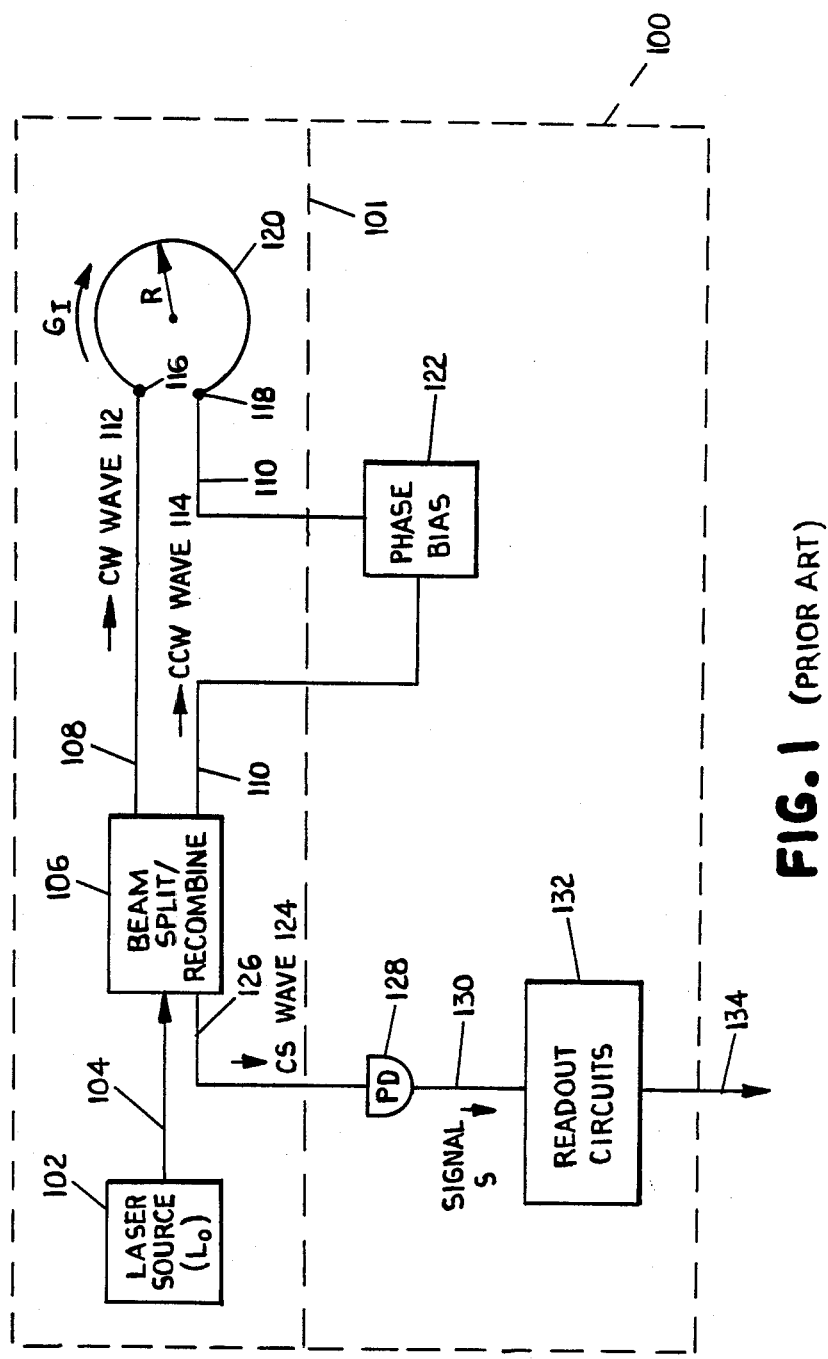
FIG. 1 is a schematic block diagram of an optical rate sensor comprising a passive ring Sagnac interferometer.
Figure 2:
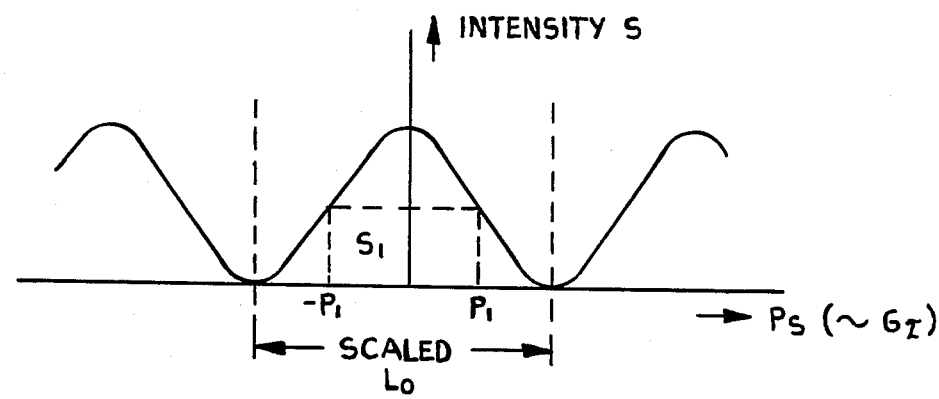
FIG. 2 is a diagram illustrating the wave form of an output intensity signal and its correspondence to Sagnac phase shift of counter-propagating waves within the interferometer shown in FIG. 1.
Figure 3:
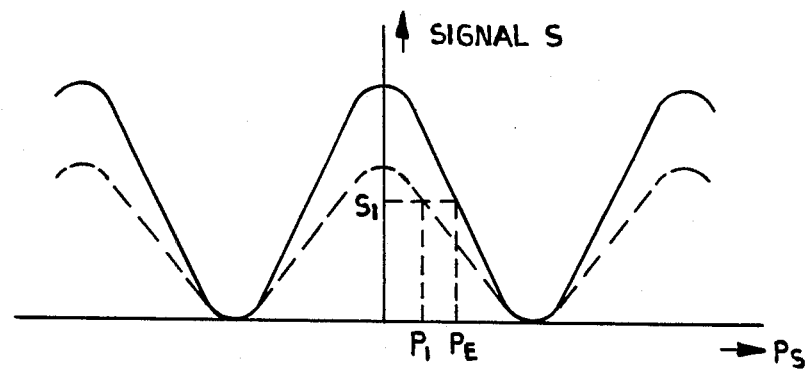
FIG. 3 is a diagram illustrating the effect of laser source intensity changes on the measurement of Sagnac phase shift within the interferometer shown in FIG. 1.
Figure 4:
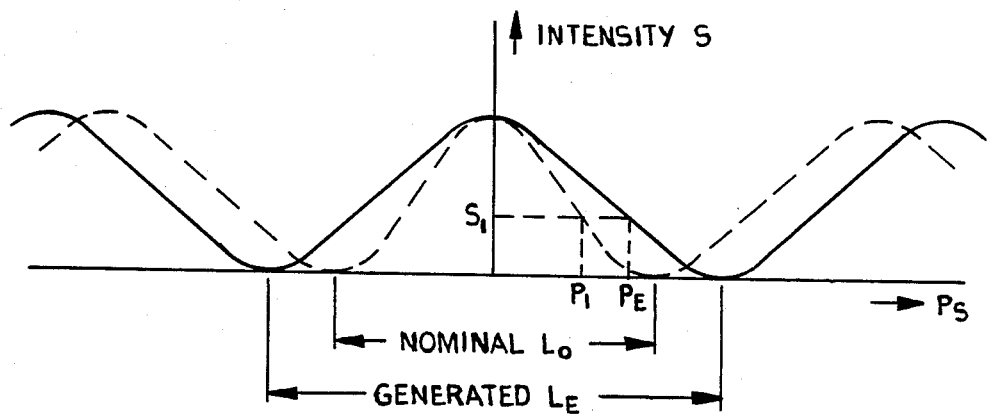
FIG. 4 is a diagram illustrating the effect of laser source wavelength changes on the measurement of Sagnac phase shift within the interferometer shown in FIG. 1.
Figure 8:
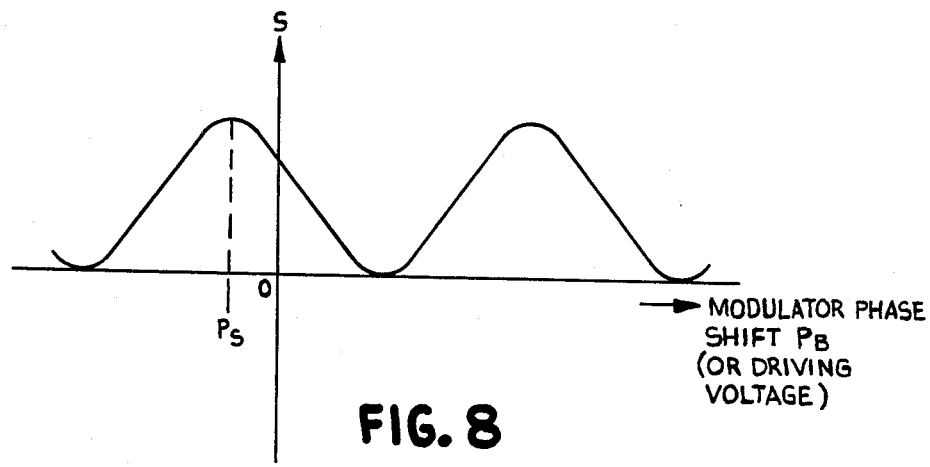
FIG. 8 depicts the output wave form of an intensity signal generated within the optical rate sensor shown in FIG. 6.
Figure 6:
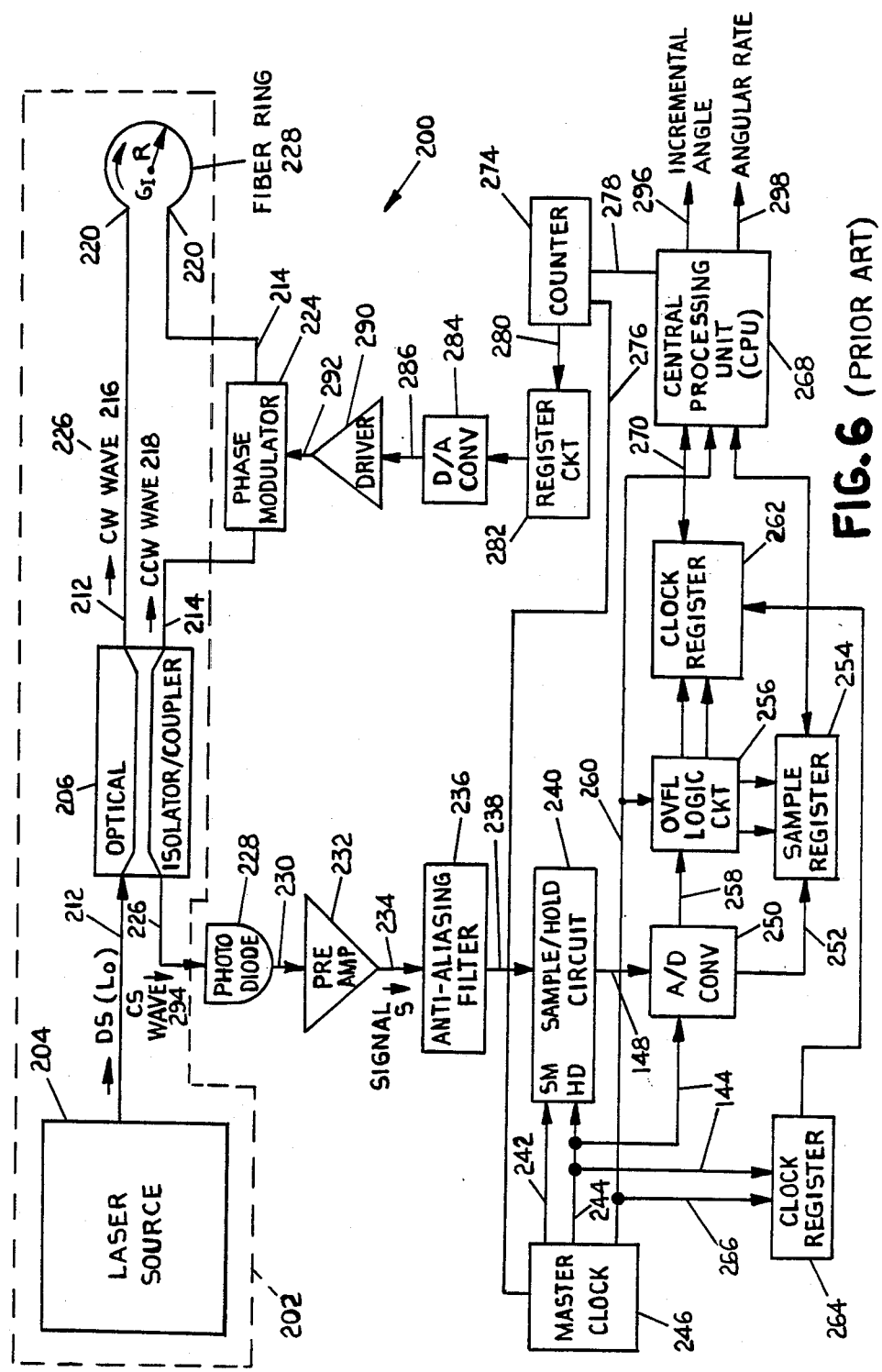
FIG. 6 is a schematic diagram of another known optical rate sensor comprising a passive ring Sagnac interferometer and a phase modulator.
Figure 9:
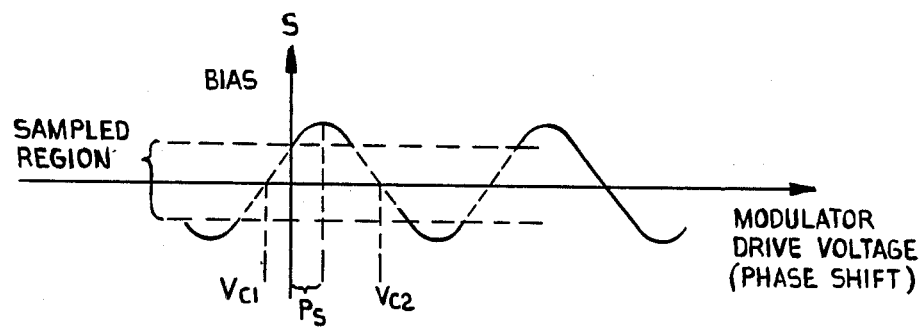
FIG. 9 depicts the intensity signal shown in FIG. 8 after it has been center biased and further depicts the sampling region for sampling the intensity output signal.

As also previously described with respect to the rate sensor 200, if the phase shift $P_B$ applied through a phase modulator associated with a particular gyroscope channel is varied rapidly in time relative to expected rates of change of rotation, the pattern of the intensity signal S relative to the modulator phase shift $P_B$ will appear similar to the pattern previously described and depicted in FIG. 2, when there is a substantially zero rate of angular rotation $G_I$ of the passive ring. However, the abscissa axis of this wave pattern and the rate sensor 200 is then the externally applied phase shift $P_B$, rather than the Sagnac phase shift $P_S$ as depicted in FIG. 2. The effect of nonzero angular rotation rate of the passive ring then causes the relational pattern of signal S relative to the modulator phase shift $P_B$ to translate to the left or right of the voltage drive axis origin as depicted in FIG. 8. The specific magnitude and direction of translation, characterized in the Carrington et al patent as "phase offset", can be readily shown to directly correspond to the magnitude of and direction of observed Sagnac phase shift $P_S$. Accordingly, and as shown in FIG. 8, the modulator phase shift $P_B$ corresponding to the peak of the intensity signal S which occurs at the axis origin when the angular rotation rate is substantially zero will then correspond to the Sagnac phase shift $P_S$. In the Carrington et al system, the offset position of the peak of the intensity signal S is determined by biasing the intensity signal, and taking samples within the region of the intensity signal as shown in FIG. 9.

The triad sensor apparatus 300, in contrast to the Carrington et al arrangement, operates essentially as a closed-loop arrangement in that the driving voltage applied to any one of the phase modulators 398 will be a function of the computed Sagnac phase shift associated with the corresponding gyroscope channel. The apparatus 300 eliminates certain deficiencies associated with rate sensors such as those described in the Carrington et al patent. To more fully understand the closed-loop arrangement, FIG. 16 depicts the functional relationship between the intensity signal S and the modulator phase shift $P_B$ (or modulator drive voltage $V_M$), with the intensity signal being unbiased. It should be emphasized that the illustration in FIG. 16 relates to the intensity signal and modulator phase shift only for one gyroscope channel. As earlier explained with respect to the rate sensor described in the Carrington et al patent, the offset of the peak of the intensity signal which would occur at the origin for zero input angular rotation rate corresponds to the Sagnac phase shift. As earlier described with respect to Equation 9, and as substantially described in the Carrington et al patent, this peak offset is substantially independent of light source wave length or intensity changes. The functional relationship between the intensity signal S and the modulator phase shift $P_B$ as shown in FIG. 16 will exist in any passive ring interferometer and phase modulator combination having a configuration and operation similar to those shown in the rate sensors 200 and 300, if the scanning rate of the phase modulator is sufficiently rapid relative to the rate of change of angular rotation of the passive ring.

Theoretically, a closed-loop system can be utilized whereby the driving voltage applied to the phase modulator is controlled in a manner so that the modulator output would "offset" or negate the Sagnac phase. That is, signals representative of the Sagnac phase shift can be processed so as to apply a driving voltage to the phase modulator whereby the non-reciprocal phase shift caused by the phase modulator is essentially equal in magnitude and opposite in polarity to the Sagnac phase shift.

To more fully understand this closed-loop operation and the "feedback" functions associated therewith, FIG. 17 is a simplified system diagram of the operation of the triad sensor apparatus 300 with respect to the x gyroscope channel. The system diagram also corresponds to operation of the y and z gyroscope channels. For purposes of description, reference will be made to circuitry of the triad apparatus 300 as depicted in FIG. 15.

Referring specifically to FIG. 17, the input variable to the system diagram for the x gyroscope channel of triad apparatus 300 is the inertial input rate $G_{IX}$. The system block 580 comprises a scale factor $K_s$ relating the Sagnac phase shift for the x gyroscope channel $P_{sx}$ to the input rate $G_{IX}$. The Sagnac phase shift $P_{sx}$ and the modulator phase shift $P_{BX}$ can be characterized as being added together through symbolic adder 582. The effects of the photodiode circuit 324 and high pass filter 474 are collectively shown as block 584 having a scale factor $K_p$. The resultant output, characterized as phase error $P_{ex}$, is then applied through the A/D converter 506 and applied as an input to the CPU 508.

In the open-loop Carrington et al arrangement, the CPU utilized therein acted upon its input signal so as to determine the Sagnac phase $P_s$. As earlier explained, this determination of the Sagnac phase $P_s$ was computed in accordance with the mid-point between zero crossing intervals of the intensity signal peak as a function of the modulator phase shift $P_B$. As also earlier described, a Kalman filter (provided through operations of the Carrington et al CPU) was utilized to determine an optimal estimate of phase modulator driving voltage corresponding to the Sagnac phase shift $P_s$. Accordingly, the output of the Carrington et al CPU could be characterized as an estimate $\hat{G}_I$ of the inertial input rate $G_I$.

As further shown in FIG. 17, the modulator phase $P_{BX}$ can be characterized as a phase signal resulting from a control input signal $u_x$ applied to the phase modulator 398. The functional relationship between the modulator phase $P_{BX}$ and the input control variable $u_x$ is shown as a modulator scale factor $K_m$ associated with the actual physical implementation of the modulation. Although relatively constant, the scale factor $K_m$ is a function of variables such as phase modulator temperature and the like.

With appropriate A/D and D/A conversion, the CPU 508 (or any other type of controller element) is utilized to generate the control variable $u_x$ (representative of input modulator drive voltage $V_m$) so as to maintain the modulator phase $P_{BX}$ at a value corresponding to the Sagnac phase shift $P_{sx}$. Information regarding the rate input $G_{IX}$ is contained in the phase error signal $P_{ex}$. The optical rate sensor therefore comprises a closed-loop system, whereby the driving voltage applied to the phase modulator is a function of the observed Sagnac phase shift $P_{sx}$.

However, if a closed loop system was implemented exactly as described above, the system would not have a phase modulator scanning rate which would be substantially rapid relative to the rate of change of angular rotation $G_{IX}$. Accordingly, the functional relationship between the intensity signal at the output of the monitor photodiode 460 and the non-reciprocal phase shift $P_{BX}$ resulting from the phase modulator would not accurately correspond to the wave form shown in FIG. 16. Secondly, and as apparent from FIG. 16, the system would be operating in a range whereby changes in the intensity signal relative to changes in Sagnac phase shift $P_{sx}$ would be substantially minimal and nonlinear, after transfer through the previously-described circuitry represented by block 584 and scale factor $K_p$. That is, operation of the system would be theoretically near a zero slope location of the functional relationship between the intensity signal S and the phase modulator output $P_{BX}$. Such operation would result in extremely inaccurate measurement capability.

However, the closed loop concept of control of the phase modulator can be combined with the concept of causing the system to operate in a manner so that the actual values of the intensity signal S occur only within the regions of the functional pattern shown in FIG. 16 where the intensity signal S is a high slope function of the phase modulator output $P_{BX}$ or phase modulator driving voltage $V_{mx}$. Stated simply, a closed-loop operation can be achieved whereby the DC component of a non-reciprocal phase shift $P_{BX}$ resulting from the phase modulator 398 is controlled in a manner so as to correspond to the Sagnac phase $P_{sx}$, but with additional signal generation within the system so that the scanning rate of the modulator is rapid relative to the rate of change of inertial input $G_{IX}$, and the system is caused to operate so that the intensity signal S at the output of the monitor photodiode 460 is maintained within the high slope regions of the functional relationship between the intensity signal and the phase modulator output $P_{BX}$ and driving voltage $V_{mx}$. Within these linear regions, measurement accuracy is enhanced in that maximum changes occur in signal intensity in response to given changes in non-reciprocal phase shift.

This concept of causing the intensity signal to essentially operate within the linear regions of the functional pattern shown in FIG. 16 is also shown in the system diagram of FIG. 17. Referring thereto, the control variable $u_x$ which is generated by the CPU 508 as a function of the inertial input rate $G_{IX}$ is modulated as represented by modulator 590 prior to application as a control signal to the phase modulator represented by scale factor $K_m$. The modulation causes the phase modulator output $P_{BX}$ to rapidly alternate between the values $P_{r1}$ and $P_{r2}$ as shown in the wave pattern of FIG. 16. By applying the modulation as described above, the intensity signal is forced to be maintained in the high slope regions of the functional relationship between the intensity signal and the phase modulator output. As also shown in the system diagram of FIG. 17, the demodulator 478 is included within the system for purposes of extracting the DC component of the phase error $P_{ex}$.

The CPU 508 shown in the system diagram of FIG. 17 can include means for generating a signal representative of an "estimated" inertial input rate $\hat{G}_{IX}$ in addition to means for generating the control variable $u_x$ as a function of the inertial input rate. However, for purposes of understanding the concept of controlling the system in a closed-loop mode, it should be emphasized that the CPU 508 could essentially be eliminated from the system control diagrams. That is, the phase error $P_{ex}$ could be directly fed back to the modulator 590. Such an arrangement, however, would not provide any optimal or other estimation functions to more accurately determine the rate input $G_{IX}$.

A modulation wave form which can achieve the intensity signal dwelling almost continuously at the high sloped linear regions of FIG. 16 can be shown to be the sum of the wave forms $A_1$ shown in FIG. 20 and wave form $A_{2x}$ as shown in FIG. 21. The period T represents a transit time of a wave signal around each of the fiber rings. The wave form $A_1$ is independent of the inertial input rate or Sagnac phase, and can be characterized as a periodic wave form which cause the intensity signal at the output of the monitor photodiode 460 to be shifted to the left or right in the abcissa direction relative to the value of the intensity signal corresponding to a phase modulator output equal to the Sagnac phase. The amplitudes of the wave form $A_1$ can be of a magnitude so as to produce a non-reciprocal phase shift of $+90°$ (relative to the wavelength of the light source) at the time $t_2$ (as shown in FIG. 23) and $-90°$ at time $t_5$. The specific amplitude values will be dependent upon the phase modulator scale factor and the particular type of phase modulators employed in the apparatus 300.

If the inertial input rate was zero, the signal $A_1$ can be made to cause the intensity signal to dwell at the exact locations of maximum signal intensity change relative to changes in modulator phase shift or modulator driving voltage. However, the functional relationship between the intensity signal and the modulator phase shift will change as the inertial rate input and corresponding Sagnac phase shift changes or otherwise becomes non-zero. The signal $A_{2x}$ can thus be generated with a variable amplitude which will change at, for example, times $t_2$ and $t_5$ (in FIG. 22) and which will be proportional to inertial input rate at these times so as to offset the effect of Sagnac phase and maintain the intensity signal at the maximum sloped regions. It should be noted, however, that in view of other potential error sources within apparatus 300, it may be advantageous to operate within the high slope regions, but at locations other than the exact locations of maximum signal intensity changes relative to nonreciprocal phase shift.

The signal wave form $A_{2x}$, being a function of the inertial input rate (or Sagnac phase shift), can be characterized as determining the "vertical" location of operation along the pattern shown in FIG. 16. That is, the primary goal of the wave form $A_{2x}$ is to cause a modulator phase shift which is essentially equal in magnitude and opposite in polarity to the Sagnac phase shift. A simplified system diagram of the foregoing is shown in FIG. 18.

With respect to the generation of wave form $A_{2x}$, it is apparent from the foregoing that the actual inertial input rate $G_{IX}$ cannot be utilized for purposes of generating wave form $A_{2x}$. Instead, the wave form $A_{2x}$ is generated as a function of an estimate $\hat{G}_{IX}$ of the actual inertial input rate $G_{IX}$. The system diagram shown in FIG. 18, with the implementation of the wave forms $A_1$ and $A_{2x}$, where $A_{2x}$ is a function of the estimated inertial input rate $\hat{G}_{IX}$, is described in detail in the previously-referenced Sugarbaker et al patent application.

It should be noted that several practical problems can exist in utilizing a system having a closed-loop control arrangement such as that shown in FIG. 18. For example, with the use of a central processing unit or other elements employing digital signals, an A/D converter must be employed. Such a physically realizable converter will always have some noise associated therewith, resulting in finite output errors. For this and other reasons, the analog integrators 490 as previously described with respect to FIG. 15 are employed. The integrators 490 can be characterized as elements which achieve containment of errors resulting from DC bias present in the A/D converters. That is, the integrators essentially bound the errors resulting from the A/D conversion process. A simplified system diagram representative of the closed loop control utilizing the analog integrator 490 (with respect only to the x gyroscope channel) is shown in FIG. 19. Theoretically, it is conceivable that a direct analog arrangement could be employed for purposes of controlling the input modulation voltages so that the phase modulator outputs would essentially "track" the Sagnac phase shifts of the gyroscope channels as they change in correspondence to changes in inertial input rates. However, in any physically realizable system, random input disturbances will exist with respect to the circuit components. In addition, it is the intent of the triad sensor apparatus 300 to provide an observable determination of the inertial input rate and the incremental angle or angular position for each of the gyroscope channels. Accordingly, various types of measurements must be taken during operation of the triad sensor apparatus. As well known to those skilled in the art of communications and navigational system design, noise is associated with any type of measurement process. Furthermore, for practical use of the triad sensor apparatus 300, determination of the inertial input rate and incremental angle for each of the gyroscope channels should preferably be provided in digital format. For these reasons, in part, the CPU 508 is preferably employed.

With respect to potential error sources associated with functional operation of the triad apparatus 300, certain random errors can exist within determinations of the integrated phase error represented by the output signals from the analog integrators 490. Such errors can be caused, for example, by A/D quantization noise, LED intensity noise, shot noise within the monitor photodiode 460, Johnson noise within the analog electronics, and D/A uncertainty within the basic sample voltage steps from the intensity signals. To at least partially overcome these and other random errors, an optimal estimation sequence can be utilized within the CPU 508 to better determine the measured phase error signals (as converted to digital format) from the analog integrators 490, and to better determine the actual inertial input rates and incremental angles for each of the gyroscope channels.

Since the statistical parameters of the output signals from the analog integrators 490 representative of phase error (e.g., mean, type of disturbance noise, etc.) can be readily determined, known estimation techniques may be utilized. For example, optimal filters can be configured which will provide optimal estimates of the true values of the analog integrator output signals representative of phase errors, even in the presence of substantially noisy measurements of the phase error signals. Basic processes relating to optimal filters are relatively well known in the art and, for example, are described in texts such as *Probability, Random Variables and Stochastic Processes,* Papoulis (McGraw-Hill 1965), and *Estimation Theory With the Application of Communications and Control,* Sage & Melsa (McGraw-Hill 1971).

Essentially, an optimal filter can be utilized to estimate, on the basis of noisy measurements, the value of inaccessible state variables of systems driven by stochastic input disturbances. In the triad apparatus 300, optimal filters can be utilized to estimate the true value of the analog integrator phase error signals by combining past and present measurements of these signals, such that the mean square errors between true and expected values thereof are minimized. The utilization of such optimal filter techniques is advantageous over simple averaging processes, in that it takes into account not only additive measurement noise of the phase error signals, but also the statistics of the vehicle dynamics.

In addition to the concept of optimal filtering and estimation, it is also advantageous to develop an optimum "controller" for the closed-loop process. That is, given the state variables of a system, optimal feedback coefficients to control the phase modulator voltages can be derived. However, these derivations are based on the assumption that state variables are accessible and can be measured exactly. In an actual system having noise and inaccessible state variables, the variables are estimated and used as if they were the actual state variables to generate appropriate optimal control signals.

Derivation of optimal control and estimation arrangements capable of use with the triad sensor apparatus 300 will not be described in substantial detail herein. However, the theory and principles associated with the derivation of such optimal estimation and control techniques are described in the previously-referenced and commonly-assigned Sugarbaker et al patent application.

One illustrative embodiment of an optimal filter and estimation arrangement which may be adapted for use with the triad sensor 300 will now be described. For purposes of understanding, the filter and estimator will be described only with respect to use for the x gyroscope channel. In an actual triad apparatus 300 in accordance with the invention, the optimal filter and estimator would essentially be replicated with the computer programs of CPU 508 for each of the gyroscope channels.

To explain the principal concepts associated with an illustrative optimal controller and estimator, FIG. 24 illustrates an open loop system diagram of triad sensor apparatus 300. A control input u can be characterized as a modulator input voltage which is applied to the phase modulator 398 associated with the x gyroscope channel The actual output of the analog integrator 490 (IE) and the actual inertial input rate $G_{Ix}$ can be characterized as a vector state variable x. For purposes of deriving the optimal controller and filter, the actual Sagnac phase $P_{sx}$ can be substituted for the input rate $G_{Ix}$, because these variables are directly related by the scale factor $K_s$ representative of the physical parameters of the x gyroscope channel.

To represent random input disturbances and measurement noise, the diagram of FIG. 24 can be modified as shown in FIG. 25. To represent noise associated with the A/D converter 506, the A/D converter 506 is shown as a summing junction 586 representative of an additive measurement noise vector v(t). Correspondingly, additive input noise is represented by the summing junction 588 having a noise vector w(t) applied thereto. To derive a specific optimal controller and filter, the generally well known system equations can be written as follows:

$$\dot{x} = Ax + Bu + w$$

$$y = Cx + v \quad \text{(Equations 11)}$$

where x is a vector having state variables IE and $P_{sx}$, u is a scalar representing the control variable corresponding to the phase modulation voltage, y is the observed or "noisy" values of the analog intergrator output and the Sagnac phase, w is a scalar representative of input noise, and v is a scalar representative of measurement noise.

The matrices A, B and C can be written as follows:

$$A = \begin{vmatrix} 0 & K_d \\ 0 & 0 \end{vmatrix} \quad B = \begin{vmatrix} K_d K_m \\ 0 \end{vmatrix} \quad C = [1 \ 0] \quad \text{(Equations 12)}$$

The matrix A is commonly referred to as the "system dynamics" matrix. Matrix B is the "control" matrix, and C is the "measurement" matrix.

In accordance with the theory of operation of optimal controllers and estimators, a "performance index" is defined as follows:

$$PI = \int_0^\infty (x^T Q x + u^T R u) dt \quad \text{(Equation 13)}$$

with Q being equal to the "state" weighting index and R being equal to the control weighting index.

To minimize the performance index, the control variable u is determined as:

$$u = -R^{-1} B^T K_o x \quad \text{(Equation 14)}$$

where $K_o$ is the controller gain matrix. The controller gain matrix $K_o$ is computed from the following differential equation (i.e., the matrix Riccati equation):

$$\dot{K}_o = -A K_o - A^T K_o + K_o B R^{-1} B^T K_o - Q \quad \text{(Equation 15)}$$

Setting $\dot{K}_o$ equal to zero and solving Equation 15 for the controller gain results in the following:

$$u = [-(Q/R)^{\frac{1}{2}} - 1/K_m] x \quad \text{(Equation 16)}$$

To derive the filter, the following equations can be utilized:

$$\dot{\hat{x}} = A\hat{x} + S(y - C\hat{x}) + Bu$$

$$y = C\hat{x} \quad \text{(Equations 17)}$$

where $\bar{S}$ is the steady state Kalman gain matrix. The Kalman gain matrix can be characterized as a vector having gains $K_1$ and $K_2$. Assuming A, $\bar{S}$, C and B are constant, Equations 17 can be written in LaPlace notation as follows:

$$s\hat{x} = A\hat{x} + S(y - C\hat{x}) + Bu \quad \text{(Equation 18)}$$

The general transfer function can then be written as:

$$\hat{x} = [sI - A + SC][Sy + Bu] \quad \text{(Equation 19)}$$

where I is the identity matrix.

For the optimal filter, the vectors and matrices of Equation 19 have the following values:

$$x = \begin{vmatrix} IE \\ P_s \end{vmatrix} \quad A = \begin{vmatrix} 0 & K_D \\ 0 & 0 \end{vmatrix} \quad B = \begin{vmatrix} K_D K_M \\ 0 \end{vmatrix}$$

$$C = [1 \ 0] \quad S = \begin{vmatrix} K_1 \\ K_2 \end{vmatrix} \quad \text{(Equations 20)}$$

It should be noted that $K_D$ and $K_M$ represent the "modeled" values of $K_d$ (the modulator gain) and $K_m$ (phase modulator gain), respectively. The transfer function for the estimated variables $\hat{IE}$ and $\hat{P}_{sx}$ can now be written as:

$$\hat{IE} = [sK_1 + K_2 K_D) y + s K_D K_M u]/[s^2 + K_2 s + K_2 K_D]$$

and $$\hat{P}_s = [sK_2 y - K_2 K_D K_M u]/[s^2 + K_1 s + K_2 K_D] \quad \text{(Equations 21)}$$

The optimal control now becomes:

$$u = -[\hat{IE}(Q/R)^{\frac{1}{2}} + \hat{P}_S / K_M] \quad \text{(Equations 22)}$$

An optimal controller and filter in accordance with the foregoing description for use with the triad apparatus 300 is shown in FIG. 26. The optimal filter and controller can be provided by digital processing techniques and implemented through the use of CPU 508.

An additional problem inherent to any type of rate sensing device having applications such as aircraft and missile guidance is the problem of appropriate dynamic range. That is, missile and similar navigation systems require substantial accuracy over a wide dynamic range of rotation rates. For example, in a conventional missile system, rotation rates can potentially vary between 1,000° per second to 1° per hour, i.e., a range ratio of $3.6 \times 10^6$ to 1, assuming constant resolution within the range. When a measurement technique such as digital sampling is utilized to estimate the magnitude of the intensity signal output from the photodiode, a 22-bit (plus sign) binary word must be utilized for purposes of A/D conversion. The necessity of such large scale data words is prohibitive to the use of small scale and high-speed A/D converters as required for aircraft and missile guidance control systems. Another problem associated with the requisite wide dynamic range pertains to the signal to noise (S/N) ratio. In accordance with conventional communication theory, a 131 dB S/N ratio is required for a $3.6 \times 10^6$ dynamic range. In many physically realized passive ring interferometers such as that shown in rate sensor 100, the S/N ratio will actually be closer to a value of 75 dB.

The problem of dynamic range at the input of the optical rate sensor is solved in part by the use of optimal filtering, which serves to improve the resolution of the signal in the presence of noise due to intensity fluctuations and sampling truncation. With respect to the requisite number of D/A converter states for purposes of converting the estimated phase modulation input voltage level, the problem of the wide dynamic range still remains. However, this problem can be substantially alleviated by utilizing a non-linear digital output from the optimal controller and filter as described in subsequent paragraphs herein.

To explain the foregoing, a variable $e_i$ can be defined which is characterized as the error in the measurement of inertial input rate during the ith sample period. The error in phase angle, characterized as $P_e$, can be defined as the product of the measurement error and the output sample period T. It can be shown that if the standard deviation of the error in angular rate measurement $e_i$ is approximately 80° per hour, with a sample period of T equal to 0.005 seconds, then the standard deviation of the phase error of angle $P_e$ is approximately equal to 0.1° at the end of one hour.

It can further be shown that the quantization of the output angular rate does not have to be less than the noise output, i.e., 80° per hour, since the probability density function (or frequency distribution function) can be assumed constant for the noise output of the angular rate measurement error over a specific range. It can also be shown that the standard deviation for the angular rate measurement error is equal to the value of the least significant bit (LSB) divided by the square root of 12.

Accordingly, if the LSB was 80° per hour (as an example), and the maximum rate of measurement was ±1,000° per second, the dynamic range of the output would be approximately $0.9 \times 10^5$. This dynamic range can be substantially achieved with a 16-bit D/A converter. Accordingly, a 16-bit output appears to be sufficient at low rates. That is, if a bias error with respect to the phase modular input voltage is to be achieved which will result in a standard deviation of the phase angle error $P_e$ being no greater than 0.1° per hour, then the least significant bit for the quantization of the angular rate measurement need not be less than 80° per hour.

Correspondingly, at high angular rates, a significant goal to achieve with respect to phase bias error is to have a scale factor error of less than 200 "parts per million" (ppm). Such a scale factor can be achieved through the use of a D/A converter having less than 16-bit resolution. That is, as the inertial input rate increases, the number of bits required to define or otherwise indicate the input rate as a binary coded signal will also increase. However, with a scale factor error of 200 ppm, the information present in the least significant bits will be within the range of acceptable noise. The greater the input rate, the greater the number of least significant bits which will be within the noise range. Accordingly, for inertial input rates of, for example, greater than 1.4° per second, the scale factor error of 200 ppm (which represents an increase in phase error as the input rate increases) will result in the "non-noise" portion of the binary representation of the rate having no more than 16 bits.

In accordance with the foregoing, appropriate resolution over a wide dynamic range can be achieved through the use of 16-bit D/A conversion, if the particular bit range can be varied. To achieve this function, digital processing techniques can be implemented so as to essentially "strip" the most significant bits from the computation of the phase modulator voltage control variable u, prior to D/A conversion. The system diagram of the optimal controller and filter shown in FIG. 26 also includes the requisite "most significant bit" (MSB) stripper or "round-off" operation. The 16 most significant bits of the phase modulator voltage control variable can be utilized, since the least significant bit of the chosen 16 bits will still be representative of a quantization of the angular rate measurement which will include some noise error.

Referring again to FIG. 15 and the timing diagrams of FIGS. 22 and 23, a primary aspect of the triad apparatus 300 in accordance with the invention is to essentially allow one light source (i.e., light source circuit 308) and one detector (i.e., photodiode circuit 324) to be multiplexed among all three x, y and z gyroscope axes. The concepts associated with operation of the LED light source 450 and the optics/modulator circuit 312 have been previously described herein. Briefly, and as shown in FIG. 23, the optics/modulator circuit 312 will operate to apply a light wave signal from the LED source 450 to the x gyroscope channel associated with passive ring 302 during the time period shown in FIG. 23 between times $t_1$ and $t_2$. This time period will correspond to one full transit time (T) for propagation of light through any one of the rings 302, 304 or 306. During this same period of time, the input driving voltage applied to the phase modulator 398 associated with the x gyroscope channel (corresponding to the signal $A_{3x}$ comprising the sum of the AC bias signal $A_1$ and the "feedback" signal associated with the x gyroscope channel and characterized in FIG. 23 as signal $A_{2x}$) is held constant.

At time $t_2$, the LED source 450 is switched so as to apply light wave signals to the y gyroscope channel and the associated fiber ring 304. Correspondingly, during the period of time $t_2$ to $t_3$ (also corresponding to one full ring transit time), the light wave signal emerging from ring 302 associated with the x gyroscope channel will be switched to the conductive path 322 and detected by the photodiode 460. During this same period of time, the input drive voltage for the phase modulator 398 associated with the x gyroscope channel, comprising the sum of AC bias signal $A_1$ and the x channel feedback signal $A_{2x}$, will be changed to a different level and held constant during the period $t_2$ to $t_3$. As previously described, this change in phase modulator driving voltage will cause in part a proportional non-reciprocal phase shift to be applied to the counter-propagating waves emerging from the fiber ring 302 associated with the x gyroscope channel. The intensity signal S detected by the monitor photodiode 460 will be a function of the Sagnac phase shift (and, accordingly, the proportional inertial input rate) and the non-reciprocal phase shift applied by the corresponding phase modulator 398 associated with the x gyroscope channel.

The feedback signal $A_{2x}$ will have a level shift at time $t_2$ which will be proportional to the Sagnac phase shift (and the inertial input rate) at the specific instant of time when the light wave signal emerging from the fiber ring 302 associated with the x gyroscope channel is first applied through switch 350 to the photodiode 460. The AC bias signal $A_1$ will be a fixed amplitude signal that can provide alternating ±90° non-reciprocal phase shifts to the light wave. As previously described, the phase shift provided by the AC bias signal will essentially cause operation of the rate sensor in a region where the relationship between the amplitude of the intensity signal S and the total phase shift of the detected light wave signal is of a high slope.

During the period of time that the y gyroscope axis is active to receive light from the LED source 450, the input modulator control signal voltage for the phase modulator 398 associated with the y gyroscope channel (comprising the sum of AC bias signal $A_1$ and the feedback signal $A_{2y}$) will be held constant. At time $t_3$, the optical switch 350 will operate so as to activate the z gyroscope axis and the fiber ring 306 will receive light wave signals from the LED source 450. During the period of time $t_3$ to $t_4$, the z gyroscope axis will remain active to receive the incoming light wave signal, and the switch 350 will be operated so as to cause the photodiode 460 to detect the light wave signal emerging from the y gyroscope channel and the fiber ring 304. During the time period $t_3$ to $t_4$, the input voltage to the phase modulator 398 associated with the z gyroscope axis (comprising the sum of AC bias signal $A_1$ and the z channel feedback signal $A_{2z}$) will remain constant.

At time $t_4$, the optical switch 350 will be operated so that the monitor photodiode 460 will detect light emerging from the z gyroscope channel and the fiber ring 306. During this same period of time, from $t_4$ to $t_5$, the x gyroscope channel will again be active so as to receive the incoming light wave signal from the LED source 450. At time $t_5$, the optical switch 350 will be operated so that monitor photodiode 460 detects the light wave signal emerging from fiber ring 302 associated with the x gyroscope channel.

With respect to each of the gyroscope channels, the detected intensity signal S will be a cosine function of the total phase angle induced within the gyroscope channel. Using the x gyroscope channel as an example, synchronously detecting the intensity signal S which is output from the monitor photodiode 460 will give a signal $S_x$ equal to the difference between the intensity signal following time $t_2$, and the intensity signal following time $t_5$, as follows:

$$S_x = I\cos(P_{sx} + P_{Bx} - \pi/2) - I\cos(P_{sx} + P_{Bx} + \pi/2) + 2I\sin(P_{sx} + P_{Bx}) \quad \text{(Equation 23)}$$

For small angles, this signal $S_x$ will be proportional to the difference between the Sagnac phase angle $P_{sx}$ and the phase angle resulting from the operation of the corresponding phase modulator 398 $P_{Bx}$. This synchronously-detected intensity signal $S_x$ is then processed so as to be servoed by adjusting the amplitude of the feedback signal $A_{2x}$ so that the non-reciprocal phase angle induced by the phase modulator 398 associated with the x gyroscope channel will in part be equal and opposite to the Sagnac phase angle $P_{sx}$.

As specifically shown in FIG. 23, the AC bias signal can have a frequency whereby its period is equal to twice the transit time T for each of the fiber rings. As also shown in FIG. 23, each of the feedback signals $A_{2x}$, $A_{2y}$ and $A_{2z}$ can have a square wave configuration with a frequency equal to two-thirds of the AC bias frequency. This configuration in accordance with the invention will utilize the LED source 450 and the photodiode 460 for only one-third of the total time for each gyroscope channel. Accordingly, the single LED source 450 and single photodiode 460 can be time shared between the three separate gyroscope channels through use of the optical switches 350.

The intensity signal S is applied through the high pass filter 474 and the synchronous demodulators 478. As earlier described, the demodulators 478 will also have as input signals $F_{1x}$, $F_{1y}$ and $F_{1z}$. Each of these signals will also have a frequency equal to one-third of the AC bias signal frequency. The demodulators 478 will operate to extract the DC components of the phase error signals $P_{ex}$, $P_{ey}$ and $P_{ez}$. Exemplary signal waveforms for the demodulator input signals are shown in FIG. 23. It should be noted that each demodulator reference signal will be alternately "high" and "low" during the time periods that the corresponding gyroscope channel is active to apply the light wave signal from the channel ring to the photodiode 460.

The demodulated signals are then applied to each of the analog integrators 490. The output signals from the analog integrators 490 are time multiplexed and applied to the A/D converter 506, and then to the A/D sample register 514. The sample signals from the A/D sample register 514 are applied on conductive path 516 to the CPU 508. As described in the foregoing paragraphs, the CPU 508 can comprise an optimal controller and filter for purposes of generating the appropriate control signals $u_x$, $u_y$ and $u_z$ for controlling each of the phase modulators 398 associated with the x, y and z gyroscope channels. As also previously described and shown in FIG. 26, these signals can be applied through a 16-bit "stripper" for purposes of obtaining the 16 most significant bits. The control signals comprising the 16 most significant bits are applied as input signals to the D/A converters 528, which generate appropriate analog signals applied to the hold circuits 538.

The hold circuits 538 will appropriately time the application of signals to the attenuators 546 and the wave form generators 554. The wave form generators 554, with the application of signals $F_{2x}$, $F_{2y}$ and $F_{2z}$ will provide modulated signals corresponding to the previously-described signals $A_{2x}$, $A_{2y}$ and $A_{2z}$ shown in FIG. 23. These feedback signals are then applied as input signals to the corresponding adder circuits 562. Also applied as inputs to the adder circuits 562 is the AC bias signal $A_1$. The resultant signals $A_{3x}$, $A_{3y}$ and $A_{3z}$ are then applied as input modulator control signals to the corresponding phase modulators 398. In this manner, appropriate phase modulation is applied so as to control the output of the intensity signal at the photodiode 460 in a manner such that the DC component of the phase offset for each of the gyroscope channels essentially is equal and opposite to the Sagnac phase resulting from rotation of the corresponding fiber ring.

In the exemplary triad sensor apparatus 300 depicted in FIG. 15, the optimal controller and filtering functions, in addition to the "stripping" of the most significant bits for each of the phase modulator voltage control signals $u_x$, $u_y$ and $u_z$, can be achieved at least in part by the utilization of information processing within CPU 508. The information processing and control functions which are accomplished in part by utilization of CPU 508 can be divided into certain real time sequences comprising the following functions: parameter and variable compensation, closure loop functions and data-acquisition functions. The compensation program can be utilized to estimate or otherwise vary certain parameters associated with the optimal filter and optimal controller in view of temperature changes, changes in signal intensity and the like. For example, this compensation function can be utilized to vary the modeled scale factors such as $K_M$, $K_D$, and similar variables as previously described and depicted herein.

The closure loop sequence can be utilized to determine the estimated values of the Sagnac phase $P_s$ and error signal IE for each of the gyroscope channels from the outputs of the analog integrators 490. The closure loop sequence can also be utilized to then generate the appropriate phase modulator control voltage signals $u_x$, $u_y$ and $u_z$, including the "rounded off" signal by determining the most significant bits.

The data acquisition sequence can be utilized for providing control parameter inputs to the compensation sequence and the closure loop sequence. In addition, the data acquisition sequence can be utilized to receive signals representative of the values to be determined, such as the angular rate measurement and phase angle for each gyroscope channel. It is obvious that other types of parameters can also be processed within the data acquisition sequence for purposes of providing various output data, such as measured temperatures, optical rate sensor status flags and the like.

Sequence control can be transferred between the compensation sequence and the closure loop sequence by conventional digital computer techniques such as the use of "interrupt" processing signals. FIG. 27 shows one example of a closure loop process. The closure loop process is designated as "CL" and initiated by transfer of control from the compensation sequence through means of an "interrupt" or similar digital computer technique. Upon initialization of the sequence CL, the CPU 508 is made to read the next input sample, designated in FIG. 27 as $A_E(\text{in})$. For purposes of description, the letter "n" will indicate signals associated with the nth sample. It should again be emphasized that the closure loop sequence described herein is associated only with the x gyroscope channel. Similar functions would also be performed with respect to the y and z gyroscope channels.

$A_E(\text{in})$ represents the output of the A/D converter 506 for a given sample period n. The input signal received from the A/D converter 506 can then be multiplied by a scale factor representative of the ratio between the "modeled" wavelength and the nominal wavelength. This modeled wavelength can be computed within the compensation sequence and represents the estimated wavelength in view of measured temperature and other measured parameters. The result of the scaled A/D input is shown in the FIG. 27 sequence diagram as the signal $\hat{a}(n)$.

The difference between the scaled A/D output signal $a(n)$ and the computed estimate of $\hat{a}(n+1)$ from the prior sample period is then determined. The result of this computation is shown in the FIG. 27 sequence diagram as $da(n)$. Following this computation, an estimate is made of the Sagnac phase $\hat{P}_s$ and is shown in the FIG. 27 sequence diagram as $\hat{P}_s(n+1)$. This estimate is obtained from the addition of the estimate of the Sagnac phase computed from the prior sample period (shown in FIG. 27 as $\hat{P}_s(n)$) plus a value representing the multiplication of the optimal filter gain $K_2$, T (representing the sample period) and $da(n)$. Optimal filter gain $K_2$ and the sample period T are signal values previously stored in memory locations of the CPU 508.

After the computation of the estimated Sagnac phase $\hat{P}_s(n+1)$, a computation is made for the next estimate of the integrator output $\hat{a}(n+1)$. This computation is shown in the FIG. 27 sequence diagram and corresponds to the signal at location L1 shown in the FIG. 26 system diagram. It should be noted that this computation utilizes stored values for the optimal filter gain $K_1$, optimal filter gain $K_2$, the "modeled" gain $K_D$ (representative of the gain associated with the amplifier, demodulator, etc. as previously described herein) and the modeled gain $K_M$ representative of the modeled phase modulator gain. In addition, this computation also utilizes the computed value $u_{ro}(n)$ representative of the "rounded off" computed value for the control variable u.

After the computation of the "next" estimate of the integrator output $\hat{a}(n+1)$, a computation is then made to compute the "next" value of the control signal $u(n+1)$. As shown in the FIG. 27 sequence diagram, this computation employs the ratio value Q/R, representing the weighting of the estimation effort versus the controller effort. As also shown in FIG. 27, the computation of the estimated Sagnac phase $\hat{P}_s(n+1)$ and the control signal $u(n+1)$ employ the attenuator scale factor value $K_o$.

Following the computation of the control signal $u(n+1)$, this control signal is "rounded off" to its most significant bits. This computation represents a nonlinearity in the generation of the control signal. The resultant rounded off signal is shown in the FIG. 27 sequence diagram and in the FIG. 26 system diagram as signal $u_{ro}(n+1)$. This signal will be applied to the D/A converter 528 as the control signal $u_x$ previously described with respect to FIG. 15.

The estimated value of the Sagnac phase $\hat{P}_s(n+1)$ is utilized in a modulo 10 counter for purposes of summing and averaging consecutive determinations of the estimated Sagnac phase. The average of each ten Sagnac phase estimates is utilized as an output of the closure loop process for purposes of providing information to both the compensation program and the data acquisition program. For purposes of data acquisition and indication to a user or operator of the inertial rate input to sensor 300, it is clearly sufficient to provide an output indication of the estimated Sagnac phase at a frequency of once every tenth sample period, with the output representative of the average of the samples over the last ten sample periods.

In accordance with the foregoing, the appropriate control variable $u_{ro}(n+1)$ is computed based on the integrator output utilizing an optimal filter and controller. For purposes of providing an output signal representative of an estimate of the inertial input rate $\hat{G}_{IX}$, the estimate of the Sagnac phase $\hat{P}_s(n+1)$ can be multiplied by the scale factor $1/K_s$ representing the modeled scale factor $K_s$ of the ring 302 between the inertial input rate and the Sagnac phase $\hat{P}_s$. This output therefore represents the estimate of the inerital input rate $\hat{G}_{IX}$.

The triad apparatus 300 in accordance with the invention provides several substantial advantages over known optical rate sensors. First, the apparatus provides for a single, shared optical light source and light detector for use with three gyroscope channels. In addition, as also apparent from the description of the functional operation of sensor apparatus 300, a significant portion of the signal processing and detector components are also shared among the three gyroscope channels. As previously described, known optical rate sensor apparatus have typically required replication of all electro-optical and electronic components associated with rate sensing. Still further, in accordance with another aspect of the invention, certain optical circuit components, such as the previously described couplers, polarizers, switches and phase modulators, can be configured on a single, monolithic integrated optics chip and utilized with the passive fiber rings associated with all three gyroscope channels.

It should also be apparent that the principles of the invention are not limited to the specific triad sensor apparatus described herein for determining applied angular velocities by means of measurement of intensity signals corresponding to the Sagnac-induced phase shifts which, in turn, are linearly proportional to the rotation rates. For example, it will be apparent to those skilled in the art that various other types of signal processing configurations (including other types of controller and filtering arrangements for estimation and control) could be employed in accordance with the invention. In fact, the principles of the invention associated with time sharing of electro-optical and electrical components could be employed in configurations other than closed-loop arrangements without altering the basic concepts of the invention. It will be further apparent to those skilled in the art that modifications and variations of the above-described illustrative embodiment of the invention may be effected without departing from the spirit and scope of the novel concepts of the invention.

The embodiments of the invention in which an exclusive property or privilege is claimed are defined as follows:

1. A rate sensor for use in inertial reference systems to detect angular rotations and measure magnitudes and directional sense of the rates of angular rotations along a plurality of orthogonal axes, said rate sensor comprising:

optical source means for generating an incoming optical source wave signal having a predetermined nominal wavelength;

a plurality of gyroscope channels, each of said channels corresponding to one of said orthogonal axes and comprising:
   a passive ring path;
   splitting means for splitting said source wave signal into a pair of counter-propagating optical waves;
   path means for applying said counter-propagating optical waves through said associated ring path, wherein said counter-propagating optical waves emerge therefrom with a relative Sagnac phase shift indicative of the rate of angular rotation of said ring path; and
   combining means for recombining said counter-propagating waves into an outgoing optical wave signal, wherein the resultant low order fringe pattern is representative of the relative phases of said counter-propagating waves;

detection circuit means connected to said gyroscope channels for generating an intensity signal indicative of said resultant low order fringe patterns;

signal processing means connected to said detection circuit means and responsive to said intensity signal for generating output signals corresponding to said rates of angular rotation for each of said axes; and switch means connected to said gyroscope channels, said optical source means and said detection circuit means for selectively applying said source wave signal to a first one of said gyroscope channels during a first predetermined time period, and for applying said outgoing optical wave signal associated with a second one of said gyroscope channels to said detection circuit means during said first predetermined time period.

2. A rate sensor in accordance with claim 1 characterized in that:
   said switch means is adapted to periodically apply said incoming source wave to different ones of each of said gyroscope channels during a sequence of substantially equivalent time periods; and
   said switch means is further adapted to periodically and sequentially apply each of said outgoing wave signals to said detection circuit means during said sequence of substantially equivalent time periods, wherein, during any given one of said substantially equivalent time periods, the gyroscope channel to which said source wave is being applied is a different one of said gyroscope channels than the gyroscope channel from which said outgoing wave signal is being applied to said detection circuit means.

3. A rate sensor in accordance with claim 1 and further comprising phase modulation means for applying non-reciprocal phase shift to each of said pairs of counter-propagating waves, said modulation means comprising:
   means for applying a modulator phase signal to each of said gyroscope channels, wherein the level of said modulator phase signal applied to a particular one of said gyroscope channels is held constant during any time period while said switch means is applying said incoming source wave to said particular gyroscope channel; and
   the level of said modulator phase signal applied to a particular one of said gyroscope channels is held constant during any time period while said switch means is applying the recombined pair of counter-propagating waves associated with said particular one of said gyroscope channels to said detection circuit means.

4. A rate sensor in accordance with claim 1 characterized in that said optical source means comprises a single light source connected to said switch means.

5. A rate sensor in accordance with claim 1 characterized in that said detection circuit means comprises a single photodiode connected to said switch means.

6. A rate sensor in accordance with claim 1 characterized in that:
   each of said gyroscope channels further comprises phase modulation means for applying to the corresponding pair of said counter-propagating waves a non-reciprocal phase shift;
   said signal processing means comprises means for generating a plurality of modulation control signals, each of said control signals corresponding to a different one of said gyroscope channels, wherein each of said modulation control signals is applied to a separate one of said phase modulation means and comprises information indicative of the relative Sagnac phase shift of said corresponding pair of counter-propagating waves.

7. A rate sensor in accordance with claim 6 characterized in that each of said control signals comprises:
   a time-variant feedback signal having a change in amplitude substantially proportional to the rate of angular rotation of said ring path of said corresponding gyroscope channel;

a periodic AC bias signal having an amplitude so as to operate in a high slope region of the functional relationship between said intensity signal and said relative phases of said counter-propagating waves; and the frequency of said feedback signal is approximately two-thirds of the frequency of said AC bias signal.

8. A rate sensor in accordance with claim 7 characterized in that the period of said AC bias signal is approximately twice the ring transit time for an optical wave traversing any one of said ring paths.

9. A rate sensor in accordance with claim 7 characterized in that the amplitude of said time-variant feedback signal will vary and substantially correspond to a non-reciprocal phase shift equal and opposite to the then-current relative Sagnac phase shift of said pair of counter-propagating waves associated with said corresponding gyroscope channel.

10. A rate sensor in accordance with claim 1 characterized in that said intensity signal is divided in time into repetitive series, each of said series comprising a plurality of sequential time periods, wherein said intensity signal during a given one of said time series is sequentially indicative of each of said resultant low order fringe patterns, and said intensity signal during a given one of said time periods within said given one of said time series is indicative of only one of said low order fringe patterns.

11. A rate sensor in accordance with claim 1 characterized in that said signal processing means comprises a single analog-to-digital converter responsive to a time multiplexed analog signal divided into sequential time periods, wherein the magnitude of said time multiplexed signal during a given time period is indicative the rate of angular rotation of one of said ring paths of a corresponding one of said gyroscope channels, and wherein said analog-to-digital converter converts said time multiplexed analog signal into a representative digital signal.

12. A rate sensor in accordance with claim 1 characterized in that said signal processing means comprises:
demodulation means responsive to said intensity signal for demodulating said intensity signal and for generating a plurality of resultant phase error signals, each of said phase error signals associated with a different one of said gyroscope channels; and
integration means connected to said demodulation means for integrating said phase error signals and for generating a plurality of integrated signals, each of said integrated signals corresponding to a different one of said phase error signals.

13. A rate sensor in accordance with claim 12 characterized in that said demodulator means comprises:
a plurality of demodulators, each of said demodulators corresponding to a different one of said gyroscope channels; and
means for applying to each of said demodulators a different one of a plurality of periodic demodulator reference signals, each of said reference signals having a period approximately equal to six ring transit times of an optical wave traversing any one of said ring paths.

14. A rate sensor in accordance with claim 13 characterized in that only one of said plurality of demodulator reference signals is of a non-zero amplitude at any given period of time.

15. A rate sensor in accordance with claim 12 characterized in that said signal processing means further comprises:
multiplexing means for time multiplexing said plurality of integrated signals into a single integrated error signal; and
means responsive to said integrated error signal for generating a plurality of modulation control signals, each of said modulation control signals corresponding to a different one of said gyroscope channels.

16. A rate sensor in accordance with claim 15 characterized in that said signal processing means further comprises:
analog-to-digital converter means for converting said integrated error signal into a digital error signal corresponding thereto;
central processing means responsive to said digital error signal for generating said plurality of control signals, each of said control signals corresponding to a different one of said gyroscope channels and indicative of the rate of angular rotation of said ring path of said corresponding gyroscope channel;
modulation means for modulating each of said control signals so as to apply level adjusted AC signals to phase modulation means, and for generating a plurality of modulated reference signals, each of said modulated reference signals corresponding to a different one of said control signals;
adder means for summing a periodic time variant AC bias signal with each of said plurality of modulated reference signals, and for generating a plurality of modulator control signals, each of said modulator control signals corresponding to a different one of said gyroscope channels and representative of the relative Sagnac phase shift of the pair of counter-propagating waves associated with said corresponding gyroscope channel; and
said AC bias signal and any one of said modulated reference signals are both of a non-zero amplitude only during time periods when said switch means is active to apply the outgoing wave signal of said corresponding gyroscope channel to said detection circuit means.

17. A rate sensor in accordance with claim 1 characterized in that said switch means comprises a directional coupler having a plurality of electrodes capable of switching a given input signal between one of two output paths.

18. A rate sensor in accordance with claim 17 characterized in that each of said splitting means comprises a Y-coupler.

19. A rate sensor in accordance with claim 18 characterized in that said sensor apparatus further comprises phase modulation means for externally applying a non-reciprocal phase shift to each pair of counter-propagating waves, and comprising a plurality of electrode pairs located along branches of said Y-couplers.

20. A rate sensor in accordance with claim 19 characterized in that each of said gyroscope channels further comprises a modal filter connected between said switch means and said corresponding Y-coupler.

21. A rate sensor in accordance with claim 20 characterized in that all of said switch means, splitting means, phase modulation means and modal filters are mounted on a monolithic integrated optics chip.

22. A rate sensor in accordance with claim 1 characterized in that:

said plurality of gyroscope channels comprises first, second, and third channels;

said switch means is adapted to apply said incoming source wave signal to: said first gyroscope channel during a first time period; said second gyroscope channel during a next sequential second time period; and said third gyroscope channel during a next sequential third time period, wherein each of said time periods is substantially equivalent in duration to each of said other time periods; and said switch means is further adapted to apply: said outgoing wave signal associated with said third gyroscope channel to said detection circuit means during said first time period; said outgoing wave signal associated with said first gyroscope channel to said detection circuit means during said second time period; and said outgoing wave signal associated with said second gyroscope channel during said third time period.

23. A rate sensor in accordance with claim 1 characterized in that said signal processing means comprises demodulation means responsive to said intensity signal for generating first, second and third phase error signals, each indicative of the difference between the relative Sagnac phase shift and a non-reciprocal phase shift externally applied to said pairs of counter-propagating waves associated with said first, second, and third gyroscope channels, respectively.

24. A method for use in inertial reference systems for detecting and measuring rates of angular rotation along three orthogonal axes, said method comprising the steps of:

a. generating an incoming optical source wave signal having a predetermined nominal wavelength;

b. periodically splitting said source wave signal into pairs of counter-propagating optical waves;

c. applying each of said pairs of counter-propagating waves through one of three ring paths, each of said ring paths corresponding to one of said axes;

d. recombining each pair of counter-propagating waves into a separate outgoing wave signal, wherein the resultant low order fringe pattern of each outgoing optical wave is representative of the relative phases of the corresponding counterpropagating waves;

e. generating an intensity signal indicative of said resultant low order fringe patterns;

f. processing said intensity signal and generating output signals corresponding to said rates of angular rotation for each of said axes;

g. selectively applying said source wave signal as a pair of said counter-propagating waves through a first one of said ring paths during a first predetermined time period; and h. selectively generating said intensity signal indicative of said resultant low order fringe pattern from one of said outgoing wave signals associated with a second one of said ring paths during said first predetermined time period.

* * * * *